US005408590A

United States Patent [19]
Dvorzsak

[11] Patent Number: 5,408,590
[45] Date of Patent: Apr. 18, 1995

[54] DIRECT INK DROP INTERFACE BOARD

[75] Inventor: Anthony P. Dvorzsak, Mt. Prospect, Ill.

[73] Assignee: Domino Amjet, Inc., Gurnee, Ill.

[21] Appl. No.: 803,611

[22] Filed: Dec. 9, 1991

[51] Int. Cl.⁶ ............................................. G06F 15/00
[52] U.S. Cl. ......................................... 395/104; 101/4
[58] Field of Search ............... 395/101, 104, 114, 109, 395/200; 101/365, 4–11; 358/296; 346/140.1, 157; 400/128

[56] References Cited

U.S. PATENT DOCUMENTS

| | | | |
|---|---|---|---|
| 4,346,446 | 8/1982 | Erbstein et al. | 364/551.01 |
| 4,972,270 | 11/1990 | Kurtin et al. | 358/296 |
| 5,179,637 | 1/1993 | Nardozzi | 395/114 |

OTHER PUBLICATIONS

Sales brochure from Kodak 2400 by Kostman Kodak Co.
Technical specification for Jet Array printer.
Technical sspecification for Jet Address printer.
Operator's manual for Domino Amjet Traversing Head Printer.

Primary Examiner—Arthur G. Evans
Attorney, Agent, or Firm—Schiff Hardin & Waite

[57] ABSTRACT

A printing system including a plurality of ink jet printers, wherein each printer contains a communications board to enable each printer to communicate with a personal computer over a common interface bus. The bus is connected to an interface on the personal computer. Preferably the interface is a parallel printer interface. A position sensor generates a signal corresponding to the positions of print locations on the print media. The resulting printing system is capable of printing in a direction other than the direction in which the object to be printed on or the substrate is travelling. The resulting printing system is also capable of overlaying a plurality of different colors at specific locations on the moving substrate or object.

26 Claims, 9 Drawing Sheets

DIRECT INK DROP INTERFACE BOARD

FIELD OF THE INVENTION

This invention relates to a computer controlled printing system, and more particularly to a computer controlled ink jet system for printing on a moving substrate or object.

BACKGROUND OF THE INVENTION

Ink jet printers create characters by ejecting individual droplets of ink that combine to form letters, numbers or symbols on a target or substrate. These printers normally consist of an ink source; a print head which contains the ink and physically ejects the ink droplets onto the substrate or object; and a controller which dictates the individual locations where the droplets are ejected.

A typical print head consists, in part, of an ink jet nozzle and two electrically charged plates. The electrically charged plates are parallel to one another, and separated by a small distance. The ink jet nozzle ejects single drops of electrically charged ink that travel between the two electrically charged plates on their way to the substrate. The electrical charge on the two plates develops a magnetic flux between the plates. As each ink drop leaves the nozzle, it is typically imparted with a particular voltage, which can vary between approximately −12 volts and approximately +300 volts. Depending on the charge on a particular electrically charged ink drop, it will be attracted toward one of the plates. If there is no attraction by either plate, the ink drop will travel parallel to the two plates. If the ink drop is positively charged, then it will be attracted toward the negatively charged plate, and its path will curve toward that plate. In this manner, the ink drop will strike the substrate closer to the attracting plate and further from the other plate. By varying the electric charge on the ejected ink drop, the drop may be directed to strike the substrate anywhere along an imaginary line on the substrate that is perpendicular to both of the plates.

In this arrangement, if both the substrate and the printer head are fixed with respect to one another, then the print head would only be able to print a row of dots on the substrate that combine to form a line perpendicular to both electrically charged plates. For the printer to be able to form letters, it is therefore necessary to have the substrate move in relation to the print head (or vice versa).

The printer forms a letter or other symbol by ejecting drops in vertical "slices" as the object to be printed on moves in front of the print head. These slices are simply drops of ink selectively placed on the imaginary vertical line between the plates, in locations which correspond to a portion of the letter or other symbol. As the print medium moves, vertical slices are printed directly adjacent to one another. Each vertical slice is called a stroke, and combines with each adjacent stroke to form a letter, character or other symbol.

The typical commercial printing arrangement fixes the print head alongside a moving substrate, or along a conveyor belt which transports objects to be printed on past the print head. As the substrate or object moves, the print head ejects droplets of ink, forming characters. Print heads are well known to those skilled in the art of printing systems. A typical ink jet printer head, on sale for several years, has already been described above.

A number of printing systems that use ink-jet printers are also known in the art. However, the inventors of the subject invention are not aware of any system that allows a single computer to control multiple ink jet printers through a single interface. Nor are the inventors aware of an ink jet printing system that is capable of printing in a direction other than the substrate or conveyor length, when the "length" refers to a direction parallel to the direction in which the substrate or conveyor travels. For example, the inventors know of no system capable of printing along a width, where the width refers to a direction perpendicular to and in the same plane as the substrate's line of travel; when the printers are to print on objects moving along a conveyor belt, the "width" refers to either (1) a direction perpendicular to the conveyor belt's line of travel in a plane parallel to the plane formed by the conveyor belt, or (2) a direction perpendicular to the plane formed by the conveyor belt. When printing on a substrate, the directions are shown by arrow L and W in FIG. 1. Likewise, arrows L and W in FIG. 2 indicate the directions of the length and width when printing on objects.

As noted above, to be able to print letters or other symbols on a substrate, there must be relative movement between the print head and the substrate. Since the substrate moves in the direction of its length, other systems are able to print a string of letters, words or symbols in that direction. By rearranging the locations in which the droplets are placed, these systems can also orient each character so that it faces in the direction of the width of the substrate; that is, the systems can print a short line of characters extending across the width of the substrate. However, since there is no relative movement between the print head and the substrate along the width, a single print head cannot print a string of more than a few characters in the direction of the width.

Likewise, when printing on an object, there must also be relative movement between the print head and the object. The object moves along a conveyor belt in the direction of the length. Other systems that print a string of letters, words or symbols in the direction of the length are known in the art of printing systems. By rearranging the locations in which the droplets are placed, these systems can also orient each character so that it faces in the direction of the width of the object. However, since there is no relative movement between the print head and the width of the object, a single print head cannot print a string of more than two or three characters in the direction of the width.

In addition, because each print head is only capable of printing a single color of ink at any one time, it is impossible for a single printer to create a character or other symbol using a plurality of colors. The present invention permits a personal computer to control a plurality of printers, each containing a different color ink, so that colors may be overlayed to create a multicolor character or symbol.

It is a principal object of the invention to provide a new printing system for printing along a direction other than the length of the printing medium.

It is a further object of the invention that the above be accomplished under the control of a single computer, preferably a personal computer.

More specifically, it is an object of the invention to provide a printing system that uses more than one ink-jet printer, where all the printers are controlled by a single personal computer through a single interface on the computer.

SUMMARY OF THE INVENTION

In a preferred embodiment of the present invention, a personal computer directs and controls timing and sequencing of the printers. The print heads are staggered along the length of the substrate or conveyor belt and each print head prints one or more characters of a given word. As the incomplete word travels beneath each print head, another character or characters will be added, and in this manner a word is created along the width of the substrate.

In another facet of the invention, the print heads are staggered along the length of the substrate or object. Each print head is aligned so that it is capable of printing in the same location on the substrate or object as that location passes beneath the print head. Each print head is loaded with a different color ink. The personal computer directs and controls the timing of the plurality of printers so that each print head will eject a different color ink thereby precisely overlaying the colors and creating a multicolor character or symbol.

Another facet of the invention provides a communication board, here called the direct ink drop interface board, which is inserted into each printer and permits each printer to communicate with a single computer through a single interface on the computer. In a preferred embodiment, the communication boards of each printer are each connected to a common bus that is in turn connected to an interface on the controlling computer.

In another facet of the invention, the communication boards each employ a strobing scheme to identify which printer is to communicate with the computer over the shared common bus at any particular instant in time. The strobing scheme enables much greater throughput rates than is possible with more traditional addressing schemes.

The invention contemplates that the communication boards that have been supplied with power and are connected to the common bus will supply any other communication board with power if it is connected to the bus and has not been turned on.

Also in the preferred embodiment, a position sensor determines positions of print locations. The sensor generates a signal that is sent to the communication board and then to the computer. This signal allows the computer to determine when the print location is passing beneath a print head.

Other objects, features and advantages of the invention will become apparent upon reading the following detailed description and upon reference to the drawings. Throughout the drawings, like reference numerals refer to like parts.

DESCRIPTION OF THE PREFERRED EMBODIMENT

While the invention will be described in connection with a preferred embodiment, it will be understood that it is not intended to limit the invention to this embodiment. On the contrary, it is intended to cover all alternatives, modifications, and equivalents as may be included within the spirit and scope of the invention as defined by the appended claims.

Figure 1:
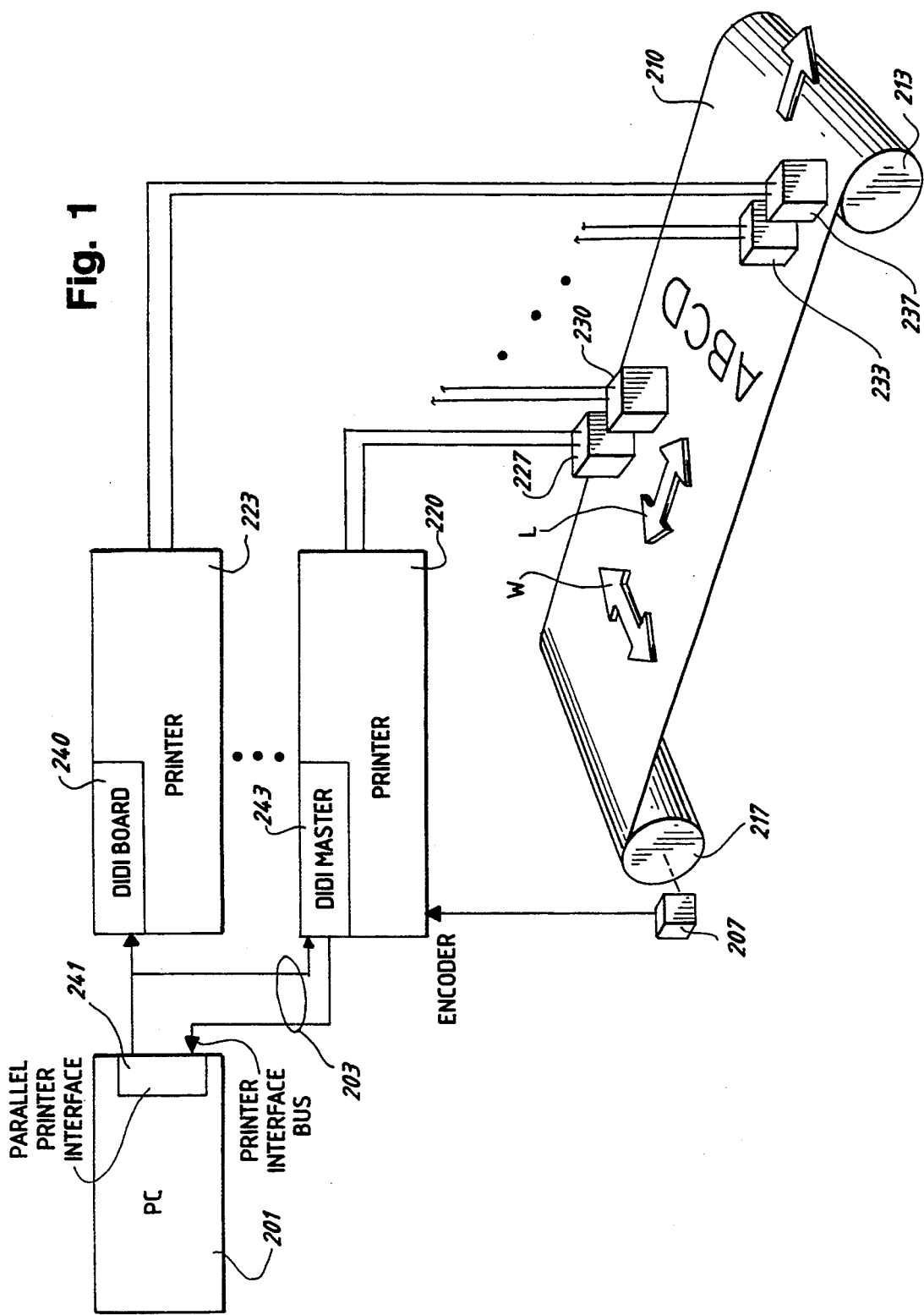
FIG. 1 is a plan view of a printing system which includes an embodiment of the invention, where the media to be printed on is a substrate passing from one roller to another roller.
Figure 2:
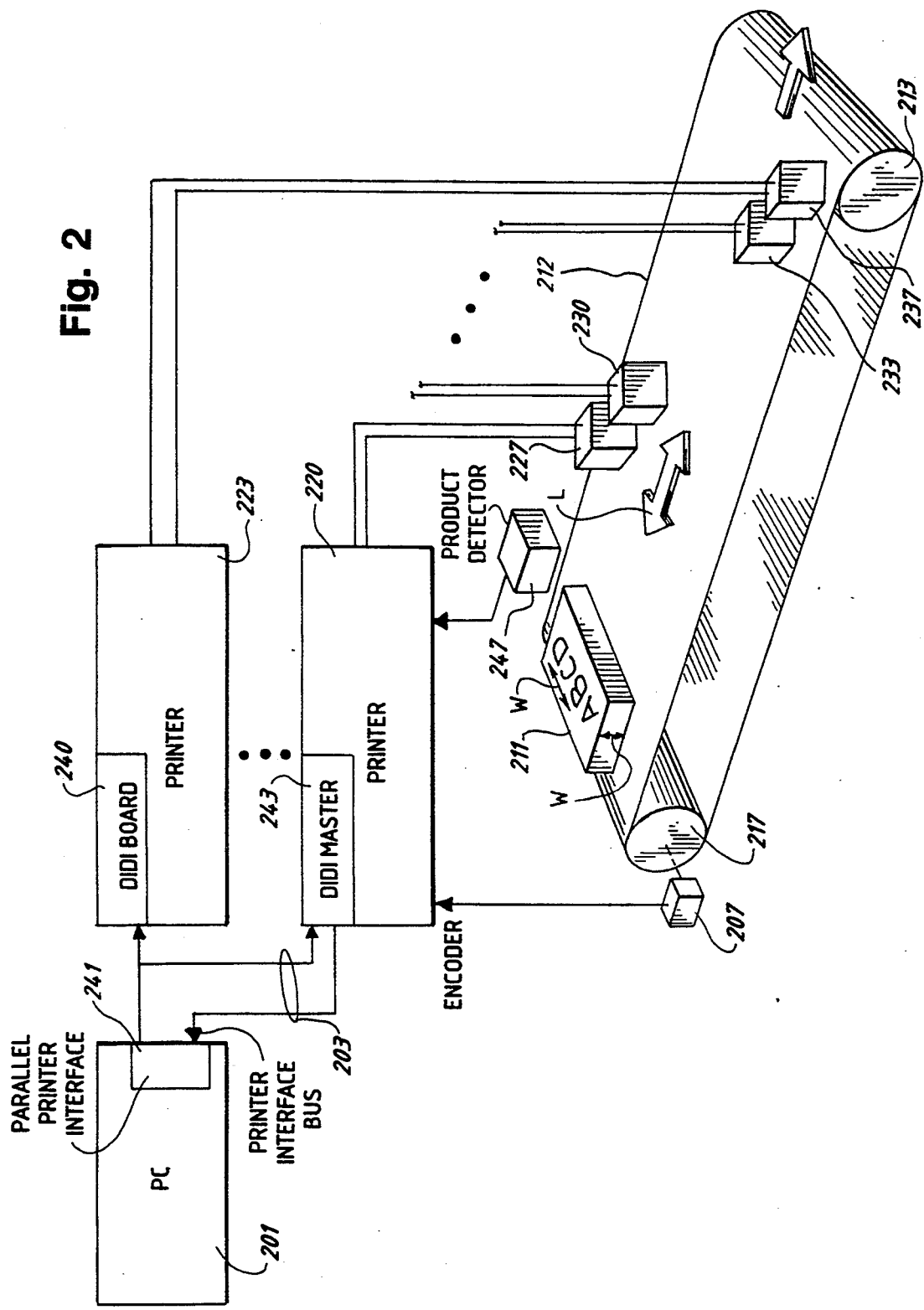
FIG. 2 is a plan view of the printing systems including the invention where the media to be printed on is an object travelling along a conveyor belt.

FIGS. 1 and 2 show a general physical layout of the novel system. To permit a single personal computer 201 to control more than one ink-jet printer 220-223 in accordance with the invention, DIDI boards 240-243 are provided. Here, each of these boards is installed in a printer 220-223.

It is another object of the invention to provide a system which prints across the width (W) of the substrate 210 or the underlying objects 211. This aspect of the invention is accomplished by arranging the printheads 227-237 in an echelon formation in the same plane as shown in FIG. 1.

It is another object of the invention to provide a printing system that permits a single personal computer 201 to control more than one printer 220-223 through a single interface 241 on said computer. To accomplish this object, DIDI boards 240-243 are provided. Here, these boards are each installed in a printer 220-223.

Yet another object of the present invention is to provide a printing system wherein one of the plurality of printers 220-223 can provide power to those components on a DIDI board 240-243 of another printer that are connected to a common printer interface bus 203 to which each printer 220-223 is connected. This aspect of the invention is accomplished by powering those components of each DIDI board 240-243 that are connected to the common printer interface bus 203 by using the VB supply circuit 308 through the printer interface bus 203.

I. Computer Control

The computer 201, shown in FIG. 1 and in FIG. 2, controls the entire printing operation. It is responsible for the timing and sequencing of the printers 220-223, downloading stroke data to the individual printers, and issuing the individual print commands.

A typical print sequence is as follows. The computer 201 first sends each printer stroke data over the printer interface bus 203 that corresponds to the stroke the printer is to print. If there are eight printers, the computer will first send stroke data to a first printer, then to a second printer etc., until each of the printers has received its stroke data. Then the computer 201 issues a print command over the PRT STB line 147-A on the printer interface bus 203 to all the printers and the stroke data is printed. By monitoring the signal from the encoder 207, the computer 201 is able to determine the position of the print medium and thereby determine the appropriate stroke data to send to a particular printer in order to produce a particular letter or symbol. This process is then repeated with different stroke data. For example, to print a solitary line along the width of the substrate, the computer would first load the first printer 220 with stroke data corresponding to a line. The remainder of the printers would receive stroke data that corresponds to a blank, so that no ink is ejected. When the computer 201 issues a print command over the PRT STB line 147-A, the print head 227, attached to the first printer, would print its portion of the line along the width. The remaining print heads 230–237, each attached to a corresponding printer, would not eject ink since each had received a blank. Then, until this portion of line passed by the second print head 230, all of the print heads would receive blank data, and thus none would eject ink after receiving the next print command over the PRT STB line 147-A on the printer interface bus 203. When the line reaches the second print head 230, the computer 201 would send stroke data corresponding to a line to the second printer. Each of the remaining printers would receive blank data. When the computer issued the next print command, the second print head 230 would print its corresponding section of the line. Since the remaining printers had each received blank data, at this time none of the remaining printers would eject ink to contribute to the line. This does not necessarily mean that they are not printing. It is possible that the first print head 227 could be simultaneously beginning a second vertical line. Thus, when the second print head 230 receives stroke data corresponding to its section of the line, the first print head 227 could receive stroke data corresponding to a new line. When the next print command issued over the PRT STB line 147-A, both print heads 227, 230 would print, but only the second print head 230 would be contributing to the original line. In this manner, each of the print heads 227, 230 could be printing simultaneously, although each would necessarily be contributing to a different line or word. By loading the correct stroke data, within the correct printer at the correct time, the system is able to print along the width of the substrate.

By arranging the print heads so that each print head can print in the same print location as that location passes beneath the print head, the above print sequence can also be used to print multicolor characters or symbols. For example, to print a multicolor character or symbol, the individual print heads are loaded with different color inks. Then, the computer would first load the first printer 220 with stroke data corresponding to that portion of the symbol that is to be printed in the first color ink. The remainder of the printers would receive stroke data that corresponds to a blank, so that no ink is ejected. When the computer 201 issues a print command over the PRT STB line 147-A, the print head, attached to the first printer, would print its portion of the symbol. The remaining print heads 230–237, each attached to a corresponding printer, would not eject ink since each had received a blank. Then, until the incomplete symbol passed by the second print head, all of the print heads would receive blank data, and thus none would eject ink after receiving the next print command over the PRT STB line 147-A on the printer interface bus 203. When the symbol reaches the second print head, the computer 201 would send stroke data corresponding to that portion of the symbol to be printed in the color of ink that was loaded in the second print head. Each of the remaining printers would receive blank data. When the computer issued the next print command, the second print head would print its corresponding portion of the symbol, Since the remaining printers had each received blank data, at this time none of the remaining printers would eject ink to contribute to the symbol. This does not necessarily mean that they are not printing. It is possible that the first print head could be simultaneously beginning a second symbol.

Thus, when the second print head receives stroke data corresponding to its portion of the symbol, the first print head could receive stroke data corresponding to a portion of a new symbol. When the next print command issued over the PRT STB line 147-A, both print heads would print, but only the second print head would be contributing to the original symbol. In this manner, each of the print heads could be printing simultaneously, although each would necessarily be contributing to a different symbol or character. By loading the correct stroke data, within the correct printer at the correct time, the system is able to overlay different colors on the same symbol and thereby print a multicolor character or symbol.

To determine the location of any point on the substrate or conveyor, an encoder 207 signal is fed back to one of the printers 220 over the ENCODER OUT line 142-D on the printer interface bus 203. The printer then returns the signal to the personal computer 201, which monitors the encoder signal on the ENCODER OUT line 142-D to determine the location of individual points on the web or conveyor. The computer 201 can then determine when to download the stroke data to each printer 220–223.

II. Connectors and Strobe Addressing

As shown in FIG. 1 and in FIG. 2, a preferred embodiment of the present invention uses a standard parallel printer interface 241 on the personal computer 201 to connect the printers to the computer. This printer interface 241 was originally designed by the manufacturer of the personal computer 201 so that the personal computer 201 could communicate with a single printer. The present invention, however, allows the personal computer 201 to control up to at least eight printers (220–223) through the parallel printer port 241.

Although the preferred embodiment uses software to control the parallel interface, it can be seen that one skilled in the art could readily devise a hardware equivalent of the software and implement it through an expansion slot in a personal computer 201 to communicate with the DIDI boards 240–243.

Currently, a standard parallel printer interface 241 contains twenty five (25) lines. Eight of the lines on the printer interface are data lines that transmit stroke data and control data, nine lines are control and handshake lines, and the remaining eight are grounded and act as a shield for the other signals. Throughout the remainder of this discussion, this connection will be referred to as the "printer interface bus" 203.

In a preferred embodiment of the current invention, the printer interface bus 203 is connected to each of the printers to be used for a given printing operation. Thus, each of the eight data lines PCD01–PCD07 and each of the control lines is connected to each of a plurality of printers. Because the data lines PCD01–PCD07 are connected to each printer, and because only a small number of control lines exist, the present invention required a novel scheme by which the personal computer could notify a particular printer to read data from the data lines. This scheme is the "strobing" system described below.

Figure 4:
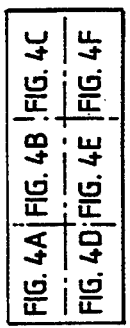
FIGS. 4A, 4B, 4C, 4D, 4E and 4F are is a schematics of the communication board of the present system. For convenience, the reference numerals referring to elements shown on any sheet of FIG. 4 will be appended with the individual sheet letter. For example, 110-B will refer to a switch 110 and the B will indicate that it can be found in FIG. 4B.
Figure 4A:
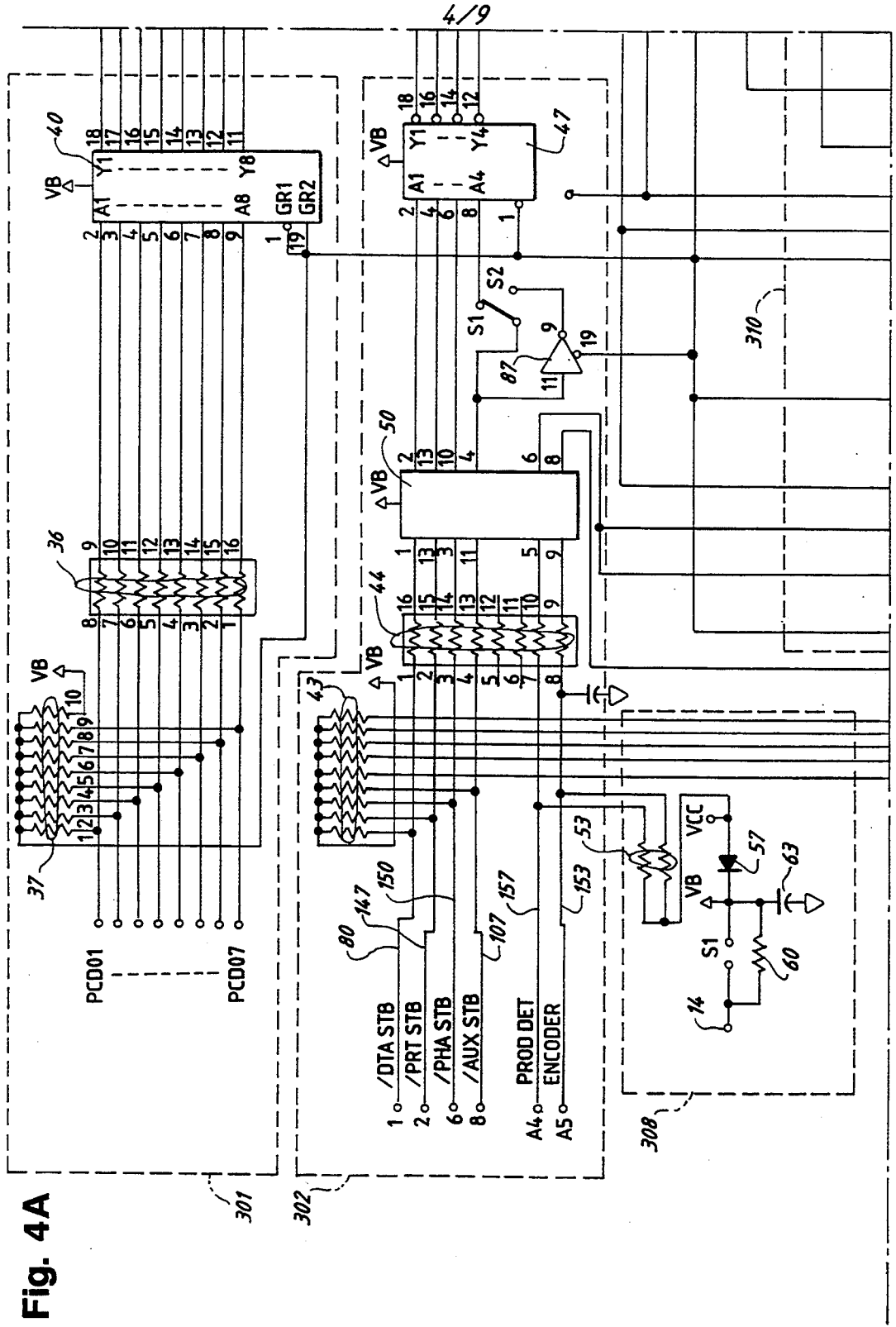

As shown in FIG. 4A, the DIDI board supports four strobe signals: a Data strobe (DTA STB) 80-A, a Print Strobe (PRT STB) 147-A, a Phase Strobe (PHA STB) 150-A, and an Auxiliary Strobe (AUX STB) 107-A. The DTA STB 80-A and PHA STB 150-A signals combined are sent in blocks of up to sixteen. Within each block a particular strobe signal is identified by the order in which that strobe is sent within the block. Thus, each of the strobes is numbered one through up to sixteen. Each DIDI board 240-243 counts the number of combined DTA STB 80-A and PHA STB 150-A strobes that are sent between the print commands that each DIDI board 240-243 receives over the PRT STB lines 147-A. Once a print command is issued via the PRT STB line 147-A, then a new block starts with strobe number one.

Prior to beginning a print sequence each of the plurality of printers 240-243 must be initialized. This accomplishes two things. First, it allows the computer to assign a strobe number (or range of strobe numbers) to each printer 220-223. These strobe numbers determine when the printer will read data from the data lines PCD01-PCD07 (described below). Second, it allows the computer to designate a "master" printer that will provide it with encoder data.

Referring to FIG. 4, the initialization is described here functionally, and is described in more detail below. Each printer 220-223 contains a rotary switch 110-B, DIP switch, or similar device on a DIDI board 240-243. This switch contains at least eight settings and is shown on FIG. 4B as 110-B. To initialize a printer 220-223, the operator must first manually set the switch 110-B to one of the at least eight available positions on the switch. When the computer 201 subsequently activates the AUX STB 107-A line on the printer interface bus 203, each DIDI board 240-243 will compare the signals appearing on the first three data lines PCD01-PCD03 of the printer interface bus 203 to the specific signal generated by the rotary switch 110-B setting on that particular DIDI board 240-243. When the signals on the three data lines PCD01-PCD03 are the same as the signals generated by the rotary switch 110-B for a particular DIDI board 240-243, that DIDI board will read data from the fourth through sixth data lines PCD04-PCD06. These data provide control information to the DIDI board 240-243, specify the strobe range, specify which of the plurality of printers 220-223 will act as the master printer, and specify various outputs of the board. By setting each rotary switch 110-B to a different setting, each printer 220-223 will read only that control data intended for it. In this manner, the printer interface bus 203 can be used to initialize each one of the plurality of printers 220-223.

In an alternative embodiment, the rotary switch 110-B contains at least sixteen settings. In this embodiment, one of a plurality of printers 220-223 that has its rotary switch 110-B set to position 8 will receive the same data as a printer that has its rotary switch 110-B set to position zero. Thus, the printer will have the same strobe range register values and control data as the printer set to switch position zero, and therefore will print the exact same stroke data as the printer set to switch position zero. Likewise, a printer set to position 9 will receive the same data and print the identical strokes as a printer set to position 1. This correspondence between printers continues up to switch selection HEX F corresponding to a printer that has its switch 110-B set to position 7. By doing this, the system enables two printers to print the identical strokes, and therefore simultaneously print the identical word, symbol or character on two sides of a substrate 210 or object 211, or in two different locations on the substrate 210 or object 211.

After initialization, and once the print sequence begins, each of the plurality of printers 220-223 keeps track of the current strobe number. When the current strobe number is within the range of strobe numbers that was assigned to an individual one of the plurality of printers 220-223 during initialization, the DIDI board within that printer will signal the printer to read the stroke data that has been latched from the data lines PCD01-PCD07. If the current strobe number has been assigned to another of the plurality of printers, then the printer will ignore the stroke data that has been latched by the DIDI board. For example, if a printer 223 is assigned strobes three and four then it will ignore the latched data during the first two strobe signals, will read the latched stroke data during the third and fourth strobe signals, and then will ignore the remaining latched stroke data until the computer 201 issues a print command over the PRT STB line 147-A on the printer interface bus 203. Once a print command has been issued, the DIDI board will again count strokes, starting with one. In this manner, each printer will read only that character data intended for it.

III. The Direct Ink Drop Interface Board

Figure 3:
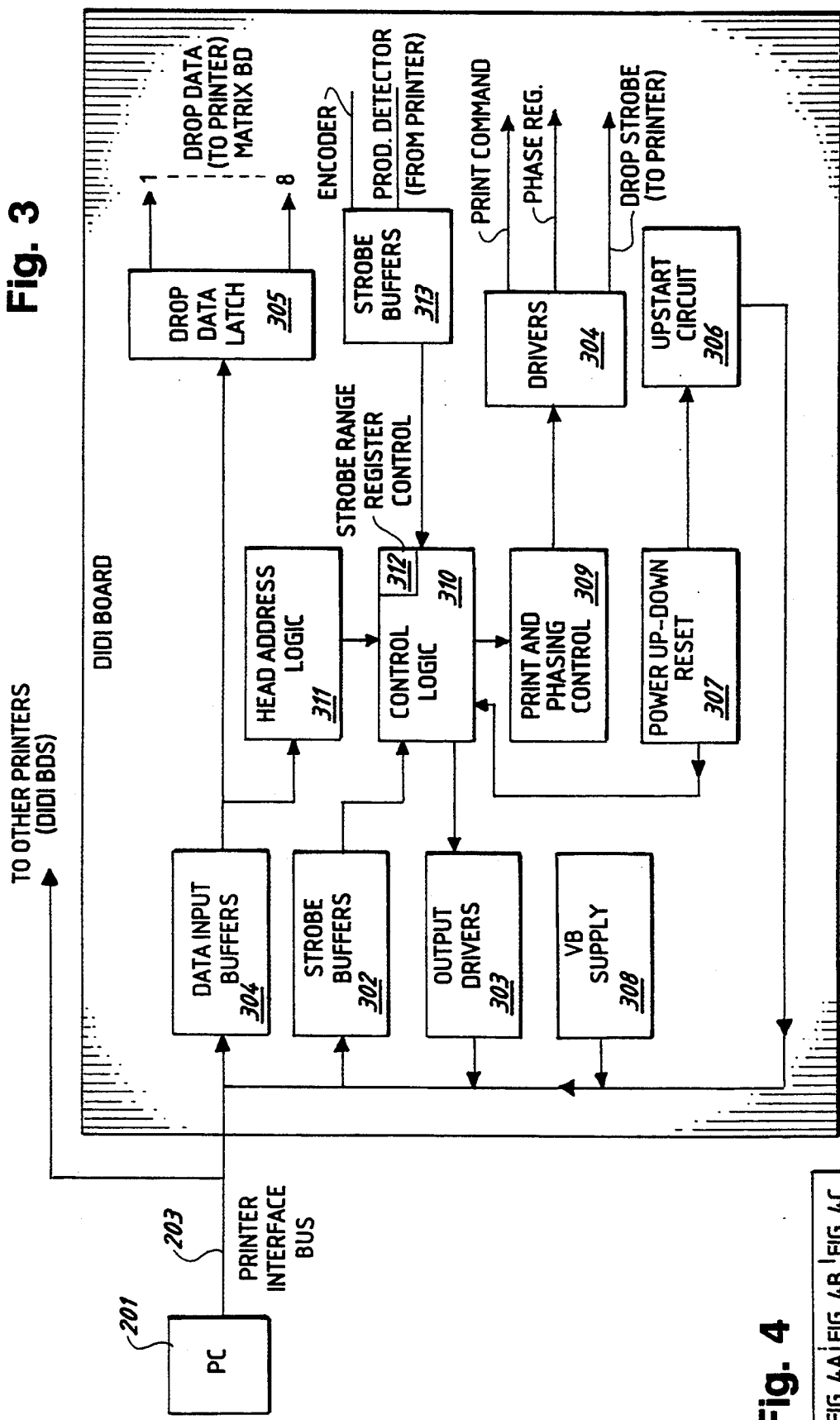
FIG. 3 is a functional block diagram of a communication board made according to the present invention.

Each one of a plurality of DIDI boards 240-243 is inserted in one of the plurality of the printers 220-223 in place of a standard serial board to enable printing along the width of a substrate 210 or an object 211 travelling along a conveyor 212. This subsection will describe the functions of a DIDI board 240-243 and its interaction with one of the plurality of printers 220-223 and computer 201. FIG. 3 shows a functional block diagram of the DIDI board. The following description first discusses the basic functions of the board, which include the data input buffers 301, strobe buffers 302, output drivers 303, VB supply 308, head address logic 311, control logic 310, print and phasing control 309, power up/down reset 307, upstart circuit 306, drop data latch 305, encoder/detector buffer 313, and output drivers 304.

As can be seen from FIG. 3, the printer interface bus 203 is connected to those portions of each of the plurality of DIDI boards 240-243, that function as the data input buffers 301, the strobe buffers 302, the output drivers 303, and the VB supply 308, on each DIDI board. The strobe buffers 302 are connected to the control logic 310 to provide the control logic 310 with control data received from the personal computer 201 over the printer interface bus 203. The data input buffers 301 provides head address data to the head address logic 311, and also provides the drop data latch 305 with strobe data that is sent to the printer. The power up-down reset circuit 307 provides the upstart circuit 306 and the control logic 310 with information about whether the DIDI board is receiving enough power to operate. The strobe buffers 313 receive signals from the encoder 207 and product detector 247 and transmit these signals through the control logic 310 and output buffers to the personal computer 201 over the printer interface bus 203. Finally, the print and phasing control circuitry 309 receives control information from the control logic circuitry 310 and transmits print commands, phasing requests and drop strobe signal to the printer through the driver circuitry 304.

a. Power-Up/Down Reset Circuit (307)

This circuit 307 monitors the available 5 volt supply in the printer system and forces the printer into reset when the voltage is at a level that cannot guarantee reliable performance of the system. A reset may also occur when first powering up a printer 220-223. In either case, this circuit will generate a reset signal, which is sent to both the control logic circuitry 310 and to the printer 220–223 to prevent printer operation while the VCC power supply is unreliable. The personal computer 201 that is coordinating the printing will also receive a signal indicating that the printer is in reset. The Power-Up/Down reset circuit 307 contains an R-C circuit comprised of a resistor 6-E and a capacitor 18-E, to delay the release of the reset on power-ups and to insure that proper supply voltage is present upon release from the reset.

Figure 4B:
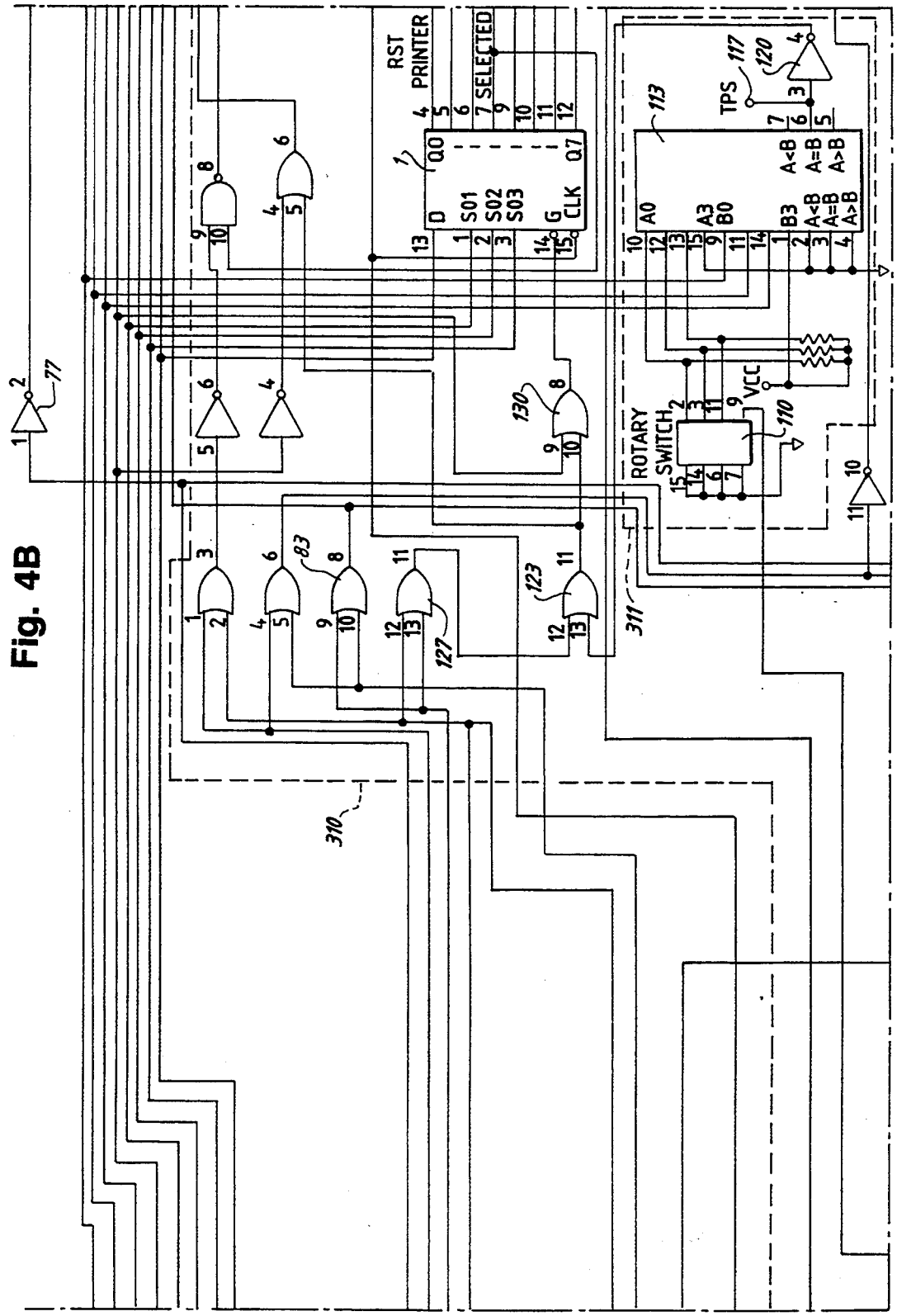

As described above, there are at least two ways in which a DIDI board 240–243 will enter a RESET. First, referring to FIGS. 4A–4F, when a DIDI board 240–243 receives the appropriate control signals during initialization, the integrated circuit 1-B as shown in FIG. 4B sets the RST PRINTER output on line 4 of the integrated circuit 1-B to a high logic level. The output line 4 of the integrated circuit 1-B will remain high only until the particular DIDI board has performed the reset sequence described below. Thus, in effect, the RST PRINTER output on line 4 only remains high for a brief, transitory period. The reset sequence begins when the RST PRINTER output reaches a high logic level, which in turn activates the base of a transistor 3-E, thereby opening VCC to ground through a resistor 6-E. The signal at the test point 9-E is at a logic level low. Two invertors 12-F, 15-F shown in FIG. 4F buffer the power up-down reset circuit 07 from the RESET signal 62-F sent to the printer 220–223. The output of this second invertor is the RESET signal 62-F and is at a logic level low, indicating to a printer 220–223 and the personal computer 201 that the DIDI board 240–243 is currently in a reset. Once the RESET PRINTER signal coming from line 4 of the integrated circuit 1-B returns to a logic level low, the current to the base of the transistor 3-E is insufficient to allow current to pass from the collector to the emitter. The supply voltage VCC is applied through resistor 6-E and capacitor 18-E to ground. The voltage at the test point 9-E will not immediately reach VCC. Instead, the voltage will rise until capacitor 18-E is fully charged and the voltage across it approaches VCC. When the test point 9-E reaches a logic level high the RESET signal 62-F at the output of the second invertor 15-F will be a logic level high, indicating to a printer 220–223 and personal computer 201 that the DIDI board is no longer in RESET. The RESET signal is not only an output of the DIDI board 240–243, but is also used internally to signal various components (21-F, 24-C, 27-C, 30-C, 1-B and 38-D) that the board is in RESET. As can be seen from FIG. 4F, the RESET signal is sent to the $\overline{CL}$ signal on a FLIP FLOP 21-F, the $\overline{LOAD}$ input of the integrated circuit 24-C, the $\overline{OC}$ signal on LATCH 27-C, the OC signal on LATCH 30-C, the $\overline{CLR}$ signal on the integrated circuit 1-B, and to the base of a transistor 38-D. As can be seen from the FIGS. 4A–4F, this signal prevents each device from reading data from the printer interface data lines, and performing logic operations during the period when the DIDI board 240–243 is in RESET.

$\overline{RESET}$ is also active, independent of the RESET PRINTER signal on line 4 of integrated circuit 1-B, when the supply voltage VCC drops too low. The integrated circuit 2-E is a voltage monitor device. As can be seen from FIG. 4E, the supply voltage VCC is an input to line 2 of the voltage monitor 2-E. When the supply voltage VCC falls below a certain prescribed value, line 1 of the voltage monitor is opened to ground. This causes test point 9-E to become a logic level low. The RESET signal 62-F also becomes a logic level low indicating to the personal computer 201 that one of the DIDI boards 240–243 is currently undergoing a reset.

b. Data Input Buffer Circuit (301)

As shown in FIG. 3 and FIG. 4A, this circuit is directly connected to the eight data lines (PCD01–PCD07) on the printer interface bus 203. Each data line PCD01–PCD07 is tied to the voltage source VB through a resistor 37-A, which provide input pull up protection for the CMOS input buffer 40-A. Additionally resistors 36-A are provided for input series protection for the CMOS input buffer 40-A. CMOS components are known to have high impedance inputs. Thus, the input pull up feature combined with the high impedance inputs A1–A8 of the CMOS input buffer 40-A cause only minimal loading of the host computer outputs received over the data lines PCD01–PCD07 o This allows up to at least eight DIDI boards 240–243 to be connected to the parallel interface bus 203. The outputs of the CMOS input buffer 40-A then supply the control logic circuitry 310 and the drop data latch circuitry 305 (see description below) with the data.

c. Strobe & Control Input Buffer Circuit (302)

As can be seen in FIG. 3 and FIG. 4A, this circuit 302 is directly connected to the data strobe (DTA STB) 80-A, the printer strobe (PRT STB) 147-A, the phase strobe (PHA STB) 150-A and the auxiliary strobe (AUX STB) 107-A lines on the printer interface bus 203 coming from the personal computer 201. Like the data input buffer circuit 301, this circuit 302 provides input pull up resistors 43-A and series protection resistors 44-A for the CMOS input buffer 47-A. The pull up protection feature of this circuit 302 combined with the high impedance inputs A1–A4 of the CMOS buffer 47-A cause minimal loading of the personal computer 201 outputs which in turn allows up to at least eight DIDI boards 240–243 to be connected to the parallel interface bus 203. The strobe inputs 80-A, 147-A, 150-A, 107-A, 157-A, 153-A, are connected to a Schmidt trigger device 50-A that provides hysteresis protection to prevent false strobe detection due to noise or transmission line effects.

This circuit 302 also receives the product detector 157-A (PROD DET) and encoder signals 153-A (ENCODER) from the product detector 211 and/or the encoder 207. It provides input pull up and series protection resistors 53,A for these inputs similar to those that are present in the strobe inputs described above. The circuit 302 also uses the Schmidt trigger device 50-A for these signals to provide hysteresis protection to prevent false detection, and also to buffer the CMOS input buffer 47-A from the shaft encoder 207 and product detector 211 sensors.

d. VB SUPPLY (308)

To function properly, each of the plurality of printers 220–223 that is connected to the printer interface bus 203 must have power available to its input devices. In many printing operations, however, not all printers 220–223 connected to the printer interface bus 203 will be needed. If power was not available to these printers 220–223, they would cause faulty signals to appear on the printer interface bus 203. The VB supply circuit 308 solves this problem by powering each of the components of each DIDI board 240–243 that are directly connected to the parallel interface 241 of the personal computer 201 through the printer interface bus 203. The VB circuit 308 accomplishes this by relying on the printers 220–223 that are turned on to supply power to the VB supply 308 of the unpowered DIDI boards 240–243 in the system. This in turn supplies power to each of those components on the DIDI board that are directly connected to the printer interface bus 203. The VB supply 308 therefore prevents the degradation of data and control signals that would otherwise result if an unpowered printer 220–223 were connected to the interface bus.

To accomplish this using a standard 25 line parallel printer cable, the VB supply is transmitted on one of the lines that is normally tied to ground by the computer 201. To prevent the computer from grounding the VB supply 308, the connector pin corresponding to that line must be removed from the parallel printer connector that is directly connected to the parallel printer interface 241.

As can be seen in FIG. 4A, the VB power supply circuit 308 consists of a diode 57-A, a resistor 60-A, and a capacitor 63-A. The power supply VCC is connected to the VB circuit 308 through the diode 57-A which prevents the VB supply 308 from introducing current into the power supply VCC and the ENCODER 153-A and PROD DET 157-A signals. The resistor 60-A is placed between the diode 57-A and connector 14-A on the parallel interface bus 203. The capacitor 63-A is connected to ground. This R-C circuit arrangement filters unwanted transients from the VB supply 308. The VB supply 308 is either transmitted to, or received from, other printers through connector 14-A. The printer interface bus 203 interconnects the VB supply 308 of each DIDI board 240–243 through connector 14-A to supply each DIDI board 240–243 connected to the printer interface bus 203 with power. The VB supply 308 is also used within the DIDI board 240–243 by various components through the VB supply lines as indicated in FIGS. 4A–4F.

e. Output Driver Circuit (304)

Figure 4C:
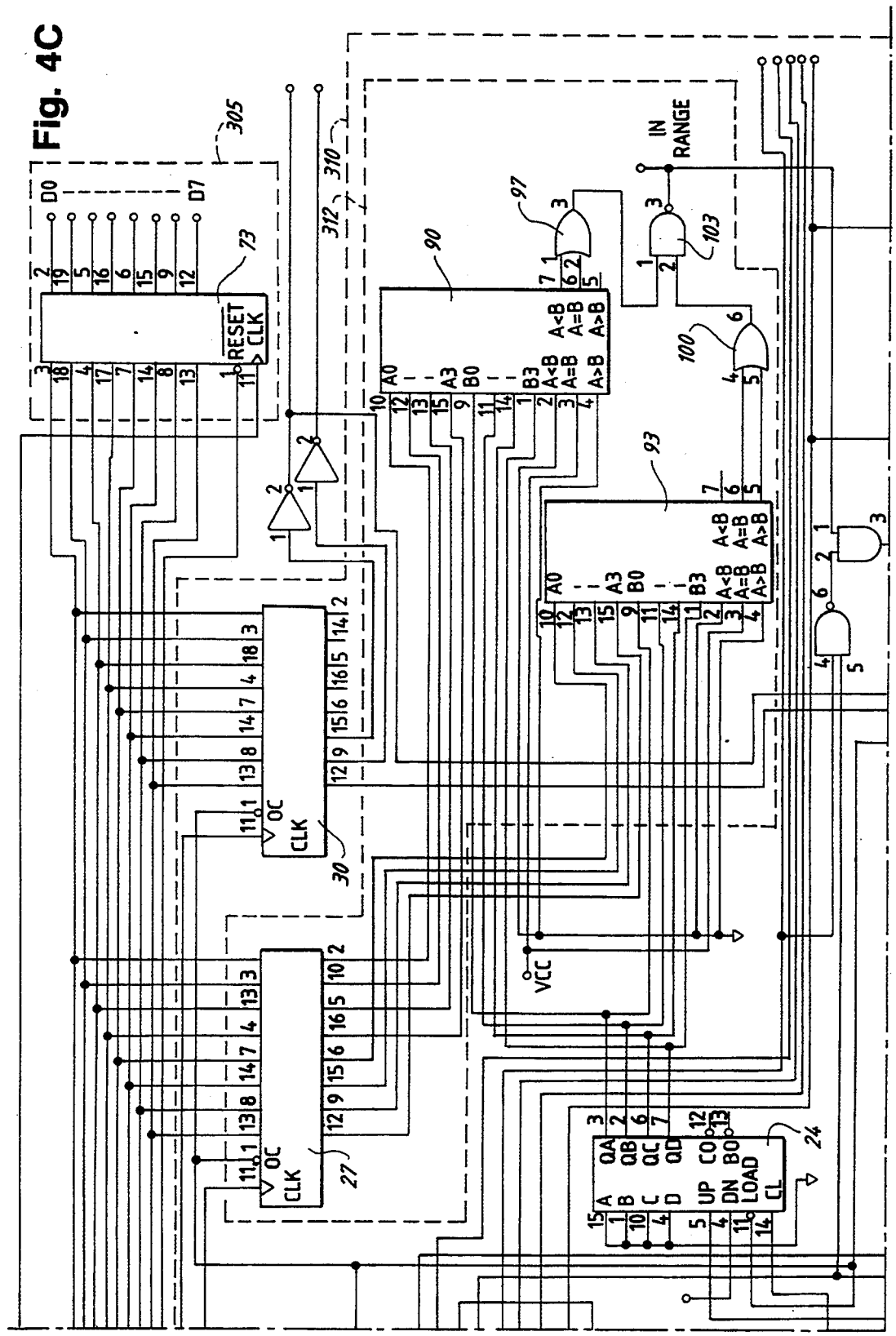
Figure 4D:
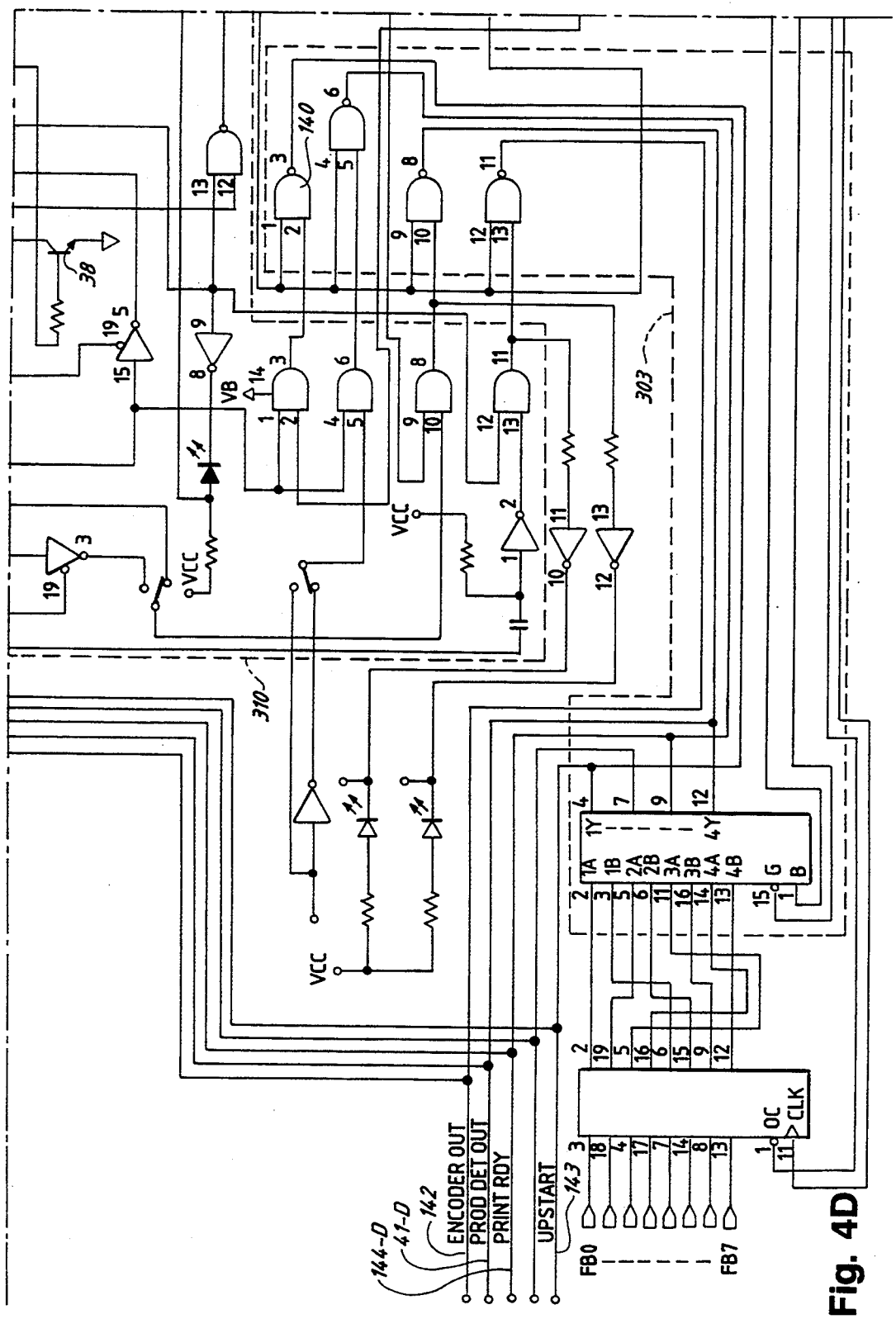
Figure 4E:
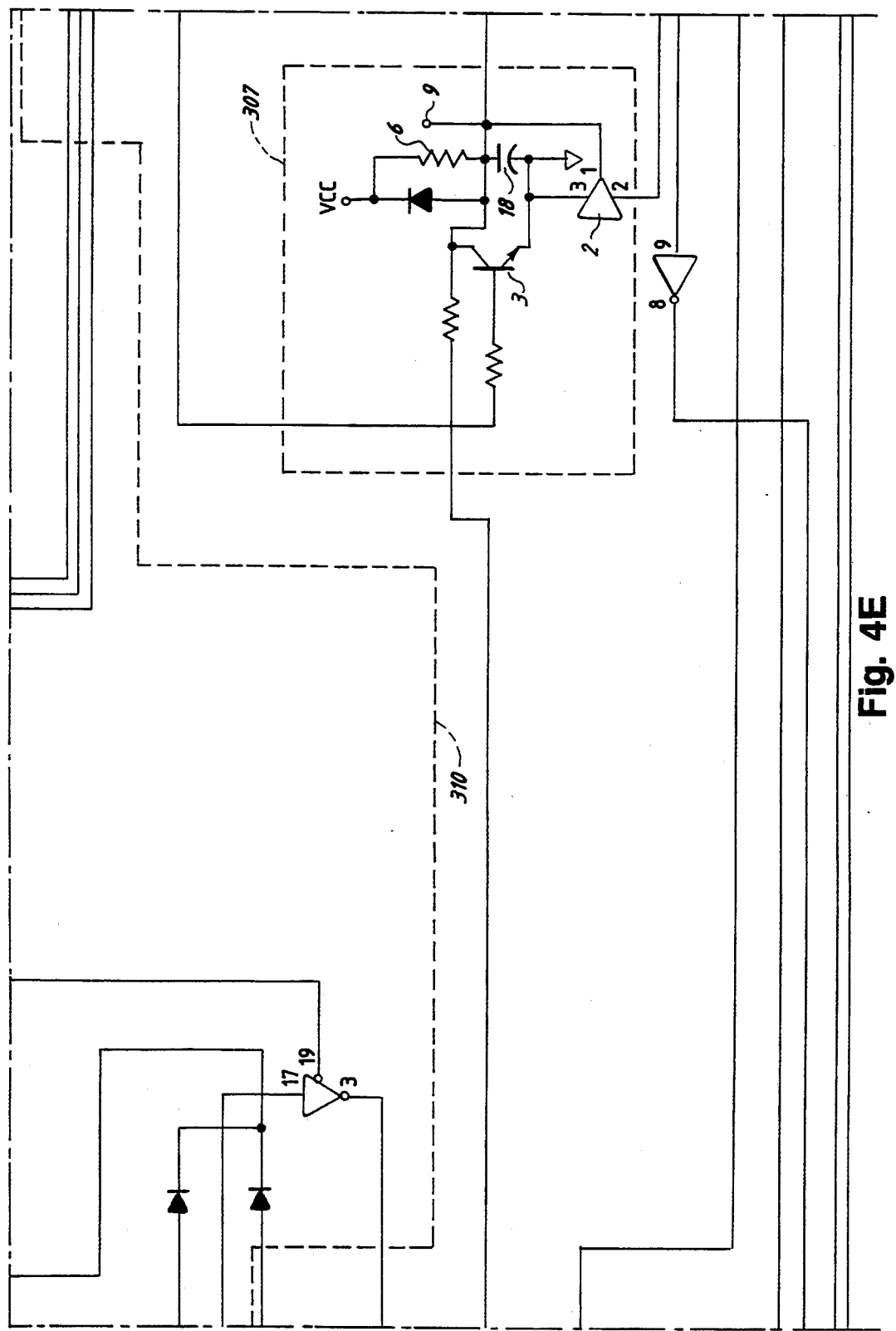
Figure 4F:
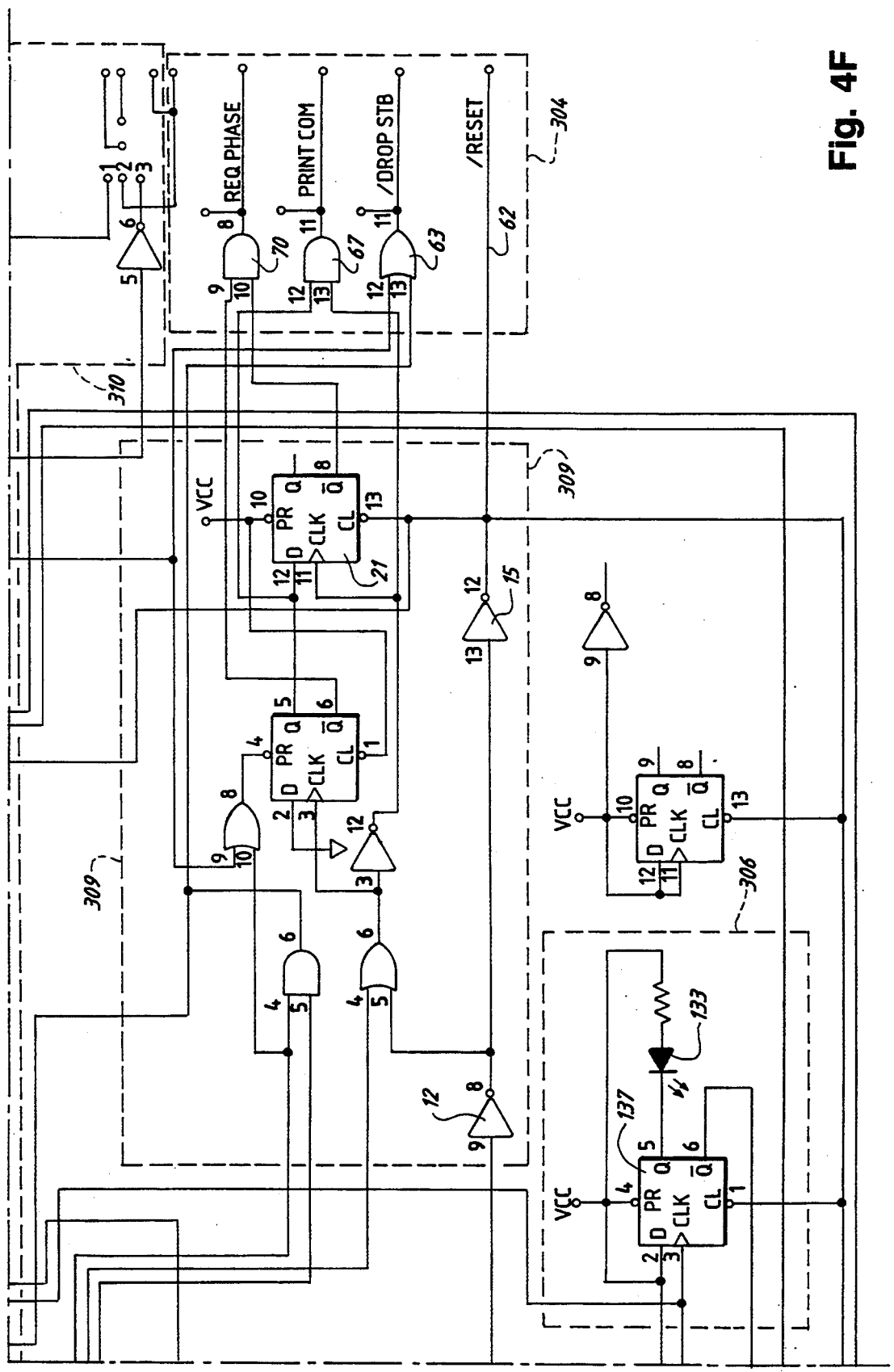

As shown in FIG. 3 and 4F, the output drivers 304 for the REQ PHASE, PRINT COM, and DROP STB signals connect directly to the printer interface bus 203. Each of the DIDI board drivers 63-F, 67-F, 70-F employ open drain outputs to return these signals to the personal computer 201. This allows the printer interface bus 203 to be used by multiple printers in a bus like arrangement.

f. Drop Data Output Latch Circuit (305)

The Drop Data circuit 305 directly interfaces with the printer 220–223. It transfers to the printer (e.g. 220) the data that the DIDI board 243 has read from the data lines PCD01–PCD07 of the printer interface bus 203. This data contains stroke data which dictates the exact locations where the print head 227 is to eject ink droplets. The printer 220 stores this data in memory until it receives a print command over the PRT STB 147-A of the printer interface bus 203, at which point it will issue instructions to the print head 227 to eject ink in the specified locations. As explained, the individual strokes then combine to form the characters or other symbols.

As shown in FIG. 4C, the Latch 73-C is connected to the CMOS input buffer 40-A as shown in FIG. 4A. The latch signals CLK and $\overline{OC}$ control the latching of data that appears on the inputs to the latch 73-C. When the CLK signal transitions from a low to a high and the $\overline{OC}$ signal is low, then the data appearing on input to the Latch 73-C will be latched. The latch 73-C CLK signal is received from the CMOS input buffer 47-A through an invertor 77-B. The input to the CMOS buffer 47-A that determines the CLK signal is the data strobe (DTA STB) 80-A from the printer interface bus 203. The latch signal $\overline{RESET}$ is connected to an OR gate 83-B whose inputs are dependent on the PHA STB 150-A signal and AUX STB 107-A signal on the printer interface bus 203. As shown in FIG. 4A, these signals determine the outputs Y3 and Y4 of the CMOS buffer 47-A. The output Y4 travels through a tri-state invertor 87-A and then to the input of the OR gate 83-B. As can be seen from the figure, the data is latched whenever the Data Strobe (DTA STB) 80-A signal transitions from low to high, and there is no active auxiliary mode (AUX STB) 107-A signal nor is there an active phase strobe (PHA STB) 150-A signal. Furthermore, when the $\overline{RESET}$ signal of Latch 73-C is at a logic level low, the data appearing on the latch 73-C outputs D0–D7 become all zeros.

g. Strobe Range Register Control Circuit (312)

This circuit 312 is within the control logic circuitry 310 depicted in FIG. 3. It allows each individual DIDI board 240–243 to read only the data which corresponds to the data/phase strobe intended for its printer. The personal computer 201 can send up to 16 strobes between print commands which in turn loads up to 16 different bytes of character information. To optimize speed there is no address information with the data bytes. Rather each DIDI board 240–243 is assigned to one strobe, or a range of up to four strobes, during which it will read data from the data lines PCD01–PCD07. For example, out of the sixteen available strobes, one printer 223 may be assigned strobe numbers three and four. It will monitor the number of strobe signals that have appeared on the data DTA STB 80-A and phase strobe PHA STB 150-A lines since the personal computer 201 sent the previous print command over the PRT STB 147-A line of the printer interface bus 203. During the first and second strobe signals, this printer 223 will not read data appearing on the drop data lines D0–D7. During the third and fourth strobe signals, the circuit will instruct the printer to read the data appearing on the drop data lines D0–D7. Then during the remaining strobes prior to the next print command, the printer 223 will again ignore the data appearing on the drop data lines D0–D7.

To instruct a DIDI board 240–243 which strobes have been assigned to its printer 220–223, the personal computer 201 must initialize the range registers 90-C, 93-C on each DIDI board 240–243. The range registers 90-C, 93-C in combination identify which strobes are intended for the individual DIDI board 240–243 and printer 220–223. Each of the range registers 90-C, 93-C hold one four bit value, which combined, identify the low limit strobe number and the hi limit strobe number. As strobes are issued by the personal computer 201, the DIDI board 240–243 instructs the printer 240–243 to read the data that appears on the output of the drop data latch 73-C only when the strobe sequence count falls between and including the low and hi limits. As explained above, as many as four drop pattern bytes can be loaded into each printer 220–223 by a DIDI board 240–243.

As shown in FIG. 4C, there is a strobe range register high limit 93-C and a strobe range register low limit 90-C. During the initialization of the printer 220–223, each of these registers 90-C, 93-C are set by the personal computer 201. The limit is read into inputs A0–A3 on each register 90-C, 93-C. These inputs are connected to the outputs of a latch 27-C, which latches the range register data appearing on the data lines PCD01–PCD07 of the printer interface bus and on the CMOS buffer 40-A during the initialization. This data is then stored in the range registers 90-C, 93-C. The current strobe number appears on the inputs B0–B3 of each range register 90-C, 93-C, which compare the stored limit value with the current strobe value and produce a signal based on the relationship of these values. These outputs, in conjunction with two OR gates 97-C, 100-C, and a NAND gate 103-C, produce an IN RANGE signal, sent to the OR gate 63-F within the driver circuitry 304 to signal the printer that the current strobe is within the strobe range of this printer. If current strobe is within the range of the printer and is a data strobe, then the printer 220–223 reads the data appearing on the outputs of the drop data latch 73-C.

h. Head Address and Control Register Circuit (311)

This circuit 311 monitors both the incoming data lines from the CMOS buffer 40-A and the incoming AUX STB 107-A line on the printer interface bus 203. When the Y1 through Y3 bits of the output of CMOS buffer 40-A equal the value of the rotary switch 110-B, and the alternate mode is active, then the data present at that time on the Y8 output of the CMOS buffer 40-A will be loaded, through the D input to the latch, into the addressable register designated by the address then appearing on Y5 through Y7 of the CMOS buffer 40-A data outputs. These eight addressable registers within the addressable latch 1-B are used by the control logic circuitry 310 to control miscellaneous DIDI board outputs, select a master DIDI board and enable the loading of the strobe range registers 90-C, 93-C of each DIDI board 240–243.

As can be seen in FIG. 4B, the rotary switch 110-B may be set to one of eight settings. The outputs (2, 3, 11, 9) of the rotary switch 110-B are connected to the inputs (A0–A2) of a comparator 113-B which compares the values on these inputs to the values appearing on the Y1–Y3 CMOS buffer 40-A outputs. When these values are equal, the comparator's output (corresponding to test point 117-B) will become a logic level high. This signal is input to an invertor 120-B whose output is the input to OR gate 123-B. The other input to this OR gate 123-B is the output of an OR gate 127-B whose inputs depend on the Auxiliary Mode (AUX STB) 107-A and the Phase Strobe (PHA STB) 150-A signals coming from the printer interface bus 203. When both inputs to the OR gate 123-B are low, the output is a logic level low. This output is an input to an OR gate 130-B. It can be seen that so long as this input is at a logic level low, the output of the OR gate 130-B depends on its other input. This input corresponds to output line Y4 of the CMOS input buffer 40-A. When Y4 is low, the output of the OR gate 130-B, and thus the input $\overline{G}$ of latch 1-B, are both low. Then so long as the $\overline{RESET}$ signal input to the latch 1-$b$ through the $\overline{CLR}$ signal input remains at a logic level high, the data appearing on the D input to the addressable latch 1-B will be stored in the register corresponding to the eight bit address appearing on the S01–S03 inputs of the addressable latch 1-B. It can be seen from FIG. 4B that the address appearing at the inputs S01–S03 correspond to the data appearing on the Y5–Y7 outputs of the CMOS buffer 40-A, and the data appearing at input D corresponds to the output Y8 of the CMOS buffer 40-A. This data represents control data that was described above and determines, among other things, which printer is the master, whether a particular printer has been selected for initialization, and whether the printer is in reset.

i. Print and Phasing Control Circuit (309).

This circuit 309 cooperates with the control logic circuitry 310 to allow the printer 220–223 to perform phasing functions. The circuit 309 does this by monitoring strobes within the range established by the strobe range registers 90-C, 93-C on the particular DIDI board 240–243. If all of the strobes within the range were phase strobes sent over the PHA STB line 150-A, then this particular printer 220–223 will have no stroke data to print upon receiving the upcoming print signal over the PRT STB line 147-A. The DIDI board 240–243 then issues a request for phasing over the REQ phase line output from the driver 70-F and the printer 220–223 can commence phasing. If a data strobe is received over the DTA STB line 80-A within the printer's assigned range of strobe numbers, then the REQ phase output from the driver 70-F is immediately canceled and no phasing will occur.

j. Upstart Circuit (306)

upon power-up this circuit 306 cooperates with the control logic circuitry 310 to generate a low active $\overline{UPSTART}$ signal to the personal computer 201. The signal is sent through the printer interface bus 203. It remains active within an individual printer, until the DIDI board has been selected and initialized by the personal computer 201. It will remain active on the printer interface bus 203 until all printers 220–223 connected to the bus 203 have been initialized. An $\overline{UP\ START}$ LED 133-F on the DIDI board 240–243 remains lit as long as the DIDI board 240–243 has not been selected and initialized since power-up.

As shown in FIG. 4F, the $\overline{Q}$ output of flip-flop 137-F is a logic level high until the DIDI board 240–243 has been selected by the personal computer 201. This signal is one of the inputs to AND gate 138-D. As can be seen from FIG. 4D, the other input to the AND gate 138-D depends on whether the printer 220–223 is in auxiliary mode. If the DIDI board 240–243 is not in auxiliary mode, then the other input will also be a logic level high. The output of AND gate 138-D will then be a logic level high. It can be seen that this signal is one input to NAND gate 140-D. The other input to NAND gate 140-D is connected to the collector of transistor 3-E in the power up/down reset circuit 307. This input depends on whether the DIDI board 240–243 is in reset. If the DIDI board 240–243 is not in reset, then this input signal will also be a logic level high. The output of the NAND gate 140-D would then be a logic level low. This signal is sent to the personal computer 201 as $\overline{UP\ START}$ and indicates to the computer 201 that the system has been initialized and is not in $\overline{RESET}$.

Once the DIDI board 240–243 has been initialized, the output Q3 of Latch 1-B transitions to a logic level high. The output Q of the flip-flop 137-F becomes a logic level high. Since the voltage on each side of the LED 133-F is the same, no current flows through the LED 133-F and it is no longer lit. The $\overline{Q}$ signal of flip-flop 137-F becomes a logic level low. It can be seen from FIGS. 4F and 4D that this causes the $\overline{UPSTART}$ signal on the printer interface bus to transition high, thus signalling the personal computer 201 that this DIDI board 240–243 is no longer in upstart mode.

It is not intended that the present invention be limited to the above described preferred embodiment. To the contrary, it is intended that this invention cover all alternatives, modifications and equivalents as may be included within the spirit and scope of the invention. By way of example only, there is here disclosed discrete digital circuitry for its control logic. A modification of this invention would be to substitute a suitable microprocessor, and perform identical logic operations through programming of the microprocessor.

IV. Software Control

The personal computer 201 employs software control to coordinate the operation and sequencing of the plurality of ink-jet printers 220–223. This software is shown in Appendix A.

The software uses outputs of the DIDI boards 240–243, including the encoder signal 142-D, upstart signal 143-D, the product detector output 141-D, and the printer ready signal 144-D, to control the timing and sequencing of the printer 220–223. The computer receives these signals through the printer interface bus 203 and the parallel printer interface 241.

The software begins a particular printing sequence by initializing each of the printers 220–223 as explained above. After initializing the printers, the software controls the downloading of stroke data to the individual printers. Once each printer has received its stroke data, the software monitors the encoder signal 142-D and the product detector signal 141-D, and at the appropriate time, commands the personal computer 201 to issue a print command over the PRT STB line 147-A of the printer interface bus 203. The printers then print the corresponding stroke data. The software then downloads the next set of stroke data and repeats the process described above.

APPENDIX A

```
PROGRAM MultiChannelWithInterrupts ;
{$DEFINE TimeOfFlight }
USES
    Dos, Crt, IBMstuff ;

CONST
    NumberOfHeads   = 2 ; { fixed ! can not change without modifying program }
    NumberOfChannels = 4 ; { fixed ! can not change without modifying program }

FontFile = '0600169.Fnt' ;
    { was '5x7_Fnt2.Dat'} { extracted from 2-line.mas and gryated all ways }

On = True ;   Off = False ;
{===========================================================================}
{ these constants are used for setting up the default modes.}
        Sideways  = On ;
        Foreward  = On ;
        Inverted  = Off;
        English   = On ;
InitialInterval  =  2 ; { one inch }
{===========================================================================}

{ TachsPerInch = 37 ; }{ just for testing time of flight }

{ TachsPerInch = 60 ; }{ 10 characters per inch., what I wanted.}
      TachsPerInch = 48 ;  {  8 characters per inch., what I got.}
        TachsPerCM = 24 ;  {  4 characters per centimeter. }

{ default head to head spacing }
      HeadOffset = 2.625 ; { in inches, note, the program.will determine the}
                          {. # of tachs because the count changes for metric}
                          { the width of the print head is 1 15/16 inches. }
                          { 2 15/16 inches = 2.9375 }
                          { 2  7/8  inches = 2.875  }
                          { 2 13/16 inches = 2.8125 }
                          { 2  3/4  inches = 2.75   }

{ 2 11/16 inches = 2.6875 }
                          { 2  5/8  inches = 2.625  }
                          { 2  9/16 inches = 2.5625 }
                          { 2  1/2  inches = 2.5    }
                          { 2  7/16 inches = 2.4375 }
                          { 2  3/8  inches = 2.375  }
                          { 2  1/4  inches = 2.25   }
                          { 2  3/16 inches = 2.1875 }
```

```
{ ================================================================== }
{ Metric Conversion : 1 inch = 2.54 CM ..... 1 CM = .39370079 inch   }
{ ================================================================== }
{ ENGLISH Tach is 60 pulses per inch (based on 10 char per inch),    }
{     then 1 tach = .0166667 inch or .0423333 CM                     }
{ METRIC : based on keeping print density the same as for English    }
{         Tach is 24 pulses per CM (based on 4 characters per CM),   }
{     then 1 tach = .0164042 inch or .0416667 CM                     }
{     difference is .0002625 inch or .0006666 CM per tach            }
{        i.e., metric is slightly higher print density               }
{ pickup wheel calculations ;                                        }
{  ENGLISH : 500 pulses per revolution / 60 pulses per inch = 8.333 in. cir. }
{                                    8.333 in. cir. / pie = 2.653 in. dia.   }
{                                    2.653 in. dia. / 2   = 1.326 in. rad.   }
{                                                                    }
{   METRIC : 500 pulses per revolution / 24 pulses per CM = 20.8333 CM cir.  }
{                                                        = 8.2021 in. cir    }
{                                20.8333 CM cir. / pie = 6.6315 CM dia.      }
{                                                        = 2.6108 in. dia.   }
{                                6.6315 CM dia. / 2    = 3.3157 CM rad.      }
{                                                        = 1.3054 in. rad    }
{ ================================================================== }
{ Note : staggerfactor will have to be used every time printing starts and }
{        also the mounting of the heads will have to be such that it is co- }
{        incidental with English and Metric tachs.                   }
{ ================================================================== }

TYPE
   CharPixelData = ARRAY [0..7] OF BYTE;

{ these are the different font orientations, only used this way at load time }
    Orientation = ( Normal, Flip, Flop, FlipFlop, Left,
                    LeftFlopOrRightFlip, LeftFlipOrRightFlop, Right );

{ used for font selection, rotate? }
    OrientationHoriz = ( WithTheWeb, AcrossTheWeb );

{ used for font selection, flop? }
    Direction = ( Fourward, Reverse );

{ used for font selection, flip? }
    OrientationVert = ( Upright, UpsideDown );

{ do the sequence get larger or smaller? }
{ note, this is independent of forward or reverse }
    SequenceType = ( Ascending, Descending );

MensurationType = ( Imperial, Metric );
       PrintingMode = ( Counting, Time, Text );
          SetOfChar = SET OF Char ;

VAR
    ControlByte : Byte ; { holds an image of whats in the printer control port }
    StatusByte  : Byte ; { holds an image of whats in the printer status port }

Messages, SaveMsgs : ARRAY [ 0 .. NumberOfChannels -1 ] OF String ;
        TextLengths    : ARRAY [ 0 .. NumberOfChannels -1 ] OF Byte ;
         CharPntr      : ARRAY [ 0 .. NumberOfChannels -1 ] OF Integer ;
    SomethingToPrint   : ARRAY [ 0 .. NumberOfChannels -1 ] OF Boolean ;

PixPlace    : ARRAY [ 0 .. NumberOfChannels -1 ] OF Integer ;

InWhiteSpace   : ARRAY [ 0 .. NumberOfChannels -1 ] OF Boolean ;
       WhiteSpaceIndx  : ARRAY [ 0 .. NumberOfChannels -1 ] OF Integer ;
       WhiteSpaceCnts  : ARRAY [ 0 .. NumberOfChannels -1 ] OF Integer ;

HeadOffsets   : ARRAY [ 0 .. NumberOfChannels -1 ] OF Integer ;

FontTables    : ARRAY[ Normal .. Right, $20..$7F] OF CharPixelData ;
```

```
        Fonts : ARRAY[ Boolean, Boolean, Boolean,
                       $20..$7F] OF CharPixelData ABSOLUTE FontTables ;
  Rotated, Flopped, Flipped : Boolean ; { used as subscripts into fonts.}

InFile, OutFile : File OF Byte;

SlideHead : Byte ;
       StaggerFactor : LongInt ;
               aCntr : Integer ;
               aChar : Char ;
                Done : Boolean ;
               ChNum : Integer ;
{CHB}    XferEnable : Boolean ; { Allows xfermodes to setup heads }
{CHB}   CheckEncoder : Boolean ; { Allows for encoder setup }
       StepStringFlag : Boolean ; { set in interrupt routine, used in spitink }
          RevStrFlag : Boolean ; { for debugging, so I can tell when it occurs. }
          RollStrFlag : Boolean ; { for debugging, so I can tell when it occurs. }
         WebDirection : Direction ;
  MessageOrientation : OrientationHoriz ;
      VertOrientation : OrientationVert ;
        SequenceOrder : SequenceType ;

Mensuration : MensurationType ;
      TachsPerInchVar : LongInt ;
       TachsPerCMvar  : LongInt ;
            Hd2Hd_gap : Real ; { spacing between heads, in inches.}
      TachsPerInterval : Byte ;
      NumberOfIntervals : Byte ;
          UpperLimit : Byte ;
       PixelsPerChar : Byte ; { six for normal OR eight for sideways }

SequenceStr : String ;
   AcrossTheWeb_CountMode_SeqStr : String ;
     WithTheWeb_CountMode_SeqStr : String ;
             Response : Char ;

WithTheWebMode : PrintingMode ;
       DigitNumber : Byte ;

SlideSaveX, SlideSaveY : BYTE ;

{ these varibles are used for sequential- with the web printing.}
          CountDigits : Byte ;
           StartValue : LongInt ;
            StepValue : LongInt ;
            StopValue : LongInt ;
         HighestValue : LongInt ;{ when user enters stop # that's not mod step# }
         CurrentValue : LongInt ;
        NumberOfSteps : LongInt ;
        NumberOfTachs : LongInt ;
        ImmediateExit : Boolean ;
{ ================================================================== }

PROCEDURE SlideForward( HeadNum : Byte ) ;
BEGIN { increment slide head(s) pixel index }
    IF MessageOrientation = WithTheWeb
      THEN IF WhiteSpaceIndx[0] < WhiteSpaceCnts[0]
             THEN Inc( WhiteSpaceIndx[0] )
             ELSE BEGIN
                 WhiteSpaceIndx[0]:= 1 ;
                 InWhiteSpace[0] := Off ;
               END
      ELSE { message orientation is across the web }
          IF ( HeadNum = 0 )
            THEN { move all index(es) forward with for-next loop }
                FOR ChNum := 0 TO NumberOfChannels -1 DO
                    IF WhiteSpaceIndx[ ChNum ] < WhiteSpaceCnts[ ChNum ]
                      THEN Inc( WhiteSpaceIndx[ ChNum ])
                      ELSE BEGIN
                          WhiteSpaceIndx[ ChNum ]:= 1 ;
```

```
                            InWhiteSpace[ ChNum ] := Off ;
                    END
            ELSE BEGIN { move just this head }
                IF WhiteSpaceIndx[2]  < WhiteSpaceCnts[2]
                    THEN Inc( WhiteSpaceIndx[2]  )
                    ELSE BEGIN
                        WhiteSpaceIndx[2]:=  1 ;
                        InWhiteSpace[2]  := Off ;
                    END ;
                IF WhiteSpaceIndx[3]  < WhiteSpaceCnts[3]
                    THEN Inc( WhiteSpaceIndx[3])
                    ELSE BEGIN
                        WhiteSpaceIndx[3]:= 1 ;
                        InWhiteSpace[3]  := Off ;
                    END ;
            END ;
END ; { SlideForward }
{------------------------------------------------------------------}
PROCEDURE SlideReverse( HeadNum : Byte );
BEGIN   { decrement slide head pixel index(es) }
  { space counts can always go negative because they are integers }
    IF messageOrientation  = WithTheWeb
        THEN Dec( WhiteSpaceIndx[0]  )
        ELSE { message orientation is across the web }
            IF ( HeadNum = 0 )
                THEN BEGIN { move both heads }
                    Dec( WhiteSpaceIndx[0] );
                    Dec( WhiteSpaceIndx[1] );
                    Dec( WhiteSpaceIndx[2] );
                    Dec( WhiteSpaceIndx[3] );
                END
                ELSE BEGIN { move just this head }
                    Dec( WhiteSpaceIndx[2] );
                    Dec( WhiteSpaceIndx[3] );
                END ;
END ; { SlideReverse }
{ ================================================================ }
PROCEDURE ShowPrintingAppearance(  Row : BYTE ; printString : string );
VAR
    AttrSave : BYTE ;
        tail : CHAR ;
{ - - - - - - - - - - - - - - - - - - - - - - - - - - - - - - - - }
PROCEDURE ReverseWords ;
{ reverse the words in a string which are delimited by commas.  }
{ note, the words themselves are not reversed.                  }
{ ex. 'SUN, MON, TUE, WED, THU, FRI, SAT' original string,      }
{     'SAT, FRI, THU, WED, TUE, MON, SUN' resulting string.     }
VAR
    i, n, p : INTEGER ;

Words : ARRAY[ 1 .. 8 ] OF String ;
    workStr : String ;
BEGIN { ReverseWords }
    WorkStr := PrintString ;
    PrintString := '';
    i := 1 ;
    REPEAT
        p := Pos(',', WorkStr);
        IF p <> 0
            THEN BEGIN
                Words[ i ] := Copy( WorkStr, 1, p + 1 );
                Inc( i );
                Delete( WorkStr, 1, p+1 );
            END ;
    UNTIL p = 0 ;
    Words[ i ] := WorkStr + ', ' ;
    n := 2 ;
    FOR n := i DOWNTO 2 DO
        PrintString := PrintString + Words[n] ;
    Delete( Words[1], Length(Words[1]) -1, 2 );
```

```
            PrintString := PrintString + Words[ n - 1 ];
END ; { ReverseWords }
{ ---------------------------------------------------------------- }
BEGIN { ShowPrintingAppearance }
    IF Length( printString ) > 0
        THEN BEGIN
            AttrSave := textAttr ;
            SetMonoAttr( reverse_Vid );
            tail := '.';
            IF WithTheWebMode = Text
                THEN tail := ' '
                ELSE IF SequenceOrder = Descending
                        THEN ReverseWords ;
            Flash( Row, 35 - (Length( printString ) DIV 2 ), ' ' +
                    printString + tail );
            SetMonoAttr( normal_Vid ); Write(' repeating.');
            textAttr := AttrSave ;
        END ;
END ; { ShowPrintingAppearance }
{ ---------------------------------------------------------------- }
PROCEDURE RevStr( VAR aStr : String ) ;
{ reverse a string on a character by charscter basis. }
VAR
    TempStr : String ;
    CharCntr : Byte ;
BEGIN { RevStr }
    IF Length( aStr ) > 1 { no need to reverse a one character or empty string }
        THEN BEGIN
            TempStr := aStr ;
            aStr := '';
            FOR CharCntr := Length( TempStr ) DOWNTO 1 DO
                aStr := aStr + TempStr[ CharCntr ];
        END ;
END ; { RevStr }
{ ---------------------------------------------------------------- }
PROCEDURE WaitForUser ;
{ just wait for the user to hit any key. }
VAR aChar : Char ;
BEGIN { WaitForUser }
    Writeln ;
    Writeln( 'Hit any Key to continue !');
    While Not Keypressed do ;
    achar := readkey ;
    IF aChar = Nul { leading null for extended character codes }
        THEN achar := readkey ;
END ; { WaitForUser }
{ ---------------------------------------------------------------- }
PROCEDURE RollStrings ;
VAR
    TempStr : String ;
BEGIN { RollStrings }
    TempStr := Messages[0];
    Messages[0]:= Messages[3];
    Messages[3]:= TempStr ;
    TempStr := Messages[1];
    Messages[1]:= Messages[2];
    Messages[2]:= TempStr ;
END ; { RollStrings }
{ ---------------------------------------------------------------- }
{$I HardWare.Inc   ... contains PC printer port i/o routines }
{ ---------------------------------------------------------------- }
PROCEDURE SetupHeadsForProperMode ;
BEGIN { SetupHeadsForProperMode }
{ only need to change the first DIDI }
    IF MessageOrientation = WithTheWeb
        THEN BEGIN
            { set address of first DIDI }
            PrinterCommand( HeadSelect, On, 1 );
            PrinterCommand( AltRaster, Off, 1 ); { select 1 line raster.}
            OutputRange( $00 ); { tell it to accept only 1st channel data }
```

```
              PrinterCommand( HeadSelect, Off, 1 );
           END
           ELSE BEGIN { across the web }
              { set address of first DIDI }
                 PrinterCommand( HeadSelect, On, 1 );
                 PrinterCommand(  AltRaster, On, 1 ); { select 2 line raster.}
                 OutputRange( $10 ); { tell it to accept 1st & 2nd channel data }
                 PrinterCommand( HeadSelect, Off, 1 );
           END
END ; { SetupHeadsForProperMode }
{ ---------------------------------------------------------------------- }
PROCE   E TransferModes ;
VAR
       nnelNumber, Indx : Integer ;
       N { TransferModes }
     SaveMsgs := Messages ; { this is to allow reversing and rolling of strings }

IF ( MessageOrientation = WithTheWeb ) AND ( WithTheWebMode = Counting )
        THEN BEGIN
           IF SequenceOrder = Ascending
              THEN CurrentValue := StartValue
              ELSE CurrentValue := HighestValue ;
           { convert the CurrentValue from a number into a string. }
              Str( CurrentValue:CountDigits, Messages[0] );
           { put in the leading zeros into the string. }
              Indx := 1 ;
              WHILE ( Messages[0][Indx] = ' ' ) AND ( Indx <= CountDigits ) DO BEGIN
                 Messages[0][Indx]:= '0'; Inc( Indx );                     END ;
              IF WebDirection = Reverse
                 THEN RevStr( Messages[0] );
        END ;

IF XferEnable
        THEN SetupHeadsForProperMode ; {CHB}

IF MessageOrientation = WithTheWeb
        THEN PixelsPerChar := 6
        ELSE PixelsPerChar := 8 ;

{ set up font subscripts according to menu selections.}
     Flipped := VertOrientation = UpsideDown ;
     Flopped := WebDirection = Reverse ;
     Rotated := MessageOrientation = AcrossTheWeb ;

{ reverse strings when neccessary }
     RevStrFlag := (( SequenceOrder = Descending ) AND
                    ( Rotated ))
                   OR
                   (( SequenceOrder = Descending ) AND
                    ( NOT Rotated ) AND
                    ( WithTheWebMode = Time ));

IF RevStrFlag
        THEN FOR ChannelNumber := 0 TO NumberOfChannels -1 DO
           RevStr( Messages[ ChannelNumber ] );

{ roll the strings when neccessary }
     RollStrFlag := (( Flipped ) AND ( Flopped ) AND ( Rotated )) OR
                    (( NOT Rotated ) AND ( Flopped ) AND ( WithTheWebMode = Time ));
     IF RollStrFlag
        THEN RollStrings ;

{ this part of transfer modes needs to be seperated for stopping and starting }
     FOR ChannelNumber := 0 TO NumberOfChannels -1 DO BEGIN
        { start at first column of a font }
          PixPlace[ ChannelNumber ] := 0 ;

{ printing will start with the first character of the string. }
          CharPntr[ ChannelNumber ] := 1 ;
```

```
{ this is so I don't need to use the Lenght function while printing! }
TextLengths[ ChannelNumber ] := Length( Messages[ ChannelNumber ] );

{ need a flag to deal with empty strings }
SomethingToPrint[ ChannelNumber ] := TextLengths[ ChannelNumber ] > 0 ;
  ; { for channelnumber }
{ ------------------------------------------------------------ }
  IF Mensuration = Imperial
    THEN BEGIN { half inches }
      TachsPerInterval := TachsPerInchVar DIV 2 ; { sixty tachs per inch }
      UpperLimit := 48 ; { max number of half inches between printing }
      StaggerFactor := Trunc( ( TachsPerInchVar * Hd2Hd_gap ) + 0.5 );
{$IFDEF TimeOfFlight}
      Distance := 1 / TachsPerInchVar ; { .0166667 inch at 10 ch/in. }
{$ENDIF}                                { .0208333 inch at  8 ch/in. }
      { set encoder to Imperial }
{CHB}   IF XferEnable
          THEN PrinterCommand( UserPort1, Off, 1 );
      END
    ELSE BEGIN { centimeters }
      TachsPerInterval := TachsPerCMvar ; { twentyfour tachs per centimeter }
      UpperLimit := 60 ; { max number of centimeters between printing }
      StaggerFactor := Trunc( TachsPerCMvar * Hd2Hd_gap * 2.54 );
{$IFDEF TimeOfFlight}
      Distance := 1 / ( TachsPerCMvar * 2.54 );{ 0.0164041 inch at 4 ch/CM }
{$ENDIF}
      { set encoder to Imperial }
{CHB}   IF XferEnable
          THEN PrinterCommand( UserPort1, On, 1 );
      END ; { else centimeters }
{ ------------------------------------------------------------ }
{$IFDEF TimeOfFlight}
  Distance := ( Distance * 5 ) / 0.0000008381 ; {times 5 gives i/s to f/m}
{$ENDIF}

{ set up whitespace counts for each channel }
  FOR ChannelNumber := 0 TO NumberOfChannels -1 DO BEGIN
    { this includes the printing part }
    WhiteSpaceCnts[ ChannelNumber ] := NumberOfIntervals * TachsPerInterval ;
    WhiteSpaceIndx[ ChannelNumber ] := 1 ; { begin at the beginning }
    InWhiteSpace[ ChannelNumber ] := Off ;

{ now deduct the text from the interval }
    IF MessageOrientation = AcrossTheWeb
      THEN WhiteSpaceCnts[ ChannelNumber ] :=
           WhiteSpaceCnts[ ChannelNumber ] - ( 1 * PixelsPerChar )
      ELSE IF ChannelNumber = 0
             THEN BEGIN
               CASE WithTheWebMode OF
                 Counting, Text : WhiteSpaceCnts[0] :=
                                    WhiteSpaceCnts[0]
                                    - ( TextLengths[0] * PixelsPerChar );
                 Time : WhiteSpaceCnts[0] :=
                          WhiteSpaceCnts[0]
                          - ( 4 * PixelsPerChar );
               END ; { case }
               { now need to test if the interval is too short. }
               IF ( ChannelNumber = 0 ) AND { less than two blank characters }
                  ( WhiteSpaceCnts[0] < (2 * PixelsPerChar) )
                 THEN BEGIN { interval is too short }
                   WhiteSpaceCnts[0] := ( 2 * PixelsPerChar );
                   ClrScr ;
                   Writeln ;
                   Writeln('WARNING, INTERVAL IS TOO SHORT FOR TEXT !!!');
                   Writeln(' two spaces have been added to text.');
                   Writeln(' change interval in setup menu.');
                   Beep ;
                   WaitForUser ;
                 END ;
```

```
                    END ; { then channel number = 0 }
      END ; { for channel number }

{ if the web reverses then dealing with the offset heads is complex matter }
{ because the leading head become the lagging head and vice versa.         }
{ this customer will have a Solo 4/4 i.e., dual two line heads and the web }
{ will never reverse direction.                                            }
{ only four line print needs to deal with staggered heads. }
   IF MessageOrientation = AcrossTheWeb
      THEN BEGIN
         FOR ChannelNumber := 0 TO NumberOfChannels -1 DO
            IF ChannelNumber > 1
               THEN HeadOffsets[ ChannelNumber ] := 0
               ELSE HeadOffsets[ ChannelNumber ] := StaggerFactor ;

FOR ChannelNumber := 0 TO NumberOfChannels -1 DO BEGIN
            { trick it into thinking it's in whitespace }
            IF HeadOffsets[ ChannelNumber ] > 0
               THEN BEGIN
                  WhiteSpaceIndx[ ChannelNumber ] :=
                                   WhiteSpaceCnts[ ChannelNumber ]
                                   - HeadOffsets[ ChannelNumber ];
                  InWhiteSpace[ ChannelNumber ] := On ;
               END ;
         END ; { for channel number }
      END { then }
      ELSE InWhiteSpace[0]:= Off ;

{$IFDEF TimeOfFlight }
   CurrentDelay := 0 ;
{$ENDIF }
END ; { TransferModes }

{ ------------------------------------------------------------------ }

PROCEDURE Heading ;
BEGIN { Heading }
   ClrScr ;
   Flash( 1,20,'===========================');
   Flash( 2,20,'===== DOMINO AMJET, INC. =====');
   Flash( 3,20,'======= DIDI Software ========');
   Flash( 4,20,'========= Ver 2.00 ==========');
   Flash( 5,20,'===========================');
   Writeln ; Writeln
END ; { Heading }

{------------------------------------------------------------------}

PROCEDURE DIDIinit ;
BEGIN
   { set range of first DIDI. }
   PrinterCommand( HeadSelect, On, 1 );
   OutputRange( $10 );
   PrinterCommand( HeadSelect, Off, 1 );
   { set raster for first DIDI. }
   PrinterCommand( AltRaster, On, 1 ); { select 2 line raster.}
   { set first DIDI as Master }
   PrinterCommand( Master, On, 1 );

{ set range of second DIDI. }
   PrinterCommand( HeadSelect, On, 2 );
   OutputRange( $32 );
   PrinterCommand( HeadSelect, Off, 2 );
   { set raster for 2nd DIDI, not nec. cause 2nd head is used only with the web.}
   PrinterCommand( AltRaster, On, 2 ); { select 2 line raster.}
   { set second DIDI as Slave, not really nec. cause it is a slave from reset.}
   PrinterCommand( Master, Off, 2 );
END ; { DIDIinit }

{ ------------------------------------------------------------------ }
```

```
PROCEDURE Initialize ;
VAR
        Number : Byte ;

P     URE LoadFontFile ;
VAR
    ..tr : String ;
    CharOrientation : Orientation ;
    CharVal, ColPos : Integer ;
BEGIN { LoadFontFile }
    { fill up font tables, character fonts are an eight byte array and the
    { character information is lower left justified. }
    { the character sets are : normal, flip, flop, left & right }
    ASSIGN( InFile, FontFile ); { initially derived from '2-Line.Mas'}
{$I-}
    RESET( InFile );
{$I+}
    IF IOresult <> 0
        THEN BEGIN
            Flash( 12, 10,
                'Font file, "' + FontFile + '" NOT found, program terminated!');
            Beep1 ; Halt ;
        END
        ELSE BEGIN
            Heading ;
            Flash( 12, 17, 'Loading Font File, one moment please ' );
            Blinking := On ;
            SetTxtAttr ;
            Write('...');
            Blinking := Off ;
            SetTxtAttr ;
        END ;
    FOR CharOrientation := Normal TO Right DO
        FOR CharVal := $20 TO $7F DO
            FOR ColPos := $00 TO $07 DO
                Read( InFile, FontTables[ CharOrientation, CharVal, ColPos ] );
    Close( InFile );
END ; { LoadFontFile }
{------------------------------------------------------------------}
BEGIN { Initialize }
    CAPS := TRUE ;
    Clrscr ;

Brite := On ;
    SetMonoAttr( Normal_Vid );
    SetTxtAttr ;

LoadFontFile ; { program notifies user if file not found, then terminates.}
    DIDIinit ;
       rEnable := TRUE ; {CHB}
       kEncoder := Off ; {CHB}
    { T    assignments will occur from transfer modes after setup menu, these }
    { are   e defaults in case the setup menu is never called. }
    IF    eways
         N MessageOrientation := AcrossTheWeb
       ELSE MessageOrientation := WithTheWeb ;

WithTheWebMode := Time ;

IF Foreward
        THEN WebDirection := Fourward
        ELSE WebDirection := Reverse ;

IF Inverted
        THEN VertOrientation := UpsideDown
        ELSE VertOrientation := Upright ;

IF English
        THEN BEGIN
            Mensuration := Imperial ;
```

```
            UpperLimit := 48 ;
       END
       ELSE BEGIN
            Mensuration := Metric ;
            UpperLimit := 60 ;
       END ;

SequenceOrder := Ascending ;

NumberOfIntervals := InitialInterval ; { set an initial interval }
       TachsPerInchVar  := TachsPerInch ; { can be changed in config menu }
       TachsPerCMvar    := TachsPerCM ;   { can be changed in config menu }
       Hd2Hd_gap        := HeadOffset ;   { can be changed in config menu }

{ assign test messages }
       Messages[0] := '00000000' ;
       Messages[1] := '00000000' ;
       Messages[2] := '36925814' ;
       Messages[3] := '00011122' ;
       SequenceStr := '0300, 0600, 0900, ..., 1800, 2100, 2400' ;

{ this is to allow reversing and rolling of strings }
       SaveMsgs := Messages ;

{ defaults for when select sequential, with the web is called. }

CountDigits := 3 ;
              StartValue  := 0 ;
              StepValue   := 12 ;
              StopValue   := 348 ;
         WithTheWeb_CountMode_SeqStr := '000, 012, 024, ..., 324, 336, 348';

SlideHead := 0 ; { channel 0 moves all channels, else individual moves }
       Done := FALSE ;

{ Deal with the PC's printer control port }
       ControlByte := $00 ;
   {- change state of print strobe bit 12/7/90 for new DIDI circuit board.}
       ControlByte := ControlByte OR $02 ; { added this line 12/7/90 }
       ControlByte := ControlByte AND $FB ;{ OR $04 change state of phase bit }
       Port[ ControlPort ]:= ControlByte ;

StatusByte := Port[ StatusPort ]; { go out and get the status }

{$IFDEF TimeOfFlight }
       FlightTime := 4176 ; { based on 3.5 ms time of flight.}
   {$ENDIF}
   END ; { Initialize }

{ ------------------------------------------------------------------- }

PROCEDURE StageTheDataAcrossTheWeb ;
   BEGIN { StageTheDataAcrossTheWeb }
            IF InWhiteSpace[0]
               THEN RequestPhasing { for this stroke on this channel }
               ELSE OutputAbyte( Fonts[ Rotated, Flopped, Flipped,
                                       Ord( Messages[0][ CharPntr[0] ]),
                                       PixPlace[0] ]);

IF InWhiteSpace[1]
               THEN RequestPhasing { for this stroke on this channel }
               ELSE OutputAbyte( Fonts[ Rotated, Flopped, Flipped,
                                       Ord( Messages[1][ CharPntr[1] ]),
                                       PixPlace[1] ]);

IF InWhiteSpace[2]
               THEN RequestPhasing { for this stroke on this channel }
               ELSE OutputAbyte( Fonts[ Rotated, Flopped, Flipped,
                                       Ord( Messages[2][ CharPntr[2] ]),
                                       PixPlace[2] ]);
```

```
            IF InWhiteSpace[3]
                THEN RequestPhasing { for this stroke on this channel }
                ELSE OutputAbyte( Fonts[ Rotated, Flopped, Flipped,
                                        Ord( Messages[3][ CharPntr[3] ]),
                                        PixPlace[3] ]);
END ; { StageTheDataAcrossTheWeb  }

PROCEDURE StageTheDataWithTheWeb  ; { just a single channel operating }
BEGIN { StageTheDataWithTheWeb  }
    IF InWhiteSpace[0]
        THEN RequestPhasing  { for this stroke on this channel }
        ELSE OutputAbyte( Fonts[ Rotated, Flopped, Flipped,
                                 Ord( Messages[ DigitNumber ][ CharPntr[0] ]),
                                 PixPlace[0] ]);
END ; { StageTheDataWithTheWeb  }

{ ----------------------------------------------------------------- }

PROCEDURE UpdateIndexesAcrossTheWeb  ;

BEGIN { UpdateIndexesAcrossTheWeb  }
    IF InWhiteSpace[0]
        THEN { must be in whitespace }
            IF WhiteSpaceIndx[0] < WhiteSpaceCnts[0]
                THEN Inc( WhiteSpaceIndx[0] )
                ELSE BEGIN { roll over whitespace index }
                    WhiteSpaceIndx[0]:= 1 ; { reset index }
                    IF SomethingToPrint[0]  { non empty message }
                        THEN InWhiteSpace[0]:= Off;
                END { else }
        ELSE { must be printing now }
            IF PixPlace[0] < PixelsPerChar -1
                THEN Inc( PixPlace[0] )
                ELSE BEGIN { time to go to whitespace }
                    PixPlace[0]:= 0; { reset index for next font }
                    { adjust index into string }
                    IF CharPntr[0] < TextLengths[0]
                        THEN Inc(CharPntr[0])  { point to the next character }
                        ELSE CharPntr[0]:= 1 ; { point to the beginning of the text }
                    InWhiteSpace[0]:= On ; { back to non print time }
                END ; { else }

IF InWhiteSpace[1]
        THEN { must be in whitespace }
            IF WhiteSpaceIndx[1] < WhiteSpaceCnts[1]
                THEN Inc( WhiteSpaceIndx[1] )
                ELSE BEGIN { roll over whitespace index }
                    WhiteSpaceIndx[1]:= 1 ; { reset index }
                    IF SomethingToPrint[1]  { non empty message }
                        THEN InWhiteSpace[1]:= Off;
                END { else }
        ELSE { must be printing now }
            IF PixPlace[1] < PixelsPerChar -1
                THEN Inc( PixPlace[1] )
                ELSE BEGIN { time to go to whitespace }
                    PixPlace[1]:= 0; { reset index for next font }
                    { adjust index into string }
                    IF CharPntr[1] < TextLengths[1]
                        THEN Inc(CharPntr[1])  { point to the next character }
                        ELSE CharPntr[1]:= 1 ; { point to the beginning of the text }
                    InWhiteSpace[1]:= On ; { back to non print time }
                END ; { else }

IF InWhiteSpace[2]
        THEN { must be in whitespace }
            IF WhiteSpaceIndx[2] < WhiteSpaceCnts[2]
                THEN Inc( WhiteSpaceIndx[2] )
                ELSE BEGIN { roll over whitespace index }
                    WhiteSpaceIndx[2]:= 1 ; { reset index }
```

```
            IF SomethingToPrint[2]  { non empty message }
               THEN InWhiteSpace[2]:= Off;
          END { else }
     ELSE { must be printing now }
        IF PixPlace[2] < PixelsPerChar -1
           THEN Inc( PixPlace[2] )
           ELSE BEGIN { time to go to whitespace }
               PixPlace[2]:= 0; { reset index for next font }
             { adjust index into string }
               IF CharPntr[2] < TextLengths[2]
                  THEN Inc(CharPntr[2])   { point to the next character }
                  ELSE CharPntr[2]:= 1 ; { point to the beginning of the text }
               InWhiteSpace[2]:= On ; { back to non print time }
           END ; { else }

IF InWhiteSpace[3]
   THEN { must be in whitespace }

IF WhiteSpaceIndx[3] < WhiteSpaceCnts[3]
          THEN Inc( WhiteSpaceIndx[3] )
          ELSE BEGIN { roll over whitespace index }
              WhiteSpaceIndx[3]:= 1 ; { reset index }
              IF SomethingToPrint[3]  { non empty message }
                 THEN InWhiteSpace[3]:= Off;
          END { else }
     ELSE { must be printing now }
        IF PixPlace[3] < PixelsPerChar -1
           THEN Inc( PixPlace[3] )
           ELSE BEGIN { time to go to whitespace }
               PixPlace[3]:= 0; { reset index for next font }
             { adjust index into string }
               IF CharPntr[3] < TextLengths[3]
                  THEN Inc(CharPntr[3])   { point to the next character }
                  ELSE CharPntr[3]:= 1 ; { point to the beginning of the text }
               InWhiteSpace[3]:= On ; { back to non print time }
           END ; { else }
END ; { UpdateIndexesAcrossTheWeb }

{ ------------------------------------------------------------------ }
(*
when printing WITH the web there are three modes that need to be addressed, 1. Counting, this will involve dealing with an long integer and converting it
           to a string every print time.

2. Time, this is a form of text where the first characters of each string are
           printed then the second characters of each string are printed and so
           on and so forth, the thing to remember in this mode is that only one
           index is used for all four strings.

3. Text, this is just printing a the whole single text string (Messages[0]) at
           print time. the string is entered in the setup mode i.e., user-defined.
    note: this mode was removed so that the back door for across the web will
           print the same sequence irregardless of text orientation. 12/20/90
           the way it was removed is by never setting the WithTheWebMode varible
           to Text .

:CEDURE StepString ;
    this routine adds the step value to the current value and tests to see if }
  { it is larger than the highest value, if it is, the current value is reset }
  { to the start value, in either case, the current value is converted into a }
  { string, and leading blanks are converted to zeros. }
VAR
    Indx : Byte ;
BEGIN { StepString }
    IF SequenceOrder = Ascending
       THEN BEGIN
            Inc( CurrentValue, StepValue );
            IF CurrentValue > StopValue
```

```
              THEN CurrentValue := StartValue ;
    END
    ELSE BEGIN
        Dec( CurrentValue, StepValue );
        IF CurrentValue < StartValue
            THEN CurrentValue := HighestValue ;
    END ;
    Str(CurrentValue:TextLengths[0], Messages[0]);  { convert number to string }
    Indx := 1 ;
    WHILE ( Messages[0][Indx] = ' ' ) AND ( Indx <= TextLengths[0] ) DO BEGIN
        Messages[0][Indx]:= '0'; Inc( Indx );                          END ;
END ; { StepString }

PROCEDURE UpdateIndexesWithTheWeb_Count  ;

{ this is probably the most difficult printing mode to handle because it is }
{ neccessary to allow a six digit number which must be converted to a string.}
BEGIN { UpdateIndexesWithTheWeb_Count  }
    IF InWhiteSpace[0]
        THEN { deal with whitespace index and determine if it is print time. }
            IF WhiteSpaceIndx[0] < WhiteSpaceCnts[0]
                THEN Inc( WhiteSpaceIndx[0] )
                ELSE BEGIN
                    WhiteSpaceIndx[0]:= 1 ; { reset index }
                    InWhiteSpace[0]:= Off ; { next tachs are ink }
                END { else }
        ELSE { must be printing now }
            IF PixPlace[0] = PixelsPerChar -1 { am I at the end of a font? }
                THEN BEGIN
                    PixPlace[0] := 0 ; { reset index for next font }
                    IF CharPntr[0] < TextLengths[0]
                        THEN Inc( CharPntr[0] )
                        ELSE BEGIN { done printing, back to whitespace }
                            CharPntr[0] := 1 ;
                            InWhiteSpace[0] := On ; { back to non print time }
                            IF StepStringFlag
                                THEN BEGIN { error occured, string not updated.}
                                    Flash( 23, 10, 'Error, Number Not Incremented.');
                                    Beep ; Beep ; Beep ;
                                END
                                ELSE StepStringFlag:= On ; { now update the string }
                        END ;
                END { then }
                ELSE Inc( PixPlace[0] );
END ; { UpdateIndexesWithTheWeb_Count  }
{ ------------------------------------------------------------------------- }
PROCEDURE UpdateIndexesWithTheWeb_Time  ;
{ printing all four strings a column at a time.}
BEGIN { UpdateIndexesWithTheWeb_Time  }
    IF InWhiteSpace[0]
        THEN IF WhiteSpaceIndx[0] < WhiteSpaceCnts[0]
            THEN Inc( WhiteSpaceIndx[0] )
            ELSE BEGIN { roll over whitespace index }
                WhiteSpaceIndx[0]:= 1 ; { reset index }
                InWhiteSpace[0]:= Off;
            END { else }
        ELSE { must be printing now }
            IF PixPlace[0] < PixelsPerChar -1
                THEN Inc( PixPlace[0])
                ELSE BEGIN { time to go to whitespace? did all four digits get out? }
                    PixPlace[0]:= 0; { reset index for next font }
                    { time to adjust index into string? }
                    IF DigitNumber > 0
                        THEN
                            Dec( DigitNumber )
                        ELSE BEGIN
                            DigitNumber := 3 ;
                            { point to next character in string or back to beginning }
                            IF CharPntr[0] < TextLengths[0]
                                THEN { point to the next character }
```

```
                        Inc(CharPntr[0])
                ELSE { point back to the beginning of the text }
                      CharPntr[0]:= 1 ;
                InWhiteSpace[0]:= On ; { back to non print time }
              END ;
          END ; { else }
END ; { UpdateIndexesWithTheWeb_Time }
{ ─────────────────────────────────────────────────────────────── }
PROCEDURE UpdateIndexesWithTheWeb_Text ;
{ in this mode a single string is printed at print time. }
BEGIN { UpdateIndexesWithTheWeb_Text }

IF InWhiteSpace[0]
      THEN { deal with whitespace index and determine if it is print time. }
           IF WhiteSpaceIndx[0] < WhiteSpaceCnts[0]
              THEN Inc( WhiteSpaceIndx[0] )
              ELSE BEGIN
                   WhiteSpaceIndx[0]:= 1 ; { reset index }
                   InWhiteSpace[0]:= Off ; { next tachs are ink }
              END { else }
      ELSE { must be printing now }
           IF PixPlace[0] = PixelsPerChar -1 { am I at the end of a font? }
              THEN BEGIN
                   PixPlace[0] := 0 ; { reset index for next font }
                   IF CharPntr[0] < TextLengths[0]
                      THEN Inc( CharPntr[0] )
                      ELSE BEGIN { done printing, back to whitespace }
                           CharPntr[0] := 1 ;
                           InWhiteSpace[0] := On; { back to non print time }
                      END ;
                   END { then }
              ELSE Inc( PixPlace[0] );
END ; { UpdateIndexesWithTheWeb_Text }
{ ─────────────────────────────────────────────────────────────── }
PROCEDURE EncoderWindow ;
VAR      desire : CHAR ;
BEGIN
   CheckEncoder := On ;
   OpenWindow( 13, 14,' Tachometer setup WINDOW ', 4, 50 );
   Writeln(' Rotate Tachometer -- press any key to terminate');
   REPEAT
      NumberOfTachs := 0;
      Flash( 2, 3, 'Tachs =                        ');
      REPEAT
         Flash( 2, 13, Nstr( NumberOfTachs, 4 ))
      UNTIL KeyPressed ; desire := ReadKey ;

IF desire = Nul { maybe it was a function or cursor key }
         THEN desire := readkey ;

UNTIL NOT NoYesEsc( 3, 12, 'Do it again', No );
   CheckEncoder := Off ;
   CloseWindow ;
END;
{ ─────────────────────────────────────────────────────────────── }
PROCEDURE ScanKeyBoard ;
VAR
   aChar : Char ;
  ChanNum : Byte ;
BEGIN { ScanKeyBoard }
   aChar := ReadKey ;
   IF aChar = Nul { leading null for extended character codes }
      THEN IF KeyPressed
              THEN aChar := ReadKey
              ELSE Done := TRUE ;
   CASE aChar OF
        { LeftArrow } #75 : BEGIN
                             SlideForward( SlideHead );
                             { change this head(s) offset counter }
                           END ;
        { RightArrow } #77 : BEGIN
```

```
                            SlideReverse( SlideHead );
                        { change this head(s) offset counter }
                    END ;
    { UpArrow } #72 : BEGIN { decrement slide head number }
                    IF MessageOrientation = AcrossTheWeb
                        THEN BEGIN
                            IF SlideHead > 0

THEN Dec( SlideHead )
                                ELSE SlideHead := NumberOfHeads -1 ;
                            GotoXY( SlideSaveX, SlideSaveY);
                            Write(SlideHead +1:2);
                            IF SlideHead = 0
                                THEN Writeln(', both heads slide.')
                                ELSE Writeln('                      ');
                        END ;
                    END ;
    { DownArrow } #80 : BEGIN { increment slide head number }
                    IF MessageOrientation = AcrossTheWeb
                        THEN BEGIN
                            IF SlideHead < NumberOfHeads -1
                                THEN Inc( SlideHead )
                                ELSE SlideHead := 0;
                            GotoXY( SlideSaveX, SlideSaveY);
                            Write(SlideHead +1:2);
                            IF SlideHead = 0
                                THEN Writeln(', both heads slide.')
                                ELSE Writeln('                      ');
                        END ;
                    END ;
    { Spacebar } #$20 : BEGIN { Stop spitting ink }
                        { need to re-initialize for another run, }
                        { like it is done in transfer modes.     }
                        {       1. add print head offsets back in    }
                        {          whitespace indexes, include the   }
                        {          setting of the InwhiteSpace flag. }
                        {          when whitspace flag is off, reset }
                        {          the whitespace index.             }
                        {       2. reset message indexes back to the }
                        {          start of text, and reset the pixel}
                        {          indexes.                          }
{-------------- TransferModes ; need to separate only the required parts. }
                    REPEAT
                        PrinterInterruptGate( Off );
                        Flash( 11, 25, 'Stopped  ');
                        WHILE NOT Keypressed DO ; { just wait }
                        aChar := ReadKey ;
                        IF aChar = Nul
                            THEN achar := readkey ;
                    UNTIL (aChar = #$20) OR (aChar = #$1B) ;
                    IF aChar = #$1B
                        THEN Done := TRUE
                        ELSE BEGIN
                            Flash( 11, 25, 'Printing ');
                            PrinterInterruptGate( On );
                        END ;
                    END ;
            { Esc } #$1B : Done := TRUE ;
                  Cntl_F1 : EncoderWindow ; { used to verify encoder setup }
        END; { case }
END ; { ScanKeyBoard }
{----------------------------------------------------------------------     }
PROCEDURE DisplaySelections ;
BEGIN { DisplaySelections }
    Writeln ; Write('    Printing is ');

IF Flipped
        THEN Write('UP-SIDE-DOWN,')
        ELSE Write('  UP-RIGHT,   ');
```

```
    IF Flopped { WebDirection = Fourward }
        THEN Write(' REVERSE and ')
        ELSE Write(' FORWARD and ');

IF Rotated { MessageOrientation = WithTheWeb }
        THEN Writeln('ACROSS the web.')
        ELSE Writeln(' WITH  the web.');

Write('           ');
    IF Mensuration = Imperial
        THEN Write('Interval is ', NumberOfIntervals:2, ' HALF-INCH(ES)')
        ELSE Write('Interval is ', NumberOfIntervals:2, ' CENTIMETER(S)');

{$IFDEF TimeOfFlight}
    Writeln(', ... with TOF.');
{$ELSE}
    Writeln('.');
{$ENDIF}
(*
{ this statement was just cause things started getting a little confusing! }
    Writeln( '   Reverse Strings = ', RevStrFlag,
             ' ------ Roll Strings = ', RollStrFlag );
*)
END ; { DisplaySelections }
{ -------------------------------------------------------------------- }
PROCEDURE GiveInstructions ;
BEGIN { GiveInstructions }
    Writeln; Writeln; Writeln;
    Writeln('To Start/Stop Printing Hit SpaceBar.');
    Writeln;
    Writeln('To Select Slide Head Hit Up/Down Cursor Keys.');
    Writeln;
    Writeln('To Slide Text Hit Left/Right Cursor Keys.');
    Writeln;
    Writeln('To Return To Main Menu Hit the Esc Key.');
    Writeln;Writeln;
        Write('     The Slide Head is ');
    SlideSaveX := WhereX;  SlideSaveY := WhereY;
    Write(SlideHead +1:2);
    IF (SlideHead = 0) AND (MessageOrientation = AcrossTheWeb)
        THEN Writeln(', both heads slide.')
        ELSE Writeln('                    ');
    Writeln;
    IF NOT XferEnable
        THEN Writeln('            Print heads are in manual mode.');
    ShowPrintingAppearance( 25,SequenceStr );
END ; { GiveInstructions }
{==================================================================== }
VAR { used in the spit ink routines }
    SaveVector : pointer;
    IntEnabSaveVal : Byte ;
{ -------------------------------------------------------------------- }
{$I Interupt.Inc }
{ -------------------------------------------------------------------- }
PROCEDURE SpitInkPrefix ;
BEGIN
    Done := FALSE ;
    ImmediateExit := Off; { allows an exit from spit ink if no interrups occur }
    Heading ;
    DisplaySelections ;
    GiveInstructions ;
    InterruptsOff;
    GetIntVec( $0F, SaveVector );
{ deal with 8259A interrupt controller chip }
    IntEnabSaveVal := Port[$21];
    Port[$21]:= $7D ; { now just printer & keyboard }
    Port[$20]:= $20 ; { write operation control word (OCW2) }
{$IFDEF TimeOfFlight}
    Port[ CTcontrolport ] := $30 ; { reset timer-counter }
```

```
      Port[ CTchannel_0 ] := $FF;    Port[ CTchannel_0 ] := $FF;
{$ENDIF}
   InterruptsOn ; { just for cpu, actually won't come until printer int gate = on }

Flash( 11, 25, 'Stopped   ');
   WHILE NOT KeyPressed DO ; { just wait for start command }
   aChar := ReadKey ; { get rid of character. }
   IF aChar = Nul
      THEN achar := readkey ;
   IF aChar = Esc
      THEN ImmediateExit := On ;
END ; { SpitInkPrefix }
{ ---------------------------------------------------------------- }
PROCEDURE SpitInkSuffix;
BEGIN
   PrinterInterruptGate( Off );
   InterruptsOff;
   SetIntVec( $0F, SaveVector );
   Port[$21]:= IntEnabSaveVal ;
   Port[$20]:= $20; { write operation control word (OCW2) }
   InterruptsOn;
{$IFDEF TimeOfFlight}
{ must reset the CT chip to what bios expects }
   Port[ CTcontrolport ] := $36 ; { reset timer-counter }
   Port[ CTchannel_0 ] := $00;    Port[ CTchannel_0 ] := $00;
{$ENDIF}
   { at this point I should read the clock chip because the timer was stopped.}
END ; { SpitInkSuffix }
{ ---------------------------------------------------------------- }
{$IFDEF TimeOfFlight}
PROCEDURE CalcTOF ;
BEGIN
   IF CurrentCount = 0
      THEN Inc(CurrentCount);  { no divide by zero }

TargetDelay := FlightTime DIV CurrentCount ;

IF TargetDelay > CurrentDelay
      THEN BEGIN
         Inc( CurrentDelay );
         SlideForward(0) ;
      END
      ELSE IF TargetDelay < CurrentDelay
              THEN BEGIN
                 Dec( CurrentDelay );
                 SlideReverse(0);
              END ;
         { ELSE Current is equal to Target }
END ; { CalcTOF }
{$ENDIF}
{================================================================ }
PROCEDURE  SpitInkAcrossTheWeb ;
LABEL PastPrintLoop ;
BEGIN { SpitInkAcrossTheWeb }
   SpitInkPrefix ;
   SetIntVec( $0F, @AcrossTheWebInt); { can't pass an interrupt vector }
   IF ImmediateExit
      THEN GoTo PastPrintLoop ;
   Flash( 11, 25, 'Printing  ');
   PrinterInterruptGate( On );
{ ---------------------------------------------------------------- }
{ main print engine loop for across the web }
   REPEAT { PrintLoop }
      IF KeyPressed
         THEN ScanKeyBoard ;
{-----}
```

```
{$IFDEF TimeOfFlight}
    IF NOT InWhiteSpace[0]
        THEN CalcTOF ;
{$ENDIF}
{-----}
    UNTIL Done ;
{ ———————————————————————————————————————————————————————————— }
PastPrintLoop :
    SpitInkSuffix ;
END ; { SpitInkAcrossTheWeb }
{============================================================ }
PROCEDURE  SpitInkWithTheWeb_Time  ;
LABEL
    PastPrintLoop ;
BEGIN
    DigitNumber := 3 ; { used in stage the data with the web. }
    SpitInkPrefix ;
    SetIntVec( $0F, @WithTheWebInt_Time);  { can't pass an interrupt vector }
    IF ImmediateExit
        THEN GoTo PastPrintLoop ;
    Flash( 11, 25, 'Printing ');
    PrinterInterruptGate( On );
{ ———————————————————————————————————————————————————————————— }
{ main print engine loop for with the web, time }
    REPEAT { PrintLoop }
        IF Keypressed
            THEN ScanKeyBoard ;
    {$IFDEF TimeOfFlight}
        IF NOT InWhiteSpace[0]
            THEN CalcTOF ;
    {$ENDIF}
    UNTIL Done ;
{ ———————————————————————————————————————————————————————————— }
PastPrintLoop :
    SpitInkSuffix ;
END ; { SpitInkWithTheWeb_Time }
{============================================================ }
PROCEDURE  SpitInkWithTheWeb_Text  ;
VAR
    SaveVector : pointer;
    IntEnabSaveVal : Byte ;
LABEL
    PastPrintLoop ;
BEGIN
    ImmediateExit := Off ;
    DigitNumber := 0 ; { used in stage the data with the web. }
    SpitInkPrefix ;
    SetIntVec( $0F, @WithTheWebInt_Text);  { can't pass an interrupt vector }
    IF ImmediateExit
        THEN GoTo PastPrintLoop ;
    Flash( 11, 25, 'Printing ');
    PrinterInterruptGate( On );
{ ———————————————————————————————————————————————————————————— }
{ main print engine loop for with the web, text }
    REPEAT { PrintLoop }
        IF Keypressed
            THEN ScanKeyBoard ;
    {$IFDEF TimeOfFlight}
        IF NOT InWhiteSpace[0]
            THEN CalcTOF ;
          { ELSE BEGIN
                Messages[1] := 'c = '+ NStr(CurrentDelay, 2) +
                               ' ->' + NStr(TargetDelay,2) ;
                Flash( 24, 10, Messages[1]);
              END ; }
    {$ENDIF}
    UNTIL Done ;
{ ———————————————————————————————————————————————————————————— }
PastPrintLoop :
    SpitInkSuffix ;
```

```
END ; { SpitInkWithTheWeb_Text }
{===========================================================}
PROCEDURE   SpitInkWithTheWeb_Count ;
LABEL
    PastPrintLoop ;
BEGIN
    StepStringFlag := Off ; { will get set in the interrupt routine }
    DigitNumber := 0 ; { used in stage the data with the web. }
    SpitInkPrefix ;
    SetIntVec( $0F, @WithTheWebInt_Count);   { can't pass an interrupt vector }
    IF ImmediateExit
        THEN GoTo PastPrintLoop ;
    Flash( 11, 25, 'Printing ');
    PrinterInterruptGate( On );
{-----------------------------------------------------------}
{ main print engine loop for with the web, count }
    REPEAT { PrintLoop }
        IF StepStringFlag
            THEN BEGIN
                StepString ;
                IF WebDirection = Reverse
                    THEN RevStr( Messages[0] );
                StepStringFlag := Off ;
            END ;
        IF Keypressed
            THEN ScanKeyBoard ;
{$IFDEF TimeOfFlight}
        IF NOT InWhiteSpace[0]
            THEN CalcTOF ;
{$ENDIF}
    UNTIL Done ;
{-----------------------------------------------------------}
PastPrintLoop :
    SpitInkSuffix ;
END ; { SpitInkWithTheWeb_Counting }
{===========================================================}
{ MenuSys.Inc ... all the menu selection stuff.}
{===========================================================}
PROCEDURE EndOfJob ;
BEGIN { EndOfJob }
    ClrScr ;
    Writeln ;
    Writeln('NOTICE :');
    Writeln(' To correct the time of day clock which has been stopped during');
    Writeln(' the execution of this program, Please restart this computer.');
    Writeln ;
END ; { EndOfJob }
{===========================================================}
BEGIN { Main }
    Initialize ;
    MainSelect ;
    EndOfJob ;
END . { Main }
{===========================================================}

{ FileName : Hardware.Inc   }

{ declaration of constants for PC port assignments }
{ has all related printer port routines and counter-timer functions }

CONST
    { Printer Port Addresses }  { A "DB-25 female connector is used for }
                                { the printer port on a pc, it is meant }
                                { to get converted to a Centronics type }
                                { connector thru a ribbon cable.        }

DataPort = $378 ; { data which is sent there can be read back, this }
                     { which is not to be confused with an input port. }
```

```
ControlPort = $37A ; {========================================}
                    { $01=DB25- 1 assigned to data strobe,     }
                    {            in alt. mode strobes data into}
                    {            the selected drop control ram.}
                    {    please note that this bit is inverted!}
                    {------------------------------------------}
                    { $02=DB25-14 assigned to print strobe,    }
                    {            in alt. mode loads the range  }
                    {            register of the selected DIDI.}
                    {    please note that this bit is inverted!}
                    {------------------------------------------}
                    { $04=DB25-16 assigned to phase strobe,    }
                    {            in alt. mode strobes control  }
                    {            word data into selected DIDI. }
                    {------------------------------------------}
                    { $08=DB25-17 assigned to auxillary modes  }
  i.e., 0 = normal & 1 = alternate.}
                    {    please note that this bit is inverted!}
                    {------------------------------------------}
                    { $10=interupt enable,                     }
                    {    ties $40 bit on status port to IRQ7.  }
                    {------------------------------------------}
                    { $20 not used by PC hardware.             }
                    {------------------------------------------}
                    { $40 not used by PC hardware.             }
                    {------------------------------------------}
                    { $80 not used by PC hardware.             }
                    {==========================================}

StatusPort = $379 ; {========================================}
                    { $01 not used by pc hardware.             }
                    { $02 not used by pc hardware.             }
                    { $04 not used by pc hardware.             }
                    { $08=DB25-15 not assigned.                }
                    { $10=DB25-13 not assigned.                }
                    { $20=DB25-12 not assigned.                }
                    { $40=DB25-10 assigned as tach timing pulses,}
                    {    please note that this bit is inverted }
                    {    and is tied to IRQ7 thru a gate which }
                    {    is controled by the $10 bit of the    }
                    {    control port, 1 = Interrupts enabled. }
                    { $80=DB25-11 not assigned.                }
                    {==========================================}

{ Counter-Timer Port Addresses }

CTcontrolPort = $43 ; CTchannel_0 = $40 ;

{-----------------------------------------------------------------}
{ The DIDI-Command-Bit-Registers are accessed through sending the }
{ control-register-data-byte ( which includes head address, command bit address}
{ and the data ) to the data-port and toggling the phase-strobe line while the }
{ auxillary mode is set high, i.e., alternate mode ( for data, print and phase }
{ strobe lines).}
{ Control-Data-Byte : $01 = head-address bit0.}
{                     $02 = head-address bit1.}
{                     $04 = head-address bit2.}
{                     $08 = not allocated.}
{                     $10 = bit-command address0.}
{                     $20 = bit-command address1.}
{                     $40 = bit-command address2.}
{                     $80 = data for bit-command.}
{-----------------------------------------------------------------}
TYPE
    CommandType = ( {0} PrinterReset,  { 0 = normal operation }
                                       { 1 = printer & DIDI reset }
```

```
            {1} DropBoardClr,   { 0 = normal operation }
                                { 1 = just DIDI reset }

{2} Master,         { 0 = passive operation }
                                { 1 = gates tach and que to status port }

{3} HeadSelect,     { 0 = normal operation }
                                { 1 = forces this DIDI to listen to data bus }

{4} UserPort2,      { 0 = }
                                { 1 = }

{5} UserPort1,      { 0 = tachometer channel A - Imperial }
                                { 1 = tachometer channel B - Metric }

{6} AltRamBank,     { 0 = }
                                { 1 = }

{7} AltRaster );    { 0 = raster 1 on drop control board }
                                { 1 = raster 2 on drop control board }
{$IFDEF TimeOfFlight }
VAR
     CurrentCount   : Word ;
         Distance   : Real ;
       LapsedTime   : Real ;
         Velosity   : Real ;

CalcAvg  : Boolean ;
          TOF_Flag  : Boolean ;
       TargetDelay  : Integer ;
       TempDelaySum : Integer ;
         TempCount  : Integer ;
       CurrentDelay : Integer ;
        FlightTime  : LongInt ;
{$ENDIF}
{ ------------------------------------------------------------------ }

PROCEDURE SelectAlternateMode ;
BEGIN
  { lower the auxillary strobe line. }
    ControlByte := ControlByte OR $08 ;
    Port[ ControlPort ] := ControlByte
END ; { SelectAlternateMode }

{ ------------------------------------------------------------------ }

PROCEDURE  SetNormalMode ;
BEGIN { SetNormalMode }
  { raise the auxillary strobe line. }
    ControlByte := ControlByte AND $F7 ;
    Port[ ControlPort ] := ControlByte
END ; { SetNormalMode }

{ ------------------------------------------------------------------ }

PROCEDURE OutputAbyte( aByte : BYTE );
BEGIN { OutputAbyte }
   Port[ DataPort ] := aByte ;

{ raise the data strobe line }
    ControlByte := ControlByte OR $01 ;
    Port[ ControlPort ] := ControlByte ;

{ lower the data strobe line }
    ControlByte := ControlByte AND $FE ;
    Port[ ControlPort ] := ControlByte ;
END ; { OutputAbyte }
```

```
{ _____ }
{ _____ }

PROCEDURE IssuePrintCmd ;
{ changed Dec 12, 90 so the the polarity of this signal is back to normal.}
BEGIN { IssuePrintCmd }
  { raise the print line }
    ControlByte := ControlByte OR $02 ; { AND $FD ;}
   Port[ ControlPort ] := ControlByte ;

{ lower the print line }
    ControlByte := ControlByte AND $FD ; { OR $02 ;}
    Port[ ControlPort ] := ControlByte ;
END ; { IssuePrintCmd }

{ _____ }

PROCEDURE OutputRange( aByte : BYTE );
BEGIN { OutputRange }
   SelectAlternateMode;
   Port[ DataPort ] := aByte ;
   IssuePrintCmd;
   SetNormalMode
END ; { OutputRange }

{ _____ }

PROCEDURE OutputCtrlByte( aByte : BYTE );
BEGIN { OutputCtrlByte }
   SelectAlternateMode ;
   Port[ DataPort ] := aByte ;
{--Flash( 25,30,'control '+ HexofB( aByte )+' '+ HexofI(dataport));}

{ raise the phase line }
    ControlByte := ControlByte AND $FB ; { OR $04 }
    Port[ ControlPort ] := ControlByte ;
  { lower the phase line }
    ControlByte := ControlByte  OR $04 ; { AND $FB }
    Port[ ControlPort ] := ControlByte ;
   SetNormalMode ;
{--readln  CHB Debug & Flash }
END ; { OutputCtrlByte }

{ _____ }

PROCEDURE RequestPhasing ;
BEGIN { RequestPhasing }
  { raise the phase line }
    ControlByte := ControlByte AND $FB ; {  OR $04 }
    Port[ ControlPort ] := ControlByte ;

{ lower the phase line }
    ControlByte := ControlByte  OR $04 ; { AND $FB }
    Port[ ControlPort ] := ControlByte ;
END ; { RequestPhasing }

{ _____ }

PROCEDURE PrinterInterruptGate(Enable  : BOOLEAN);
BEGIN { PrinterInterruptGate }
    IF Enable
       THEN BEGIN
           ControlByte := ControlByte OR $10 ;
           Port[ ControlPort ] := ControlByte ;
       END
       ELSE BEGIN
           ControlByte := ControlByte AND $EF ;
           Port[ ControlPort ] := ControlByte ;
       END ;
END ; { PrinterInterruptGate }
```

```
{ --------------------------------------------------------------------------- }

PROCEDURE PrinterCommand( TheCommand : CommandType ;

SetFlag : Boolean ;
                          WhichHead : Byte );
VAR
   CtrlDataByte, RegisterAddress : Byte ;
BEGIN { PrinterCommand }
 { set head address into control data byte.}
   CtrlDataByte := WhichHead AND $07 ;

{ set command type into control data byte.}
   Case TheCommand OF { this selects the individual control register on DIDI.}
      PrinterReset  : RegisterAddress := 0 ;
      DropBoardClr  : RegisterAddress := 1 ;
           Master   : RegisterAddress := 2 ; { 1 = gate encoder pulses to status port.}

HeadSelect    : RegisterAddress := 3 ; { tells DIDI to pay attention to the data p
ort. }
          UserPort2 : RegisterAddress := 4 ;
          UserPort1 : RegisterAddress := 5 ; { used to select between imperial and metri
c encoders.}
          AltRamBank : RegisterAddress := 6 ;
          AltRaster  : RegisterAddress := 7 ; { 0 = raster1, & 1 = raster2.}
      END ; { case }
      CtrlDataByte := CtrlDataByte OR (RegisterAddress SHL 4);

{ set data-bit into control-data-byte. }
    IF SetFlag
       THEN CtrlDataByte := CtrlDataByte OR $80 ;
       { ELSE do nothing, it is already a low. }

OutPutCtrlByte(CtrlDataByte);
END ; { PrinterCommand }

PROCEDURE InterruptsOn;
    inline($FB);

PROCEDURE InterruptsOff;
    inline($FA);

PROCEDURE SendEOI;
    inline( $B0/$20/   $E6/$20);

PROCEDURE InterruptExit ;
BEGIN
    StatusByte := Port[ StatusPort ]; { AND $F8 ;  only upper 5 bits used }
    {$IFDEF TimeOfFlight}
    { capture the time since the last interupt }
       Port[ CTcontrolport ] := $04 ; { tell CT to latch the current value }
       Port[ CTcontrolport ] := $24 ; { tell CT you want the high byte }
       CurrentCount := Port[ CTchannel_0 ];
       Port[ CTcontrolport ] := $14 ; { tell CT you want the low byte }
       CurrentCount := NOT ((CurrentCount SHL 8) + Port[ CTchannel_0 ] );
    { reset counter for next tach }
       Port[ CTcontrolport ] := $30 ; { reset counter }
       Port[ CTchannel_0 ] := $FF; Port[ CTchannel_0 ] := $FF;
    {$ENDIF}
END ;

{ /////////////////////////////////////////////////////////////////////////// }

?URE AcrossTheWebInt ; interrupt;
   {     ter interrupt procedure - int7 at interrupt vector $0F i.e. 0:005C,D,E,F}
   BEGIN   AcrossTheWebInt }
      InterruptsOff ;
      IF CheckEncoder
         THEN Inc( NumberOfTachs )   {CHB}
         ELSE BEGIN
```

```
            StageTheDataAcrossTheWeb   ;
            UpdateIndexesAcrossTheWeb  ;
            IssuePrintCmd ;
         END ;
      InterruptExit ;
      InterruptsOn ;
      SendEOI ;
END ; { AcrossTheWebInt }

{ ///////////////////////////////////////////////////////////////////////// }

PROCEDURE WithTheWebInt_Time ; interrupt;
{ printer interrupt procedure - int7 at interupt vector $0F i.e. 0:005C,D,E,F}
BEGIN { WithTheWebInt_Time }
      InterruptsOff ;
      IF CheckEncoder
         THEN Inc( NumberOfTachs )    {CHB}
         ELSE BEGIN
            StageTheDataWithTheWeb ;
            UpdateIndexesWithTheWeb_Time   ;
            IssuePrintCmd ;
         END ;
      InterruptExit ;
      InterruptsOn ;
      SendEOI ;
END ; { WithTheWebInt_Time }

{ ///////////////////////////////////////////////////////////////////////// }

PROCEDURE WithTheWebInt_Text ; interrupt;
{ printer interrupt procedure - int7 at interupt vector $0F i.e. 0:005C,D,E,F}
BEGIN { WithTheWebInt_Text }
      InterruptsOff ;
      IF CheckEncoder
         THEN Inc( NumberOfTachs )    {CHB}
         ELSE BEGIN
            StageTheDataWithTheWeb ;
            UpdateIndexesWithTheWeb_Text   ;
            IssuePrintCmd ;
         END ;
      InterruptExit ;
      InterruptsOn ;
      SendEOI ;
END ; { WithTheWebInt_Text }

{ ///////////////////////////////////////////////////////////////////////// }

PROCEDURE WithTheWebInt_Count ; interrupt;
{ printer interrupt procedure - int7 at interupt vector $0F i.e. 0:005C,D,E,F}
BEGIN { WithTheWebInt_Count }
      InterruptsOff ;
      IF CheckEncoder
         THEN In
c( NumberOfTachs )    {CHB}
         ELSE BEGIN
            StageTheDataWithTheWeb ;
            UpdateIndexesWithTheWeb_Count   ;
            IssuePrintCmd ;
         END ;
      InterruptExit ;
      InterruptsOn ;
      SendEOI ;
END ; { WithTheWebInt_Count }

{ ///////////////////////////////////////////////////////////////////////// }

{ FileName : MenuSys.Inc }

TYPE
```

```
    String30   = STRING[30];
    StrPointer = ^String30;
    CmdMenuType = ARRAY[0..10] OF String30;

CONST
    HeadMenuTxt : CmdMenuType = ('Exit',
                                 'Head mode is ',
                                 'Select H Cmd',
                                 'Talk to Head number ',
                                 'Toggle control bit ',
                                 'Select range',
                                 'Select head','Set Head range ',
                                 'Deselect head',
                                 'Issue Head Command ',
                                 ' Manual Head setup MENU ');
TYPE
    CmdMenuRec = RECORD
            MenuData : CmdMenuType ;
                ULR : BYTE ; { UL Row }
                ULC : BYTE ; { UL Col }
                try : INTEGER ;
              First : BOOLEAN ;
               done : BOOLEAN
                END ; { record }

VAR MenuDoneLooking : BOOLEAN ;
        Head_menu : CmdMenuRec ;

{===========================================================================}

FUNCTION Number2string( x, presentation : REAL ) : STRING ;
VAR     s : STRING ; i, Digits, Decimals : INTEGER ;
BEGIN
    Digits := Trunc(presentation);
    Decimals := Trunc((presentation - Digits ) * 10);
    Str( x :Digits :Decimals , s );
    i := 1 ;
    WHILE (s[i] = space) AND (i <= Length(s)
    ) DO BEGIN
        s[i] := '0'; Inc(i)                             END ;
        Number2string := s
END ; { Number2string }

{===========================================================================}

PROCEDURE CloseOldMenu( VAR Menu : CmdMenuRec );
BEGIN
    IF Menu.Done
        THEN                            BEGIN
            CloseWindow ;
            Menu.done := FALSE ;
            Menu.first := TRUE END ;
END ;
{ --------------------------------------------------------------------- }
FUNCTION GetKeyCmd( VAR here : INTEGER ): CHAR;
VAR     cmd : CHAR;
BEGIN   { GetKeyCmd }
    cmd := ReadKey;
    IF cmd = nul
        THEN cmd := ReadKey
        ELSE IF cmd IN ['0'..'9']
                THEN BEGIN here := Ord(cmd) - $30; cmd := CR END
                ELSE IF cmd <> CR
                        THEN IF cmd <> Esc
                                THEN cmd := nul;
    GetKeyCmd := Cmd
END ; { GetKeyCmd }
{ --------------------------------------------------------------------- }
FUNCTION MenuItem( VAR Menu : CmdMenuRec ): INTEGER;
```

```
VAR     line, last : INTEGER; L_pointer : StrPointer;
        selected : BOOLEAN; Kcommand : CHAR;
{ ───────────────────────────────────────────────────────────────────── }
PROCEDURE FlashMenu( VAR Menu : CmdMenuRec );
VAR     line : INTEGER; L_pointer : StrPointer;
BEGIN { FlashMenu }
  MenuDoneLooking := FALSE ; selected := FALSE;
  WITH Menu DO                                                    BEGIN
    OpenWindow( ULR, ULC, MenuData[10], 11, 40 );      first := FALSE ;
    FOR line := 0 TO 9 DO                                         BEGIN
        L_pointer := @MenuData[line];
        Flash( line+1,2,Nstr(line,1.0)+space+L_pointer^)    END  END
END ; {FlashMenu }
{ ───────────────────────────────────────────────────────────────────── }
PROCEDURE ShowItem( mvid : MonoVids; ItemLine : BYTE );
VAR     L_pointer : StrPointer;
BEGIN
   SetMonoAttr( mvid );
   L_pointer := @Menu.MenuData[ItemLine];
   Flash( ItemLine+1,4,L_pointer^);
   SetMonoAttr( Normal_Vid );
END ; { ShowItem }
{ ───────────────────────────────────────────────────────────────────── }
BEGIN { MenuItem}
    Brite := TRUE;
    IF Menu.first
        THEN FlashMenu( Menu );
    line := Menu.try ;
    ShowItem(reverse_Vid,line);
    REPEAT
        last := line;
        selected := FALSE ;
        CASE GetKeyCmd( line ) OF
           DownKey : IF line = 9 THEN line := 0 ELSE Inc(line);
             UpKey : IF line = 0 THEN line := 9 ELSE Dec(line);
           homeKey : line := 0 ;
            endKey : line := 9 ;
               Esc : BEGIN
                        selected := TRUE ;
                        line := 0 ;
                     END ;
                CR : BEGIN
                        selected := TRUE;
                        stat := OK_field ;
                     END ;
              ELSE BeepKey
            END ; { case }
        ShowItem(normal_Vid,last);
        ShowItem(reverse_Vid,line);   last := line ;
        Menu.try := last
    UNTIL selected;
    Brite := FALSE;
    MenuItem := line
END ; { MenuItem }
{=====================================================================}
PROCEDURE HeadMenu ;
VAR
    ColorSav, Cflag, HeadNum, H_cmd : BYTE ;
         SUP : INTEGER ;
       C_bit : BOOLEAN;
      statHM : CRTfields ;
       Range : HexStr;
     HeadCmd : CommandType ;
BEGIN
    HeadNum := 0 ;
    Range := '00';
    Cflag := 1 ;
    HeadCmd := AltRaster ;
    ColorSav := FrameBkgnd ; FrameBkgnd := blue ;
    C_bit := On ;
```

```
REPEAT
    SUP := MenuItem( Head_menu );
    CASE SUP OF
        0 : Head_menu.Done := TRUE ;
        1 : XferEnable := NOT XferEnable ;
        2 : IF HeadCmd = AltRaster
                THEN HeadCmd := PrinterReset
                ELSE Inc(HeadCmd);
        3 : IF HeadNum = 7
                THEN HeadNum := 0
                ELSE Inc( HeadNum ) ;
        4 : C_bit := NOT C_bit ;
        5 : statHM := GetStr( 6, 26, '', 2, Range, getnow);
        6 : PrinterCommand( HeadSelect, On, HeadNum );
        7 : OutputRange( ByteOf(range) );
        8 : PrinterCommand( HeadSelect, Off, HeadNum );
        9 : PrinterCommand( HeadCmd, C_bit, HeadNum );
    ELSE BeepKey END; {CASE}
    FlashInt( 4, 27, HeadNum, 1 );
    IF C_bit
        THEN Cflag := 1
        ELSE Cflag := 0 ;
    FlashInt( 5, 27, Cflag, 1 );
    Flash( 6, 26, Range );
    CASE HeadCmd OF
        PrinterReset  : {0} Flash( 3, 23, '0 - PrinterReset' );
        DropBoardClr  : {1} Flash( 3, 23, '1 - Drop Brd Clr' );
              Master  : {2} Flash( 3, 23, '2 - Master/Slave' );
          HeadSelect  : {3} Flash( 3, 23, '3 - Selected     ' );
           UserPort2  : {4} Flash( 3, 23, '4 - UserPort2    ' );
           UserPort1  : {5} Flash( 3, 23, '5 - Tach Select  ' );
         AltRamBank   : {6} Flash( 3, 23, '6 - AltRamBank   ' );
           AltRaster  : {7} Flash( 3, 23, '7 - Raster Sel   ' );
                END ; { case }
    IF XferEnable THEN Flash( 2,23,'Automatic') ELSE Flash( 2,23,' Manual   ')
    UNTIL Head_menu.done ;
    CloseOldMenu( Head_menu );
    FrameBkgnd := ColorSav
END; { HeadMenu }
{================================================================}
PROCEDURE DebugWindow ;
VAR         line : BYTE ;
BEGIN
    WITH Head_menu DO BEGIN
        MenuData := HeadMenuTxt ;
            first := TRUE ;
             done := FALSE ;
              ULR := 11 ;
              ULC := 37 ;
              try := 3 ;
    END ; { with }
    OpenWindow( 4,4,' System Setup ',19,75);
    Writeln(' Head-to-head gap ', Hd2Hd_gap:4:4, ' inches');
    Flash(2, 21, 'TachsPerInch   ');
    Writeln(TachsPerInchVar:4,
              '      TachsPerCM ',TachsPerCMvar:2 );
    Writeln(' Head-to-head gap (in pulses) ',StaggerFactor:4);
    Flash( 4,40,'TachsPerInterval');
    FlashInt( 4,56,TachsPerInterval,3);
    Writeln;
    FOR line := 0 TO 3 DO
        Writeln(' HeadOffsets[', line, '] ', HeadOffsets[line]:5);
    FOR line := 0 TO 3 DO
        Writeln(' Ch_Number', line:2,
                '  Counts = ', WhiteSpaceCnts[ line ]:4,
                '  Indexs = ', WhiteSpaceIndx[ line ]:4,
                '  WhSpFlg = ',InWhiteSpace[ line ] );
    Flash( 1,45,'Status Byte '+HexOfB(StatusByte));
    IF NoYesEsc( 18,15,'Need to modify Encoder pitch',No)
        THEN                                                BEGIN
```

```
        stat := GetInt( 2,21,'TachsPerInch        ',
                        2,TachsPerInchVar,GetNow  );
        stat := GetInt( 2,45,'TachsPerCM    ',2,
                        TachsPerCMVar,GetNow )       END ;
   IF NoYesEsc( 18, 15, 'Need to modify head-to-head spacing', No)
       THEN stat := GetReal(1, 2, 'Head-to-head gap ', 6, Hd2Hd_gap, GetNow);

{$IFDEF TimeOfFlight }
   GotoXY( 1,13 );
   Write('Distance   ',distance:7:0); Writeln(' CurrentDelay ', CurrentDelay:4 );
   stat := GetInt( 14,19,'TOF gain constant ',4,FlightTime,Show1st);
   IF NoYesEsc( 18,9,'Need to modify TOF gain constant( 3.5 ms)',No)
       THEN stat := GetInt( 14,19,'TOF gain constant ',4,FlightTime,GetNow  );
{$ENDIF}
   IF NoYesEsc( 18,15,'Deal directly with printheads',No)
       THEN HeadMenu ;
(*
   Flash( 18,10,'Exit normal menu to use any new values that you changed.');
   Delay(3000);
*)
   CloseWindow
END; { DebugWindow }
{==================================================================}
PROCEDURE GetResponse ( AcceptCharSet : SetOfChar );
{ waits for keyboard input until it is in the acceptable character set,}
{ and sets the variable called response to the character }
BEGIN { GetResponse }
     REPEAT
        Response := ReadKey ;
        IF Response = Nul { leading null for extended character codes }
           THEN IF KeyPressed
                   THEN BEGIN
                          Response := ReadKey ; { get rid of other character }
                          IF Response = Cntl_F1
                             THEN DebugWindow
                             ELSE IF Response = Cntl_F2
                                     THEN BEGIN
                                        DIDIinit ;
                                        Beep ; Beep ; Beep ;
                                        END ;
                          Response := Nul ; { make sure it doesn't interfere }
                          END
                   ELSE { nothing else to do }
           ELSE Response := UpCase( Response );
        IF Response IN AcceptCharSet
           THEN { do nothing }
           ELSE Beep ;
     UNTIL Response IN AcceptCharSet
END ; { GetResponse }

{==================================================================}
PROCEDURE Setup ;

{ setup includes all printing options, e.g., direction, orientation, }
{ mensuration, print interval and type of text.                      }
{------------------------------------------------------------------}
PROCEDURE QueryPrintInterval ;
VAR   LI : LongInt;
BEGIN { QueryPrintInterval }
   REPEAT
      IF ( NumberOfIntervals <= 0 ) OR ( NumberOfIntervals > UpperLimit )
         THEN BEGIN
            Blinking := On ; SetTxtAttr ;
            Flash( 15, 40,'OUT of range!  0 < Number <= '+Nstr(UpperLimit,2));
            Blinking := Off ; SetTxtAttr ;
            Beep ;
            END ;
      LI := NumberOfIntervals ;
      Stat := GetInt( 15, 20, '', 2, LI, GetNow );
      NumberOfIntervals := LI;
```

```
        TIL ( NumberOfIntervals > 0 ) AND ( NumberOfIntervals <= UpperLimit ) ;
     ash( 15, 40, '                                                     ');
END ; { QueryPrintInterval }
{------------------------------------------------------------------------}
PROCEDURE SelectText  ;
{- - - - - - - - - - - - - - - - - - - - - - - - - - - - - - - - - - - - }
PROCEDURE Select_AM_PM ; { 5 choices }
BEGIN { Select_AM_PM }
    ClrScr ; Writeln ; Writeln ;
    Writeln('              AM - PM Choices');
    Writeln('              ---------------');
    Writeln ;
    Writeln('1. One Hour Interval.');
    Writeln('   e.g., 1AM, 2AM, ... , 11AM, 12N,');
    Writeln('         1PM, 2PM, ... , 11PM, 12M.');
    Writeln ;
    Writeln('2. Two Hour Interval, Even Hours.');
    Writeln('   e.g., 2AM, 4AM, 6AM, 8AM, 10AM, 12N,');
    Writeln('         2PM, 4PM, 6PM, 8PM, 10PM, 12M.');
    Writeln ;
    Writeln('3. Two Hour Interval, Odd Hours.');
    Writeln('   e.g., 1AM, 3AM, 5AM, 7AM, 9AM, 11AM,');
    Writeln('         1PM, 3PM, 5PM, 7PM, 9PM, 11PM.');
    Writeln ;
    Writeln('4. Four Hour Interval.');
    Writeln('   e.g., 4AM, 8AM, 12N, 4PM, 8PM, 12M.');
    Writeln ;
    Writeln('5. Six Hour Interval.');
    Writeln('   e.g., 6AM, 12N, 6PM, 12M.');
    Writeln ;
    Write( ' Enter Selection ->');

GetResponse( ['1'..'5', Esc ] );

CASE Response OF
      '1' : BEGIN { AM - PM, one hour interval }
              Messages[0] := 'MMMMMMMMMMM MMMMMMMMMMM ' ;
              Messages[1] := 'AAAAAAAAAAANPPPPPPPPPPPM' ;
              Messages[2] := '123456789012123456789012' ;
              Messages[3] := '            111         111' ;
              SequenceStr := '1AM, 2AM, 3AM, ..., 10PM, 11PM, 12M'
            END ;

'2' : BEGIN { AM - PM, two hour interval }
              Messages[0] := 'MMMMM MMMMM ' ;
              Messages[1] := 'AAAAANPPPPPM' ;
              Messages[2] := '246802246802' ;
              Messages[3] := '     11     11' ;
              SequenceStr := '2AM, 4AM, 6AM, ..., 8PM, 10PM, 12M'
            END ;

'3' : BEGIN { AM - PM, two hour interval }
              Messages[0] := 'MMMMMMMMMMMM' ;
              Messages[1] := 'AAAAAAPPPPPP' ;
              Messages[2] := '135791135791' ;
              Messages[3] := '     1     1' ;
              SequenceStr := '1AM, 3AM, 5AM, ..., 7PM, 9PM, 11PM'
            END ;

'4' : BEGIN { AM - PM, four hour interval }
              Messages[0] := 'MM MM ' ;
              Messages[1] := 'AANPPM' ;
              Messages[2] := '482482' ;
              Messages[3] := '   1 1' ;
              SequenceStr := '4AM, 8AM, 12N, 4PM, 8PM, 12M'
            END ;

'5' : BEGIN { AM - PM, six hour interval }
              Messages[0] := 'M M ' ;
              Messages[1] := 'ANPM' ;
```

```
                    Messages[2] := '6262' ;
                    Messages[3] := ' 1 1' ;
                    SequenceStr := '6AM, 12N, 6PM, 12M'
             END ;
      { ELSE must have been an escape }
      END ; { case }
END ; { Select_AM_PM }
{--------------------------------------------------------------------}
PROCEDURE Select_1_12_NON_AM_PM ; { 2 choices }
BEGIN { Select_1_12_NON_AM_PM }
{ put up selections }
   ClrScr ; Writeln ; Writeln ;
   Writeln('   1 - 12, NON AM - PM Choices');
   Writeln('   ------------------------');
   Writeln ;
   Writeln('1. One Hour Interval, Up To 12.');
   Writeln('   e.g., 01, 02, 03, 04, 05, 06,');
   Writeln('         07, 08, 09, 10, 11, 12.');
   Writeln ;
   Writeln('2. Two Hour Interval, Up To 12.');
   Writeln('   e.g., 02, 04, 06, 08, 10, 12.');
   Writeln ;
   Write( '  Enter Selection ->');

GetResponse( ['1', '2', Esc ] );

CASE Response OF
      '1' : BEGIN { 1 - 12 NON AM - PM # 1 } { one hour interval }
              Messages[0] := '123456789012' ;
              Messages[1] := '000000000111' ;
              Messages[2] := '            ' ;
              Messages[3] := '            ' ;
              SequenceStr := '01, 02, 03, ..., 10, 11, 12'
            END ;

'2' : BEGIN { 1 - 12 NON AM - PM # 2 } { two hour interval }
              Messages[0] := '246802' ;
              Messages[1] := '000011' ;
              Messages[2] := '      ' ;
              Messages[3] := '      ' ;
              SequenceStr := '02, 04, 06, 08, 10, 12'
            END ;
      { ELSE must have been an escape }
      END ; { case }
END ; { Select_1_12_NON_AM_PM }
{--------------------------------------------------------------------}
PROCEDURE Select_1_24_NON_AM_PM ; { 5 choices }
BEGIN { Select1_24_NON_AM_PM }
{ put up selections }
   ClrScr ; Writeln ; Writeln ;
   Writeln(' 1 - 24, NON AM - PM Choices');
   Writeln(' ---------------------------');
   Writeln ;
   Writeln('1. One Hour Interval.');
   Writeln('   e.g., 01, 02, 03, 04, 05, 06, 07, 08, 09, 10, 11, 12,');
   Writeln('         13, 14, 15, 16, 17, 18, 19, 20, 21, 22, 23, 24.');
   Writeln ;
   Writeln('2. Two Hour Interval.');
   Writeln('   e.g., 02, 04, 06, 08, 10, 12, 14, 16, 18, 20, 22, 24.');
   Writeln ;
   Writeln('3. Two Hour Interval.');
   Writeln('   e.g., 01, 03, 05, 07, 09, 11, 13, 15, 17, 19, 21, 23.');
   Writeln ;
   Writeln('4. Four Hour Interval.');
   Writeln('   e.g., 04, 08, 12, 16, 20, 24.');
   Writeln ;
   Writeln('5. Six Hour Interval.');
   Writeln('   e.g., 06, 12, 18, 24.');
   Writeln ;
   Write( '  Enter Selection ->');
```

```
        GetResponse( ['1'..'5', Esc ] );

CASE Response OF
          '1' : BEGIN { 24 NON AM - PM # 1 } { one hour interval }
                Messages[0] := '123456789012345678901234' ;
                Messages[1] := '000000000111111111122222' ;
                Messages[2] := '                        ' ;
                Messages[3] := '                        ' ;
                SequenceStr := '01, 02, 03, ..., 22, 23, 24'
              END ;

'2' : BEGIN { 24 NON AM - PM # 2 } { two hour interval }
                Messages[0] := '246802468024' ;
                Messages[1] := '000011111222' ;
                Messages[2] := '            ' ;
                Messages[3] := '            ' ;
                SequenceStr := '02, 04, 06, ..., 20, 22, 24'
              END ;

'3' : BEGIN { 24 NON AM - PM # 3 } { two hour interval }
                Messages[0] := '135791357913' ;
                Messages[1] := '000001111122' ;
                Messages[2] := '            ' ;
                Messages[3] := '            ' ;
                SequenceStr := '01, 03, 05, ..., 19, 21, 23'
              END ;

'4' : BEGIN { 24 NON AM - PM # 4 } { four hour interval }
                Messages[0] := '482604' ;
                Messages[1] := '001122' ;
                Messages[2] := '      ' ;
                Messages[3] := '      ' ;
                SequenceStr := '04, 08, 12, 16, 20, 24'
              END ;

'5' : BEGIN { 24 NON AM - PM # 5 } { six hour interval }
                Messages[0] := '6284' ;
                Messages[1] := '0112' ;
                Messages[2] := '    ' ;
                Messages[3] := '    ' ;
                SequenceStr := '06, 12, 18, 24'
              END ;
        { ELSE must have been an escape }
        END ; { case }
END ; { Select_1_24_NON_AM_PM }
{----------------------------------------------------------------}
PROCEDURE Select_Military ; { 5 choices }
BEGIN { Select_Military }
{ put up selections }
   ClrScr ; Writeln ;
   Writeln('     MILITARY Choices');
   Writeln('     ----------------');
   Writeln ;
   Writeln('1. One Hour Interval.');
   Writeln('   e.g.,  0100, 0200, 0300, 0400, 0500, 0600,');
   Writeln('          0700, 0800, 0900, 1000, 1100, 1200,');
   Writeln('          1300, 1400, 1500, 1600, 1700, 1800,');
   Writeln('          1900, 2000, 2100, 2200, 2300, 2400.');
   Writeln ;
   Writeln('2. Two Hour Interval, Even.');
   Writeln('   e.g.,  0200, 0400, 0600, 0800, 1000, 1200,');
   Writeln('          1400, 1600, 1800, 2000, 2200, 2400.');
   Writeln ;
   Writeln('3. Two Hour Interval, Odd.');
   Writeln('   e.g.,  0100, 0300, 0500, 0700, 0900, 1100,');
   Writeln('          1300, 1500, 1700, 1900, 2100, 2300.');
   Writeln ;
   Writeln('4. Four Hour Interval.');
   Writeln('   e.g.,  0400, 0800, 1200, 1600, 2000, 2400.');
   Writeln ;
```

```
        Writeln('5. Six Hour Interval.');
        Writeln('   e.g., 0600, 1200, 1800, 2400.');
        Writeln ;
        Write( ' Enter Selection ->');

GetResponse( ['1'..'5', Esc ] );

CASE Response OF
          '1' : BEGIN { Military, one hour interval }
                Messages[0] := '00000000000000000000000000';
                Messages[1] := '00000000000000000000000000';
                Messages[2] := '12345678901234567890  1234';
                Messages[3] := '00000000001111111111  2222';
                SequenceStr := '0100, 0200, 0300, ..., 2200, 2300, 2400'
                END ;
          '2' : BEGIN { Military, two hour interval }
                Messages[0] := '000000000000';
                Messages[1] := '000000000000';
                Messages[2] := '246802468024';
                Messages[3] := '000011111222';
                SequenceStr := '0200, 0400, 0600, ..., 2000, 2200, 2400'
                END ; { case }
          '3' : BEGIN { Military, two hour interval }
                Messages[0] := '000000000000';
                Messages[1] := '000000000000';
                Messages[2] := '135791357913';
                Messages[3] := '000001111122';
                SequenceStr := '0100, 0300, 0500, ..., 1900, 2100, 2300'
                END ;
          '4' : BEGIN { Military, four hour interval }
                Messages[0] := '000000';
                Messages[1] := '000000';
                Messages[2] := '482604';
                Messages[3] := '001122';
                SequenceStr := '0400, 0800, 1200, 1600, 2000, 2400'
                END ;
          '5' : BEGIN { Military, six hour interval }
                Messages[0] := '0000';
                Messages[1] := '0000';
                Messages[2] := '6284';
                Messages[3] := '0112';
                SequenceStr := '0600, 1200, 1800, 2400'
                END ;
          { ELSE must have been an escape }
        END ; { case }
   END ; { Select_Military }
{----------------------------------------------------------------------}
PROCEDURE Select_Sequential ; { Start Number, Increment Amount & Stop Number }
VAR
    Indx : Integer ;
{- - - - - - - - - - - - - - - - - - - - - - - - - - - - - - - - - - -}
PROCEDURE Select_counts; { directly input the count values }
CONST    Prompts : ARRAY[0..2] OF String =
                   ('Start Count : ',' Increment : ','Final Count : ');
VAR
    ReturnStatus : CrtFields ;
    EntryNum : Integer ; SetUpError : BOOLEAN ;
    RunningValue, NumberOfDigits, Intervals : LongInt ;
    CountString, RunValue : String ;
    Entries : ARRAY[0..2] OF LongInt;
    Points  : ARRAY[0..6] OF String ;
{ - - - - - - - - - - - - - - - - - - - - - - - - - - - - - - - - - -}
PROCEDURE GiveGetStringDirections ;
BEGIN { GiveGetStringDirections }
    Flash( 17,30,'Use Cursor Keys to select fields.');
    Flash( 18,30,' Hit Escape key to exit anytime.');
    Flash( 19,25,'Stop Count MUST be greater than Start Count.');
    Flash( 20,30,'Increment MUST be greater than Zero.');
END ; { GiveGetStringDirections }
{ - - - - - - - - - - - - - - - - - - - - - - - - - - - - - - - - - -}
```

```
PROCEDURE ShowSample ;
VAR       i : LongInt;
BEGIN
    Flash( 23,20,'Sample of the sequence to be printed.');
    Intervals    := (StopValue - StartValue) DIV StepValue ;
    Inc( Intervals);
    RunningValue := StartValue;
    i := 0 ;
    REPEAT
        Inc( RunningValue, StepValue ); Inc( i );
        IF i < 7 THEN
            Points[i] := Number2string( RunningValue,CountDigits )+', '
    UNTIL ( RunningValue >= StopValue ) OR ( i > 6 );
    RunningValue := StartValue ;
    Points[0] := Number2string( RunningValue, CountDigits ) + ', ';
    ClearLines( 24,1 );
    CountString := '';
    IF Intervals > 6
        THEN BEGIN
            Points[3] := ' ..., ';
            RunningValue := StartValue + (Intervals-3) * StepValue ;
            Points[4] := Number2string( RunningValue, CountDigits )+', ';
            Inc( RunningValue, StepValue );
            Points[5] := Number2string( RunningValue, CountDigits )+', ';
            Inc( RunningValue, StepValue );
            Points[6] := Number2string( RunningValue, CountDigits );
            FOR i := 0 TO 6 DO
                CountString := CountString + Points[i]
        END
        ELSE
            FOR i := 0 TO Intervals - 1 DO
                CountString := CountString + Points[i];
    HighestValue := StartValue + ((Intervals -1 ) * StepValue);
    IF HighestValue = StopValue
        THEN Flash( 22,14,'                                                         ')
        ELSE Flash( 22,14,'Last number of sequence does not match stop value');
    SequenceStr := CountString ;
    ShowPrintingAppearance( 24, SequenceStr );
    Flash( 25, 19, 'This results in a cycle of '+
                Nstr( Intervals, 3 ) + ' numbers.');
END ; { ShowSample }
```
--------------------------------------------------------

```
  EDURE BrowseEntry ;

.mOfDigitsOK, Satisfied : Boolean ;
        ShoEntry, R, lastR : Byte ;
BEGIN
    NumberOfDigits := CountDigits ;
    REPEAT
        NumOfDigitsOK := FALSE;
        ReturnStatus := GetInt( 12,42,'How many digits -> ',
                                1, NumberOfDigits,GetNow);
        IF MessageOrientation = WithTheWeb
            THEN IF NumberOfDigits < 7
                    THEN NumOfDigitsOK := TRUE
                    ELSE BeepKey
            ELSE IF NumberOfDigits < 5
                    THEN NumOfDigitsOK := TRUE
                    ELSE BeepKey ;
        IF NumberOfDigits < 1
            THEN BeepKey ;
    UNTIL NumOfDigitsOK ;
    CountDigits := NumberOfDigits ;
    ClearLines( 11, 5 );
    FOR ShoEntry := 0 TO 2 DO
        ReturnStatus := GetInt( 11 + ( ShoEntry * 2 ), 1, Prompts[ ShoEntry ],
                                CountDigits, Entries[ ShoEntry ], Show1st );
    CountDigits := NumberOfDigits ;
    R := 11 ;
    Satisfied := FALSE ;
    EntryNum := 0 ;
```

```
    ClearLines( 11,5 );
    GiveGetStringDirections ;
    REPEAT
        ReturnStatus := GetInt( R,1,Prompts[EntryNum],CountDigits,
                                Entries[EntryNum], GetNow );
        lastR := R;
        CASE ReturnStatus OF
          frst_field : EntryNum := 0;
          last_field : EntryNum := 2;
          next_field : IF EntryNum = 2
                          THEN EntryNum := 0
                          ELSE Inc(EntryNum);
          prev_field : IF EntryNum = 0
                          THEN EntryNum := 2
                          ELSE Dec(EntryNum);
           esc_field : Satisfied := TRUE;
            OK_field : IF EntryNum = 2
                          THEN EntryNum := 0
                          ELSE Inc(EntryNum)
        END {CASE} ;
        R := 11 + (EntryNum *2);
        SetUpError := FALSE ;
        StartValue := Entries[0];
        StepValue  := Entries[1];
        IF StepValue <= 0
            THEN                        BEGIN
                    Flash( 20,30,'                                      ');
                    Beep1;
                    Flash( 20,30,'Increment MUST be greater than Zero.');
                    SetUpError := TRUE ;
                    Satisfied := FALSE END;
        StopValue := Entries[2];
        IF StopValue <= StartValue
            THEN                        BEGIN
                    Flash( 19,25,'                                      .');
                    Beep1;
                    Flash( 19,25,'Stop Count MUST be greater than Start Count.');
                    SetUpError := TRUE ;
                    Satisfied := FALSE END;
        IF NOT SetUpError THEN ShowSample
    UNTIL Satisfied;
    Delay(400)
END ; { BrowseEntry }
{ _ _ _ _ _ _ _ _ _ _ _ _ _ _ _ _ _ _ _ _ _ _ _ _ _ }
BEGIN { SelectCounts }
 { text mode printing, i.e., repeating text strings }
    Heading ;
    Flash( 8,2,'User-Entered Repeating Count.');
    Flash( 9,2,'-----------------------------') ;
    Entries[0] := StartValue;
    Entries[1] := StepValue;
    Entries[2] := StopValue;
    ShowSample ;
    FOR EntryNum := 0 TO 2 DO
        ReturnStatus := GetInt( 11 + ( EntryNum * 2 ), 1,
                                Prompts[ EntryNum ], CountDigits,
                                Entries[ EntryNum ], Show1st );
    IF NoYesEsc( 16,30,'Do you need to modify these counts',No )
        THEN BrowseEntry ;

TextLengths[0] := CountDigits ; { need this for passing size of number }

(* this now gets handeled in xfer modes cause seq. order can change. }
    IF SequenceOrder = Ascending
        THEN CurrentValue := StartValue
        ELSE CurrentValue := HighestValue ;
    Str(CurrentValue:CountDigits, Messages[0]); { convert number to string }
    Indx := 1 ;
    WHILE (Messages[0][Indx] = ' ') AND (Indx <= CountDigits) DO BEGIN
        Messages[0][Indx]:= '0'; Inc( Indx );                    END;
```

```
*)
END ; { Select_counts }
{- - - - - - - - - - - - - - - - - - - - - - - - - - - - - - - - - - - - - - }
BEGIN { Select_Sequential }
 { counting mode }
   Heading ;
   Writeln ;
        Messages[0] := '01234567890123456789012345678901234567890123456789'+
                       '01234567890123456789012345678901234567890123456789';

Messages[1] := '00000000001111111111222222222233333333334444444444'+
                       '55555555556666666666777777777788888888889999999999';

Messages[2] := '                                                  '+
                       '                                                  ';

Messages[3] := '                                                  '+
                       '                                                  ';

AcrossTheWeb_CountMode_SeqStr := '00, 01, 02, ..., 97, 98, 99' ;

IF MessageOrientation = AcrossTheWeb
      THEN BEGIN
         SequenceStr := AcrossTheWeb_CountMode_SeqStr ;
         Writeln ; Writeln ;
         Writeln('      Start number    = 00');
         Writeln ;
         Writeln('      Increment Amount = 01');
         Writeln ;
         Writeln('      Terminal Count  = 99');
         Writeln ;
         Writeln ;
         Writeln('Number of Divisions = 100');
         WaitForUser ;
      END
      ELSE BEGIN
         Select_Counts ;
         WithTheWeb_CountMode_SeqStr := SequenceStr ;
      END
END ; { Select_Sequential }
{------------------------------------------------------------------}
PROCEDURE Select_User_Defined ; { directly input the text strings }
VAR
   ReturnStatus : CrtFields ;
   ShowLength, SaveX, SaveY : Integer ;
   UserColumns : LongInt ;
{- - - - - - - - - - - - - - - - - - - - - - - - - - - - - - - - - - - - - }
PROCEDURE GiveGetStringDirections ;
BEGIN { GiveGetStringDirections }
   GoToXY( 10, 18 );
   Writeln ;
   Writeln('                    Hit Esc to Exit. ');
   Writeln('           Use Cursor Keys to select fields.');
   Writeln('     Ins-Key toggles between OverWrite and Insert Modes.');
   Writeln('    ^T will delete from current position to the end of the string.');
   Writeln ;
END ; { GiveGetStringDirections }

{- - - - - - - - - - - - - - - - - - - - - - - - - - - - - - - - - - - - - }

PROCEDURE ShowPrintSequence ;
{ this procedure will generate the sequence string from the 4 message strings }
{ by making words from each of the columns.                                   }
VAR
   len, col, row : INTEGER ;
BEGIN
   SequenceStr := '';
   len := Length( Messages[0] );
   IF len < 8
      THEN { show all of them }
         FOR col := 1 TO Len DO
```

```
                    FOR row := 3 DOWNTO -1 DO
                        IF row = -1
                            THEN SequenceStr := SequenceStr + ', '
                            ELSE SequenceStr := SequenceStr + Messages[ row, col ]
            ELSE BEGIN { show 1st 3 and last 3 values with continuation in between. }
                FOR col := 1 TO 3 DO
                    FOR row := 3 DOWNTO -1 DO
                        IF row = -1
                            THEN SequenceStr := SequenceStr + ', '
                            ELSE SequenceStr := SequenceStr + Messages[ row, col ];
                SequenceStr := SequenceStr + '..., ' ;
                FOR col := len - 2 TO Len DO
                    FOR row := 3 DOWNTO -1 DO
                        IF row = -1
                            THEN SequenceStr := SequenceStr + ', '
                            ELSE SequenceStr := SequenceStr + Messages[ row, col ]
            END ; { else }
        Delete( SequenceStr, Length(SequenceStr)-1, 2 ); { get rid of extra ', '}
        ClearLines( 17, 1 );
        ShowPrintingAppearance( 17, SequenceStr ) ;
END ; { ShowPrintSequence }
{- - - - - - - - - - - - - - - - - - - - - - - - - - - - - - - - - - - - - - - }
PROCEDURE BrowseEntry ;
VAR
    Satisfied : BOOLEAN ;
    R, lastR : BYTE ;
BEGIN
    UserColumns := ShowLength ;
    ReturnStatus := GetInt( 25, 2,
                            'How many columns are necessary? ( max = 63 ) -> ',
                            2, UserColumns, GetNow );
    ClearLines( 25, 1);
        SaveY; ClearLines( R, 4 );
        Length := UserColumns;
        ShowLength > 63
        THEN ShowLength := 63 ;
    Satisfied := FALSE; ChNum := 0;
    GiveGetStringDirections ;

Brite := On ;
    SetMonoAttr( Normal_Vid );
    SetTxtAttr ;

REPEAT
        ShowPrintSequence ;
        ReturnStatus := GetStr( R, 1, 'Edit Ch.Num. ' +
                                        NStr(ChNum+1,1.0) + ' ->',
                                        ShowLength,
                                        Messages[ ChNum ], GetNow );

lastR := R ;
        CASE ReturnStatus OF
            frst_field : ChNum := 0 ;
            last_field : ChNum := 3;
            next_field : IF ChNum = 3
                            THEN ChNum := 0
                            ELSE Inc( ChNum );
            prev_field : IF ChNum = 0
                            THEN ChNum := 3
                            ELSE Dec( ChNum );
            esc_field : Satisfied := TRUE ;
            OK_field : IF ChNum = 3
                            THEN ChNum := 0
                            ELSE Inc( ChNum );
        END ; {case}
        Flash( lastR, 1, '    ' );
        R := SaveY + ChNum ;
    UNTIL Satisfied ;
END ; { BrowseEntry }
{- - - - - - - - - - - - - - - - - - - - - - - - - - - - - - - - - - - - - - - }
BEGIN { Select_User_Defined }
```

```
{ text mode printing, i.e., repeating text strings }
   Heading ;
   Writeln ;
   Writeln('                          User-Entered Repeating Strings.');
   Writeln('                          ─────────────────────────────,') ;
   Writeln('                          Words are formed from the columns!');
   Writeln ;

SaveX := WhereX ;  SaveY := WhereY ;
   FOR ChNum := 0 TO 3 DO BEGIN
      ShowLength := Length( Messages[ ChNum ] );
      IF ShowLength > 63
          THEN ShowLength := 63 ;
      ReturnStatus := GetStr( WhereY, 1,
                         ' Ch.Num. ' + NStr(ChNum+1,1,0) + ' ->',
                         ShowLength,Messages[ChNum],  Show1st );
      Writeln ;
   END ; { for }
   ShowPrintSequence ;
   IF NoYesEsc( 24, 5, 'Do you need to modify the strings', No )
      THEN BrowseEntry ;
END ; { Select_User_Defined }
{─────────────────────────────────────────────────────────────────────}
BEGIN { SelectText }
   Heading ;
   Writeln;
   Writeln('                       Select Text');
   Writeln('                       ───────────');
   Writeln ;
   Writeln('                       1. AM - PM. ');
   Writeln ;
   Writeln('                       2. 1 - 12, NON AM - PM.');
   Writeln ;
   Writeln('                       3. 1 - 24, NON AM - PM.');
   Writeln ;
   Writeln('                       4. Military.');
   Writeln ;
   Writeln('                       5. Sequential.');
   Writeln ;
   Writeln('                       6. User Defined.');
   Writeln ;
   Writeln('                       E. Exit.');
   Writeln ;
   Write('                        Enter Selection ->');

GetResponse( ['1'..'6', 'E', Esc ] );

CASE Response OF
     '1' : BEGIN
              Select_AM_PM ;  { 5 choices }
              WithTheWebMode := Time ;
           END ;

'2' : BEGIN
              Select_1_12_NON_AM_PM  ;  { 2 choices }
              WithTheWebMode := Time ;
           END ;
     '3' : BEGIN
              Select_1_24_NON_AM_PM  ;  { 5 choices }
              WithTheWebMode := Time ;
           END ;
     '4' : BEGIN
              Select_Military ;  { 5 choices }
              WithTheWebMode := Time ;
           END ;
     '5' : BEGIN
              { Start Number, Increment Amount & Stop Number. }
              Select_Sequential ;
              WithTheWebMode := Counting ;
           END ;
```

```
        '6' : BEGIN
                 Select_User_Defined ; { directly input the text strings }
{-----}          WithTheWebMode := Time ; { was Text }
              { Text mode eliminated, so that 'back door' will work in both
              { with the web and across the web modes. 12/20/90 Vince LaSusa.}
              END ;
      ELSE { must have been an 'E' or an Esc, so back to setup menu }
   END ; { case }
   ClrScr ;
   Heading ;
END ; { SelectText }

PROCEDURE SetupMenu ;
CONST
   F_Selected   = 'Forward printing';
   R_Selected   = 'Reverse printing';
   ATW_Selected = 'Across the web';
   WTW_Selected = '  With the web';

BEGIN { SetupMenu }
   Flash( 7,10,'--------            Setup Menu');
   Writeln('            ----------');
   Writeln ;
   Write( '     1. Orientation of Printing is ');
   IF MessageOrientation = AcrossTheWeb
      THEN Writeln('ACROSS the web.')
      ELSE Writeln(' WITH the web.');
   Writeln ;
   Write( '     2. Direction of Message is ');
   IF WebDirection = Fourward
      THEN Writeln('FORWARD.')
      ELSE Writeln('REVERSE.');
   Writeln ;
   Write( '     3. Web intervals measured in ');
   IF Mensuration = Imperial
      THEN Writeln('ENGLISH units')
      ELSE Writeln(' METRIC units');
   Writeln;
   Write( '     4. Interval is ', NumberOfIntervals :2);
   IF Mensuration = Imperial
      THEN Writeln(' half-inch(es).')
      ELSE Writeln(' centimeter(s).');
   Writeln ;
   Writeln('     5. Selection of sequence to be printed:');
   ClearLines( 19, 1 );
   IF (WithTheWebMode = Counting)
      THEN IF MessageOrientation = AcrossTheWeb
              THEN SequenceStr := AcrossTheWeb_CountMode_SeqStr
              ELSE SequenceStr :=   WithTheWeb_CountMode_SeqStr  ;
{---- text mode with the web was eliminated }
      IF ( MessageOrientation = WithTheWeb ) AND ( WithTheWebMode = Text )
         THEN ShowPrintingAppearance( 19, Messages[0] )
         ELSE ShowPrintingAppearance( 19, SequenceStr );
{-----}
   Writeln ;
   Writeln ;
   Write( '     6. Sequences to be printed in ');
   IF SequenceOrder = Ascending
      THEN Writeln(' ASCENDING order.')
      ELSE Writeln('DESCENDING order.');
   Writeln ;
   Write( '     7. Vertical Orientation is ');
   IF VertOrientation = UpsideDown
      THEN Writeln('UP-SIDE-DOWN.   ')
      ELSE Writeln('RIGHT-SIDE-UP.  ');
   Writeln ;
   Write( '     Enter Selection Number or Esc to Exit ->');
END ; { SetupMenu }
```

```
VAR
    SetupExit : Boolean ;
BEGIN { Setup }
  { restore messages in case transfers modes reversed or rolled them. }
    Messages := SaveMsgs ;
    Heading ;
    SetupExit := False ;
    REPEAT
        SetupMenu ;
        IF NumberOfIntervals > UpperLimit
            THEN Response := '4' { i.e., QueryPrintInterval }.
            ELSE GetResponse( ['1'..'7', 'E', Esc ] );
        CASE Response OF
            '1' : IF MessageOrientation = AcrossTheWeb
                    THEN MessageOrientation := WithTheWeb
                    ELSE MessageOrientation := AcrossTheWeb;

'2' : IF WebDirection = Fourward
                    THEN WebDirection := Reverse
                    ELSE WebDirection := Fourward;

'3' : IF Mensuration = Imperial
                    THEN BEGIN
                        Mensuration := Metric ;
                        UpperLimit := 60 ;
                    END
                    ELSE BEGIN
                        Mensuration := Imperial ;
                        UpperLimit := 48 ;
                    END ;

'4' : QueryPrintInterval ;

'5' : SelectText ; { sub-menu for all availible text options }

'6' : IF SequenceOrder = Ascending
                    THEN SequenceOrder := Descending
                    ELSE SequenceOrder := Ascending ;

'7' : IF VertOrientation = UpsideDown
                    THEN VertOrientation := UpRight
                    ELSE VertOrientation := UpsideDown ;

'E', Esc : SetupExit := True ; { back to main menu }
        END ; { case }
    UNTIL SetupExit ;
    ClrScr ;
END ; { Setup }

{ ------------------------------------------------------------------------ }

PROCEDURE   MainSelect ;
VAR
    MainSelectExit : Boolean ;
PROCEDURE MainMenu ;
BEGIN { MainMenu }
    Heading ;
    Writeln('                         Main Menu');
    Writeln('                    ---------------------');
    Writeln ;
    Writeln('                         1. Setup.');
    Writeln ;
    Writeln('                         2. Print.');
    Writeln ;
    Writeln('                         ^Q. Quit.');
    Writeln ;
    IF NOT XferEnable
        THEN Writeln('            Print Heads are in manual mode.');
    Writeln ;
    Write('                         Enter Selection ->');
```

END ; { MainMenu }

BEGIN { MainSelect }
   MainSelectExit := False ;
   REPEAT
      MainMenu ;
      GetResponse([ '1','2', Nul, #$11{^Q} ]);
      CASE Response OF
         Nul : MainMenu ;
         '1' : Setup ;
         '2' : BEGIN { Print, spitting ink }
                  TransferModes ; { this will set up the strings for printing. }
                  IF MessageOrientation = AcrossTheWeb
                     THEN SpitInkAcrossTheWeb
                     ELSE CASE WithTheWebMode OF
                                  Time : SpitInkWithTheWeb_Time ;
                                  Text : SpitInkWithTheWeb_Text ;
                              Counting : SpitInkWithTheWeb_Count ;
                          END ; { case }
               END ; { 2 }
         {^Q} #$11 : MainSelectExit := True ; { just quit }
         { control 'Q' was selected because the 'Q' key is just under the '1'&'2'keys }
         { and I kept accidentally hitting it when I wanted to hit '2', this forced }
         { me to restart the program and go thru the setup menus again. }
         ELSE  Beep ;
      END ; { case }
   UNTIL MainSelectExit ;
END ; { MainSelect }
UNIT  IBMSTUFF ; { combination of IBM, CONVERT, CHBCRT, WINDOWS }
INTERFACE
USES  DOS, CRT;
CONST BEL = #$07; BS = #$08; Tab = #$09 ; LF = #$0A; FF = #$0C;
      CR = #$0D; Esc = #$1B; Space = #$20 ; Minus = #$2D; Nul = #$0 ;
      DC4 = #$14 ; EM = #$19 ;
      homeKey = #71 ; endKey = #79 ; insertKey = #82 ; deleteKey = #83 ;
      PgDn = #81 ; PgUp = #73 ; UpKey = #72 ; DownKey = #80 ;
      LeftKey = #75 ; RightKey = #77 ; Cntl_Left = #115; Cntl_Right = #116;
      Cntl_End = #117; Cntl_PgDn = #118; Cntl_Home = #119; Cntl_PgUp =#132;
      F1 = #59; F2 = #60; F3 = #61; F4 = #62; F5 = #63; F6 = #64; F7 = #65;
      F8 = #66; F9 = #67; F10 = #68;
      Cntl_F1 = #94; Cntl_F2 = #95; Cntl_F3 = #96; Cntl_F4 = #97; Cntl_F5 = #98;
      Cntl_F6 = #99; Cntl_F7 = #100; Cntl_F8 = #101; Cntl_F9 = #103;
      Cntl_F10 = #104;
      MonoBase = $B000 ; CGAbase = $B800 ;
      GetNov = FALSE; Show1st = TRUE; StatusLine = 25;
      normVidAt = $0E ; LowVidAt = $06 ;
      No = FALSE; Yes = TRUE;  escapeOK = TRUE ; NoEscape = FALSE ;

TYPE   cell =        RECORD
             S_ch : CHAR ;
          S_attr : BYTE END ;

screens = ^screenType ;
       screenType = ARRAY[1..25,1..80] OF cell ;

Str255 = STRING[255];  Str25 = STRING[25];  HexStr = STRING[2];
    HEXI = STRING[4];    HEXLI = STRING[8];

CRTfields = ( next_field, prev_field, frst_field, last_field,
                     esc_field, ok_field, null_field, help_field);
       MonoVids = ( normal_Vid, reverse_Vid, underline_Vid, invisible_Vid );

VAR       ... : CRTfields ; BackgrCol, ForegrCol : BYTE;
          ..._mode, CAPS, BeepOn, InsertCh, Blinking, Brite : BOOLEAN ;
          .creen : screenType ABSOLUTE MonoBase : $0000 ;
          Cscreen : screenType ABSOLUTE CGABase : $0000 ;
          ProperScreen : screens ;
          VPort : INTEGER; VidStart : WORD;
          FrameFgnd, FrameBkgnd : BYTE;       { WINDOWS }
          EscapeReq : BOOLEAN ;

```
FUNCTION Date_Time : STR25 ;     { IBM }
FUNCTION FirstPrime( TheNumber : INTEGER ): INTEGER ;  { CONVERT }
FUNCTION IntegerOf( Str : HEXI ): INTEGER ;
FUNCTION WordOf( Str : HEXI ): WORD ;
FUNCTION LongIntOf( Str : HEXLI ): LongINT ;
FUNCTION Nstr( x, presentation : REAL ) : STRING ;
FUNCTION ByteOf( Str : HexStr ): BYTE ;
FUNCTION HEXofB( X : BYTE ) : HexStr ;
FUNCTION HEXofI( X : INTEGER ) : HEXI ;
FUNCTION HEXofLI( X : LONGINT ) : HEXLI ;
FUNCTION CharOfB(Datum : BYTE ): CHAR ;    { CONVERT }
PROCEDURE BEEP ;                   { CHBCRT }
PROCEDURE BEEP1 ;
PROCEDURE beepKey ;
PROCEDURE ClearLines( First,Lines : INTEGER );
PROCEDURE SetTxtAttr ; {uses colors, Blinking & Brite }
PROCEDURE SetMonoAttr( BWcolor : MonoVids);
PROCEDURE DebugMsg( bugMsg : String ; aNumber : INTEGER );
PROCEDURE Flash( R,C : BYTE ; Message : String );
PROCEDURE FlashInt( R,C : BYTE; TheNumber : INTEGER; PresentationArea : BYTE );
FUNCTION  NoYes( R,C : BYTE; Query : String; theDefault : BOOLEAN ): BOOLEAN ;
FUNCTION  NoYesEsc( R,C : BYTE; Query : String; theDefault : BOOLEAN ): BOOLEAN ;
FUNCTION  GetStr( R,C  : BYTE;
            prompt : string;
         fieldSize : INTEGER;
    VAR theDefault : String;
           preView : BOOLEAN ): CRTfields ;

FUNCTION  GetInt( R,C  : BYTE;
            prompt : string;
         fieldSize : INTEGER;
    VAR theDefault : LongInt;
           preView : BOOLEAN ): CRTfields ;
FUNCTION GetReal( R,C  : BYTE;
            prompt : string;
         fieldSize : INTEGER;
    VAR theDefault : REAL ;
           preView : BOOLEAN ): CRTfields ;   {CHBCRT}

PROCEDURE ResetWindow ; { to screen size } { WINDOWS }
PROCEDURE SaveScreen( VAR dest : screens );
PROCEDURE ReStoreScreen( VAR source : screens );
PROCEDURE BlitzLine( R : BYTE ; TheSt
ring : String; Atrib : BYTE );
PROCEDURE BlitzString( R,C : BYTE ; TheString : String; Atrib : BYTE );
PROCEDURE OpenScrolWindow( topRow,rows : BYTE );
PROCEDURE OpenWindow( topRow,leftCol : BYTE; W_title : String;
                      Rows,Cols : BYTE);
PROCEDURE CloseWindow;              { WINDOWS }
FUNCTION Decision( title,msg,action : string ;
                escapeAllowed,Default : BOOLEAN): BOOLEAN;

IMPLEMENTATION

{ ------------------------ IBM   this originally DTSTAMP ------------------ }
{ -------- This Function Returns the Date and Time in a 25 char String ---- }
{ ------------------------------------------------------------------------- }
VAR       Regs : Registers ;
CONST     VideoInt = $10 ;

FUNCTION TimeStr : Str25 ;
CONST  GetTime = $2C ; { DOS FUNCTION CALL VALUE }
VAR    Hours, Minutes, Seconds, Fractions : INTEGER ;
       HourStr, MinStr                    : STRING[ 2 ];

{ ------------------------------------------------------------------------- }

PROCEDURE TIMER( VAR Hrs, Mins, Secs, Fracs : INTEGER );
BEGIN
    Regs.AX := GetTime SHL 8 ; { PUTS CALL VALUE INTO REGISTER AH }
```

```
        MSDOS( Regs ); { GO MAKE THE CALL }
        WITH Regs DO
            BEGIN
                Hrs   := HI( CX );
                Mins  := LO( CX );
                Secs  := HI( DX );
                Fracs := LO( DX );
            END  { WITH }
END ; { TIMER }

{ ------------------------------------------------------ }

BEGIN { TimeStr }
    Timer( Hours, Minutes, Seconds, Fractions );

STR( Hours : 2, HourStr );
    IF HourStr[ 1 ] = ' ' THEN HourStr[ 1 ] := '0';
    STR( Minutes:2, MinStr );
    IF MinStr[ 1 ] = ' ' THEN MinStr[ 1 ] := '0';
    TimeStr := HourStr + ':' + MinStr ;
END ; { TimeStr }

{ ------------------------------------------------------------------------------ }

FUNCTION DateStr : Str25 ;
CONST   GetDate = $2A ; { DOS FUNCTION CALL VALUE }
VAR     DayName, Month, Day, Year : INTEGER ;
        DayStr, YearStr            : STRING[ 2 ];
        MonthStr                   : STRING[ 3 ];
        DayNameStr                 : STRING[ 9 ];

{ ------------------------------------------------------ }

PROCEDURE DATER( VAR DyNm, Mon, Dy, Yr : INTEGER );

BEGIN
    Regs.AX := GetDate SHL 8 ; { PUTS CALL VALUE INTO REGISTER AH }
    MSDOS( Regs ); { GO MAKE THE CALL }
    WITH Regs DO
        BEGIN
            DyNm := LO( AX ); { 0 = SUN - 6 = SAT }
            Dy   := LO( DX ); { 1980 - 2099 }
            Mon  := HI( DX ); { 1 - 12 }
            Yr   := CX ;      { 1 - 31 }
        END ; { WITH }
END ; { DATER }

{ ------------------------------------------------------ }

BEGIN { DateStr }
    DATER( DayName, Month, Day, Year ) ;

CASE DayName OF
        0 : DayNameStr := '  Sunday  ';
        1 : DayNameStr := '  Monday  ';
        2 : DayNameStr := ' Tuesday  ';
        3 : DayNameStr := 'Wednesday';
        4 : DayNameStr := 'Thursday ';
        5 : DayNameStr := '  Friday  ';
        6 : DayNameStr := 'Saturday '
    ELSE  DayNameStr := 'Funny day'
    END ; { CASE }

CASE Month OF
        1 : MonthStr := 'Jan';
        2 : MonthStr := 'Feb';
        3 : MonthStr := 'Mar';
        4 : MonthStr := 'Apr';
        5 : MonthStr := 'May';
        6 : MonthStr := 'Jun';
```

```
      7 : MonthStr := 'Jul';
      8 : MonthStr := 'Aug';
      9 : MonthStr := 'Sep';
     10 : MonthStr := 'Oct';
     11 : MonthStr := 'Nov';
     12 : MonthStr := 'Dec'
   ELSE   MonthStr := 'X?X'
   END ; { CASE }

Str(Day :2, DayStr ) ;
       IF DayStr[ 1 ] = ' ' THEN DayStr[ 1 ] := '0' ;

Str( Year MOD 1900 :2, YearStr ) ;

DateStr := DayStr +' '+ MonthStr +' '+ YearStr +' '+ DayNameStr
END ; { DateStr }

{ ------------------------------------------------------------------ }

FUNCTION Date_Time ;
BEGIN    Date_Time := DateStr +' '+ TimeStr END ;

{*************************** CONVERT *********************************}

CONST    HexDigits : STRING[ 16 ] = '0123456789ABCDEF';

{ -- THIS FUNCTION CONVERTS A BYTE INTO A TWO-CHARACTER HEX String ------ }

FUNCTION HEXofB ;
BEGIN
    HEXofB := HexDigits[ ( X SHR 4 ) + 1 ] + HexDigits[ ( X AND $0F ) + 1 ]
END ; { HEXofB }

{ ------------------------------------------------------------------ }
{ THIS FUNCTION CONVERTS an Integer INTO A four-CHARACTER HEX String ------ }

FUNCTION HEXofI ;
BEGIN
    HEXofI := HEXofB( X Shr 8 ) + HEXofB( X AND $FF )
END ; { HEXofI }

{ ------------------------------------------------------------------ }

{ THIS FUNCTION CONVERTS a LongInteger INTO an 8-CHARACTER HEX String }

FUNCTION HEXofLI ;
BEGIN
    HEXofLI := HEXofI(X ShR 16) + HEXofI(X AND $FFFF)
END ; { HEXofLI }

{ ----------converts a real or Integer to a string  presentation REAL    -- }
{ presentation of 3.2 converts to 3 digits, a decimal point, & 1 decimal digit}

FUNCTION Nstr( x, presentation : REAL ) : STRING ;
VAR      s : STRING ; Digits, Decimals : INTEGER ;
BEGIN
    Digits := Trunc(presentation);
    Decimals := Trunc((presentation - Digits ) * 10);
    Str( x :Digits :Decimals , s );
    Nstr := s
END ; { Nstr }

{ ---- ASCII to BYTE   Converts a string to a byte value ------------------ }

FUNCTION ByteOf ;
VAR    LoPart, HiPart : BYTE ;

{ ------------------------------------------ }

FUNCTION NibbleOf( aChar : CHAR ): BYTE ;
```

```
        eChar OF
        NibbleOf := 0 ;
        NibbleOf := 1 ;
   '2': NibbleOf := 2 ;
   '3': NibbleOf := 3 ;
   '4': NibbleOf := 4 ;
   '5': NibbleOf := 5 ;
   '6': NibbleOf := 6 ;
   '7': NibbleOf := 7 ;
   '8': NibbleOf := 8 ;
   '9': NibbleOf := 9 ;
'A','a': NibbleOf := 10 ;
'B','b': NibbleOf := 11 ;
'C','c': NibbleOf := 12 ;
'D','d': NibbleOf := 13 ;
'E','e': NibbleOf := 14 ;
'F','f': NibbleOf := 15 ;
    ELSE NibbleOf := 0 END {CASE}{ any arguement out of range returns 0 }
END ; { NibbleOf }

{ --------------------------------------- }

BEGIN { ByteOf }
    WHILE Length(Str) < 2 DO Str := '0'+ Str ;
    LoPart := NibbleOf( Str[2]);
    HiPart := NibbleOf( Str[1]) * 16 ;
    ByteOf := HiPart + LoPart
END ; { ByteOf }

{ ------------ CharOfB returns a standard, printable character ------------ }

FUNCTION CharOfB ;
BEGIN
    Datum := Datum AND $7F ;
    IF (Datum > $1F) AND (Datum < $7F )
        THEN CharOfB := Chr(Datum)
        ELSE CharOfB :='.'
END ; { CharOfB }

{ ------------ IntegerOf returns an integer from a string ------------ }

FUNCTION IntegerOf ;
VAR  hByte : INTEGER ; lByte : BYTE ; lStr, hStr : HexStr ;
BEGIN
    WHILE Length( Str ) < 4 DO Str := '0'+ Str ;
    hStr := Copy( Str,1,2 ); hByte := ByteOf( hStr ) * 256 ;
    lStr := Copy( Str,3,2 ); lByte := ByteOf( lStr );
    IntegerOf := hByte + lByte
END ;

{ ------------ WordOf returns a word from a string ------------ }

FUNCTION WordOf ;
VAR  hByte : WORD ; lByte : BYTE ; lStr, hStr : HexStr ;
BEGIN
    WHILE Length( Str ) < 4 DO Str := '0'+ Str ;
    hStr := Copy( Str,1,2 ); hByte := ByteOf( hStr ) * 256 ;
    lStr := Copy( Str,3,2 ); lByte := ByteOf( lStr );
    WordOf := hByte + lByte
END ;

{ ----------------------------------------------------------------- }

FUNCTION LongIntOf ;
VAR   HI, LI : LONGINT ;
BEGIN
    WHILE Length( Str ) < 8 DO Str := '0'+ Str ;
    HI := IntegerOf(Copy( Str,1,4 ));
    HI := HI SHL 16 ;
    LI := IntegerOf(Copy( Str,5,4 ));
    LI := LI AND $0000FFFF ;
```

```
        LongIntOf := HI OR LI
END ;

{ - FirstPrime returns the arguement or the first (smallest) prime factor -- }

FUNCTION FirstPrime ;
CONST  P_range = 47 ;   { Covers all INTEGERs }
       Primes : ARRAY[1..P_range] OF INTEGER =
                ( 2,  3,  5,  7, 11, 13, 17, 19, 23, 29,
                 31, 37, 41, 43, 47, 53, 59, 61, 67, 71,
                 73, 79, 83, 89, 97,101,103,107,113,127,
                 131,137,139,149,151,157,163,167,173,179,
                 181,191,193,197,199,211,223);
VAR    counter : BYTE ; Guess : INTEGER ; found : BOOLEAN ;
BEGIN
   FirstPrime := TheNumber ;
   counter := 1 ;
   REPEAT
       Guess := Primes[counter];
       found := (TheNumber MOD Guess = 0);
       IF found
          THEN FirstPrime := Guess
          ELSE counter := counter + 1 ;
   UNTIL found OR (counter >= P_range)
END ;

{*************************** CHBCRT ****************************************}
{*       BEEP                                                              *}
{***************************************************************************}

PROCEDURE BEEP ; BEGIN IF BeepON THEN Write( BEL ) END ;

{ ------------------------------------------------------------------------- }

PROCEDURE beepKey ;
BEGIN
   IF BeepOn
       THEN            BEGIN
            Sound(300); Delay(200);
            Sound(200); Delay(200);
            Nosound   END
END (* beepKey *);

{ ------------------------------------------------------------------------- }

PROCEDURE beep1;
BEGIN
   IF BeepOn
       THEN            BEGIN
            Sound(1200); Delay(100);
            Sound(350);  Delay(200);
            Sound(2000); Delay(100);
            Nosound   END
END (* beep1 *);

{ ------------------------------------------------------------------------- }

PROCEDURE ClearLines{( First,Lines : INTEGER )};
VAR  R, C, L : INTEGER;
BEGIN
   R := WhereY ; C := WhereX ;
   FOR L := First TO First+Lines DO BEGIN GotoXY( 1,L ); ClrEOL END;
   GotoXY( C,R )
ND;

{ ------------------------------------------------------------------------- }

ROCEDURE SetTxtAttr ; {uses colors, Blinking & Brite }
VAR   Alpha,Backgnd : BYTE;
BEGIN
   IF Blinking
```

```
         THEN Backgnd := BackgrCol OR $08
         ELSE Backgnd := BackgrCol AND $07;
   Alpha := ForegrCol AND $07 ;
   IF Brite
      THEN Alpha := ForegrCol OR $08
      ELSE Alpha := ForegrCol AND $07;
   textAttr := (Backgnd * 16) + Alpha
END ;
{ ──────────────────────────────────────────────────────────────── }
PROCEDURE SetMonoAttr{( BWcolor : MonoVids)};
BEGIN
   CASE BWcolor OF
      normal_Vid    : BEGIN BackgrCol := black; ForegrCol := white END;
      reverse_Vid   : BEGIN BackgrCol := white; ForegrCol := black END;
      underline_Vid : BEGIN BackgrCol := black; ForegrCol := blue  END;
      invisible_Vid : BEGIN BackgrCol := black; ForegrCol := black END
   END; { CASE }
   SetTxtAttr
END ;

{ ──────────────────────────────────────────────────────────────── }

{ this saves cursor location then displays Debug msg on screen }

PROCEDURE DebugMsg{( bugMsg : String ; aNumber : INTEGER )};
VAR       R,C : BYTE ;
BEGIN { Handler }
   R := WhereY ; C := WhereX ;
   GotoXY( 1,StatusLine ); Write( bugMsg,aNumber:6 );
   GotoXY( C,R )
END { DebugMsg };

{************************************************************}
{*                                                          *}
{*    GET CHAR                                              *}
{*                                                          *}
{************************************************************}

FUNCTION GetChar ( R,C : INTEGER ) : CHAR;

VAR   TheChar : CHAR;
BEGIN
   GoToXY( C,R ); TheChar := ReadKey ;
   IF CAPS THEN GetChar := UpCase(TheChar) ELSE GetChar := TheChar ;
END;

{************************************************************}
{*    UNDERSCORE                                            *}
{************************************************************}

PROCEDURE UnderScore( R,C,Places : INTEGER );

VAR   S : INTEGER;
BEGIN
   GoToXY( C,R ); FOR S := 1 TO Places DO Write('_')
END;

{************************************************************}
{*    SPACEOUT                                              *}
{************************************************************}

PROCEDURE SpaceOut( R,C,Places : INTEGER );

VAR   S : INTEGER;
BEGIN
   GoToXY( C,R ); FOR S := 1 TO Places DO Write(space)
END;

{************************************************************}
{*              Flash( R,C,String )                         *}
{************************************************************}
```

```
PROCEDURE Flash{( R,C : BYTE ; Message : String )};
BEGIN
    GotoXY( C,R ); Write( Message )
END;
{ ─────────────────────────────────────────────── }

PROCEDURE FlashChar( R,C : BYTE ; TheChar : CHAR ; PresentationArea : BYTE );
BEGIN
    GotoXY( C,R ); Write( TheChar : PresentationArea )
END;

{ ─────────────────────────────────────────────── }

PROCEDURE FlashInt{( R,C : BYTE ; TheNumber : INTEGER ;
                    PresentationArea : BYTE )};
BEGIN
    GotoXY( C,R ); Write( TheNumber : PresentationArea )
END;

{*******************************************************************}
{* NoYes( String + (N/Y),DeFaultNO) The default includes CR       *}
{*******************************************************************}

FUNCTION NoYes{( R,C : BYTE ; Query : String ; theDefault : BOOLEAN ) : BOOLEAN};
VAR   TheChar : CHAR ; SaveAttr, Start : BYTE ; notFirst : BOOLEAN ;
BEGIN
    SaveAttr := TextAttr;
    Brite := FALSE ; SetTxtAttr ;
    Flash( R,C,Query +'? (N/Y)-> ' );
    Start := C ;
    C := C + Length( Query ) + 11 ;
    Brite := TRUE ; SetTxtAttr ;
    IF theDefault THEN Write('Y') ELSE Write('N');
    TextAttr := SaveAttr; notFirst := FALSE ;
    REPEAT
        IF notFirst THEN BeepKey ;
        notFirst := TRUE ;
        TheChar := UpCase( GetChar( R,C ));
        IF TheChar = Nul THEN TheChar := GetChar( R,C )
    UNTIL TheChar IN ['Y','N',CR];
    stat := OK_field ;
    IF theDefault
        THEN IF TheChar ='N'
                THEN NoYes := FALSE
                ELSE NoYes := TRUE
        ELSE IF TheChar ='Y'
                THEN NoYes := TRUE
                ELSE NoYes := FALSE;
    GotoXY( Start,R ); Write(' ':Length( Query ) + 12 )
END;

{*******************************************************************}
{ NoYesEsc( String + (N/Y),default) The default is CR.  Escape allowed}
{ F1 Can request help, Escape can be used to abort decision         }
{*******************************************************************}

FUNCTION NoYesEsc{( R,C : BYTE ; Query : String ; theDefault : BOOLEAN ) : BOOLEAN};

VAR   TheChar : CHAR ; SaveAttr, Start : BYTE ; notFirst : BOOLEAN ;
BEGIN
    SaveAttr := TextAttr;
    Brite := FALSE ; SetTxtAttr ;
    Flash( R,C,Query +'? (N/Y)-> ' );
    Start := C ;
    C := C + Length( Query ) + 11 ;
    Brite := TRUE ; SetTxtAttr ;
    IF theDefault THEN Write('Y') ELSE Write('N');
    TextAttr := SaveAttr; notFirst := FALSE ;
    REPEAT
```

```
            IF notFirst THEN BeepKey ;
            TheChar := UpCase( GetChar( R,C ));
            notFirst := TRUE ;
            IF theChar = nul
                THEN                                    BEGIN
                    TheChar := ReadKey;
                    IF theChar <> F1
                        THEN theChar := space END
         UNTIL TheChar IN ['Y','N',CR,Esc,F1];
         IF theChar = Esc
            THEN stat := esc_field
            ELSE IF theChar = F1
                    THEN stat := help_field
                    ELSE stat := OK_field;
         IF stat = OK_field
            THEN IF theDefault
                    THEN IF TheChar ='N'
                            THEN NoYesEsc := FALSE
                            ELSE NoYesEsc := TRUE
                    ELSE IF TheChar ='Y'
                            THEN NoYesEsc := TRUE
                            ELSE NoYesEsc := FALSE
            ELSE NoYesEsc := theDefault ;
         GotoXY( Start,R ); Write(' ':Length( Query ) + 12 )
END;

{ ─────────────────────────────────────────────────────────── }
{ ── GetStr( R,C,prompt,Size,Default,preView  ) returns a special status ── }
{ ─── using a prompt and permitting editing of a default ─────────── }
{ ─────────────────────────────────────────────────────────── }

FUNCTION GetStr( R,C     : BYTE;
                 prompt  : string;
                 fieldSize : INTEGER;
             VAR theDefault : String;
                 preView : BOOLEAN ): CRTfields ;

VAR   startC, CC, NewC, entryLength : INTEGER ; TheStr : String ;
      Done, last1ASpace, deleted, Vid_IntensSave : BOOLEAN ; TextAttrSave : BYTE;
            aSpace, aChar : CHAR ; ExitStat : CRTfields ;

{ ─────────────────────────── }

PROCEDURE FlashIt ;
BEGIN
    Flash( R,C,theStr );
    UnderScore( R,C+entryLength,fieldSize-entryLength  )
END ; { FlashIt }

{ ─────────────────────────── }

PROCEDURE DelUndrCursr ;
      : INTEGER ; Work : string ;

k := TheStr ; TheStr := '';
  _ Work[CC+1] = Space THEN last1ASpace := TRUE;
 FOR i := 1 TO entryLength DO
        IF i <> CC + 1
            THEN TheStr := TheStr + Work[i];
    entryLength := Length(theStr);
    IF entryLength < CC + 1
        THEN deleted := TRUE
        ELSE aSpace := theStr[CC+1]
END ; { DelUndrCursr }

{ ─────────────────────────── }

PROCEDURE InsertAtCursr ;
VAR i : INTEGER ; Work : string ;
BEGIN
```

```
    Work := TheStr ; TheStr := '';
    FOR i := 1 TO CC DO TheStr := TheStr + Work[i];
    TheStr := TheStr + aChar ;
    FOR i := CC + 1 TO entryLength DO TheStr := TheStr + Work[i];
    entryLength := Length(theStr);
{    Dec(CC) }
END ; { InsertAtCursr }

{ ------------------------------------------- }

PROCEDURE Pad_it ;
BEGIN
    IF CC = fieldSize - 1 { count 0/1 }
      THEN BeepKey
      ELSE BEGIN theStr := theStr + space; Inc(entryLength) END;
    Inc(CC);
    Flashit
END ; { Pad_it }

{ ------------------------------------------- }

PROCEDURE DestructBS ;
VAR i : INTEGER ; Work : string ;
BEGIN
    Work := TheStr ; TheStr := '';
    FOR i := 1 TO entryLength DO
      IF i <> CC
         THEN TheStr := TheStr + Work[i];
    Dec(CC);
    entryLength := Length(theStr);
    FlashIt
END ; { DestructBS }

{ ------------------------------------------- }
PROCEDURE DeleteWord;
BEGIN
    last1ASpace := FALSE;
    deleted := FALSE;
    REPEAT DelUndrCursr UNTIL (last1ASpace AND (aSpace <> space)) OR deleted;
    Flashit
END; { DeleteWord }
{ ------------------------------------------- }
PROCEDURE EvalFunctKey ;
BEGIN
    aChar := ReadKey ;
    CASE aChar OF
    homeKey  : CC := 0 ;
     endKey  : CC := entryLength ;
         F1  : BEGIN exitStat := help_field ; done := TRUE END;
  insertKey  : InsertCh := NOT InsertCh ;
  deleteKey  : BEGIN DelUndrCursr ; Flashit END;
       PgDn  : BEGIN exitStat := last_field ; Done := TRUE END ;
       PgUp  : BEGIN exitStat := frst_field ; Done := TRUE END ;
    DownKey  : BEGIN exitStat := next_field ; Done := TRUE END ;
      UpKey  : BEGIN exitStat := prev_field ; Done := TRUE END ;
    LeftKey  : IF CC = 0 THEN BeepKey ELSE Dec(CC);
   RightKey  : IF CC = entryLength THEN Pad_it ELSE Inc(CC);
    ELSE exitStat := next_field ; BeepKey END; { CASE }
    IF InsertCh { change the shape of the cursor. }
       THEN                                   BEGIN
            Regs.AH := $01 ;
            IF Mono_Mode
               THEN Regs.CX := $030D
               ELSE Regs.CX := $0207 ;
            Intr( VideoInt,Regs )  END
       ELSE                                   BEGIN
            Regs.AH := $01 ;
            IF Mono_Mode
               THEN Regs.CX := $0B0D
               ELSE Regs.CX := $0607 ;
```

```
            Intr( VideoInt,Regs ) END
END ;  { EvalFunctKey }
{ ------------------------------------------- }
PROCEDURE EvalCmd ;
BEGIN
    CASE aChar OF
      Nul : EvalFunctKey;
      BS  : IF CC = 0 THEN BeepKey ELSE DestructBS;
      Tab : BEGIN exitStat := next_field ; Done := TRUE END;
      CR  : BEGIN Done := TRUE ; exitStat := ok_field END;
      DC4 : DeleteWord;
      EM  : BEGIN theStr :=''; entryLength := 0 ; CC := 0 ; Flashit END;
      Esc : BEGIN exitStat := esc_field; Done := TRUE END
    ELSE BeepKey END { CASE }
END ; { EvalCmd }
{ ------------------------------------------- }
PROCEDURE EditStr;
BEGIN
    REPEAT
        aChar := GetChar( R,NewC );
        IF (Ord( aChar ) < 128) AND (Ord( aChar ) > 31 )
            THEN IF (CC >= entryLength + 1) OR (CC >= fieldSize)
                THEN BeepKey
                ELSE          BEGIN
                    IF entryLength > CC
                        THEN IF InsertCh
                            THEN IF entryLength = fieldSize
                                THEN BeepKey
                                ELSE InsertAtCursr
                            ELSE TheStr[CC+1] := aChar
                        ELSE                    BEGIN
                            TheStr := theStr + aChar ;
                            entryLength := Length(theStr) END ;
                    CC := CC+1 ;
                    FlashIt END
            ELSE EvalCmd;
        IF CC >= fieldSize THEN CC := fieldSize - 1 ; {keep cursor within field }
        NewC := C + CC;
    UNTIL Done;
    Brite := FALSE; SetMonoAttr( normal_Vid ); Flash( R,startC,prompt );
    Brite := TRUE;  SetTxtAttr; Flash( R,C,theStr );
    SpaceOut( R,C+entryLength,fieldSize-entryLength  )
END;
{ ------------------------------------------- }
BEGIN   { GetStr }
    TextAttrSave := TextAttr ;
    Vid_IntensSave := Brite ;
    IF PreView
        THEN BEGIN Brite := FALSE; SetMonoAttr( normal_Vid ) END
        ELSE BEGIN Brite := TRUE;  SetMonoAttr( normal_Vid ) END;
    startC := C ;
    Flash( R,C,prompt ); C := C + Length( prompt );
    IF Length( theDefault ) <= fieldSize
        THEN TheStr := theDefault
        ELSE theStr := Copy( theDefault,1,fieldSize );
    entryLength := Length( theStr );
    IF PreView
        THEN HighVideo;
    SetMonoAttr(reverse_Vid);
    IF PreView
        THEN Flash(R,C,theStr) { Don't show underlines }
        ELSE FlashIt ; { show underlines }
    Done := FALSE;
    CC := 0 ; NewC := C ;
    IF Preview
        THEN exitStat := ok_field
        ELSE EditStr;
    Regs.AH := $01 ;
    IF Mono_Mode { deal with cursor, make it an underline. }
```

```
          THEN Regs.CX := $0B0D
          ELSE Regs.CX := $0607 ;
     Intr( VideoInt,Regs );
     InsertCh := FALSE ;
     TextAttr := TextAttrSave;
     Brite := Vid_IntensSave ;
     SetMonoAttr(normal_Vid);
     theDefault := TheStr;
     GetStr := ExitStat
END ; { GetStr }
{ ─────────────────────────────────────────────────────── }
FUNCTION  GetInt( R,C      : BYTE;
                  prompt   : string;
                  fieldSize : INTEGER;
              VAR theDefault : LongInt;
                  preView  : BOOLEAN ): CRTfields ;
VAR   workStr : string ; strerr : INTEGER;
BEGIN
   Str( TheDefault,workStr );
   REPEAT stat := GetStr( R,C,prompt,fieldSize,workStr,preView);
       Val( workStr,theDefault,strerr);
       IF strerr <> 0 THEN BeepKey;
   UNTIL strerr = 0 ;
   GetInt := stat
END ; { GetInt }
{ ─────────────────────────────────────────────────────── }
FUNCTION GetReal( R,C      : BYTE;
                  prompt   : string;
                  fieldSize : INTEGER;
              VAR theDefault : REAL ;
                  preView  : BOOLEAN ): CRTfields ;
VAR   workStr : string ; strerr : INTEGER;
BEGIN
   Str( TheDefault,workStr );
   REPEAT stat := GetStr( R,C,prompt,fieldSize,workStr,preView);
       Val( workStr,theDefault,strerr);
       IF strerr <> 0 THEN BeepKey
   UNTIL strerr = 0 ;
   GetReal := stat
END ; { GetReal }
                          { CHBCRT }

CONST MaxWindows = 10;  (* maximum # on-screen windows *) { WINDOWS }

TYPE pointer = ^integer;
     WindowType = RECORD
       xL,yL,xR,yR : integer;  (* coordinates of corners   *)
           BufrPtr : pointer;  (* pointer to buffer location *)
    CursorX,CursorY : integer; (* cursor position before opening *)
           ScreenAttr : byte;  (* text attributes before opening *)
               END;

VAR WindowStack : array [0..MaxWindows] of WindowType;
    MaxCols,MaxRows : byte; (* # rows & columns for initial video mode *)
    NumWindows : 0..MaxWindows;  (* # windows currently open *)
{ ─────────────────────────────────────────────────────── }
PROCEDURE beep_wndo_err;
BEGIN
   Sound(1000); Delay(150);
   Sound(350);  Delay(300);
   Sound(1200); Delay(100);
   Nosound
END (* procedure beep_wndo_err *);
{ ─────────────────────────────────────────────────────── }
PROCEDURE ResetWindow ; { to screen size }
BEGIN Window(1,1,80,25) END ;
{ ─────────────────────────────────────────────────────── }
CONST ScreenSize = 4000 ;
PROCEDURE SaveScreen{( VAR dest : screens )};
BEGIN
```

```
    Window(1,1,80,25);
    Move( ProperScreen^,dest^,screenSize  )
END ;

{ ─────────────────────────────────────────────────────────────────── }

PROCEDURE ReStoreScreen{( VAR source : screens )};
BEGIN
    Move( source^,ProperScreen^,screenSize  );
END ;

{ ─────────────────────────────────────────────────────────────────── }

PROCEDURE BlitzLine{( r : BYTE ; TheString: String; Atrib : BYTE )};
VAR     len : BYTE ABSOLUTE theString ; last, col : BYTE ;
BEGIN
    IF len > 80
        THEN last := 80
        ELSE last := len ;
    FOR col := 1 TO last DO                         BEGIN
        properScreen^[r,col].S_ch   := TheString[col];
        properScreen^[r,col].S_attr := Atrib     END ;
    IF last < 80
        THEN FOR col := last + 1 TO 80 DO properScreen^[r,col].S_ch := ' '
END ; { BlitzLine }

{ ─────────────────────────────────────────────────────────────────── }

PROCEDURE BlitzString{( r,c : BYTE ; TheString: String; Atrib : BYTE )};
VAR  last, i, co : BYTE ; len : BYTE ABSOLUTE theString ;
BEGIN
    last := Len + c - 1 ;
    IF last > 80 THEN last := 80 ;
    i := 1 ;
    FOR co := c TO last DO                          BEGIN
        properScreen^[r,co].S_ch   := TheString[i] ;
        properScreen^[r,co].S_attr := Atrib ; Inc(i)   END
END ; { BlitzString }

{ ─────────────────────────────────────────────────────────────────── }

PROCEDURE OpenScrolWindow{( topRow,rows : BYTE )};
BEGIN
    Window( 1,topRow,80,topRow+rows  )
END ; { OpenScrolWindow }

{ ─────────────────────────────────────────────────────────────────── }
PROCEDURE DrawFrame (x1,y1: BYTE;W_title : String; x2,y2: byte);
(* Draws a rectangular frame on the screen with upper left hand corner   *)
(*              at x1,y1, lower right hand corner at x2,y2.              *)
VAR k : integer;
    CurrentAttr, t_size : byte;
BEGIN (* DrawFrame *)
    CurrentAttr := TextAttr;    (* save the current text attributes *)
    TextAttr := FrameFgnd + 16*FrameBkgnd;  (* change attributes for frame *)
    GotoXY(x1,y1);
    t_size := Length(W_title) ;
    Write(chr(201));
    for k := (x1 + 1) to (x2 - 1) do
        IF (k - x1) <= t_size THEN Write(W_title[k-x1]) ELSE Write(chr(205));
    Write(chr(187));
    for k := (y1 + 1) to (y2 - 1) do
BEGIN
    GotoXY(x1,k);   Write(chr(186));
    GotoXY(x2,k);   Write(chr(186));
END;
GotoXY(x1,y2);
Write(chr(200));
for k := (x1 + 1) to (x2 - 1) do
    Write(chr(205));
```

```
      Write(chr(188));
      TextAttr := CurrentAttr     (* restore previous text attributes *)
END (* DrawFrame *);
{ ───────────────────────────────────────────────────────── }
PROCEDURE SaveRegion (x1,y1,x2,y2 : byte;
                      VAR StartAddr : pointer );
(* Saves the contents of the screen rectangle with coordinates x1,y1,x2,y2 *)
(*              on the heap starting at address StartAddr.                 *)
VAR TempPtr,LinePtr : pointer;
    k,LineLength : integer;
BEGIN
   LineLength := (x2 - x1 + 1) * 2; (* # bytes per line in rectangle *)
   (* allocate space on heap *)
   GetMem (StartAddr,LineLength * (y2 - y1 + 1));
   TempPtr := StartAddr;  (* TempPtr points to copy destination on heap *)
   for k := y1 to y2 do BEGIN
      (* Make LinePtr point to screen position x=x1, y=k *)
      LinePtr := Ptr(VidStart, (k-1)*MaxCols*2 + (x1-1)*2);
      (* Move the line from screen to heap *)
      Move (LinePtr^,TempPtr^,LineLength);
      (* Increment the screen pointer *)
      TempPtr := Ptr(seg(TempPtr^),ofs(TempPtr^) + LineLength);
   END
END (* procedure SaveRegion *);
{ ───────────────────────────────────────────────────────── }
PROCEDURE RecallRegion (x1,y1,x2,y2 : integer;
            HpPtr : pointer);
(* Moves the contents of a previously saved region from the heap back *)
(*                       to the screen.                               *)
VAR TempPtr,LinePtr : pointer;
    k,LineLength : integer;
BEGIN
   LineLength := (x2 - x1 + 1) * 2; (* # bytes per line in rectangle *)
   TempPtr := HpPtr;   (* TempPtr gives the source location for copy *)
   for k := y1 to y2 do
      BEGIN
         (* Make LinePtr point to screen position x=x1, y=k *)
         LinePtr := Ptr(VidStart, (k-1)*MaxCols*2 + (x1-1)*2);
         move (TempPtr^,LinePtr^,LineLength);
         TempPtr := Ptr(seg(TempPtr^),ofs(TempPtr^) + LineLength);
      END;
END (* procedure RecallRegion *);
{ ───────────────────────────────────────────────────────── }
PROCEDURE OpenTheWindow(x1,y1: BYTE; W_title : string; x2,y2: byte);

(* Creates a blank Window with the given coordinates, and saves the contents *)
(* of the underlying region on the heap. If an Error occurs in attempting to *)
(* open the Window, Error is set to 0 ; otherwise, Wndo_err is annunciated   *)
VAR Pntr : pointer;  wndo_err : BYTE ;
BEGIN
   if (NumWindows = 0) then BEGIN  (* determine current screen parameters *)
      MaxCols := Lo(WindMax) + 1; (* add 1, since numbering begins with 0 *)
      MaxRows := Hi(WindMax) + 1;
      with WindowStack[0] do  (* WindowStack[0] is the entire screen *)
         BEGIN
            xL := 0; yL := 0;
            xR := MaxCols + 1 ; yR := MaxRows + 1
         END
   END;
   (* check for possible error conditions *)
   IF (NumWindows >= MaxWindows)  (* too many windows? *)
     THEN Wndo_err := 1
     ELSE IF (MaxAvail < longint((x2 - x1 +.1)*(y2 - y1 + 1)*2)) {out of heap}
            THEN Wndo_err := 2
            ELSE IF NOT ((x1 in [1..MaxCols-2]) and (x2 in [3..MaxCols]) and
                     (x2-x1>1) and (y1 in [1..MaxRows-2]) and
                     (y2 in [3..MaxRows]) and (y2-y1>1)) { wrong dimensions? }
                  THEN Wndo_err := 3
                  ELSE Wndo_err := 0 ;
IF Wndo_err = 0
```

```
         THEN                    BEGIN   (* successful request *)
            SaveRegion (x1,y1,x2,y2,Pntr);
            NumWindows := NumWindows + 1;
            WITH WindowStack[NumWindows]  DO                    BEGIN
                xL := x1;  yL := y1;  xR := x2;  yR := y2;
                BufrPtr := Pntr;
                CursorX := WhereX;
                CursorY := Wherey;   ScreenAttr := TextAttr END;
            Window (1,1,MaxCols,MaxRows);    (* make the whole screen a window *)
            DrawFrame (x1,y1,W_title,x2,y2);
            Window (x1+1,y1+1,x2-1,y2-1);    (* create the requested window    *)
            TextColor(ForegrCol);  TextBackground(BackgrCol);
            ClrScr             END   (* then clause *)
        ELSE      BEGIN
            beep_wndo_err;
            ResetWindow;  FrameBkgnd := red;
            DrawFrame( 20,10,'Window ERROR ',60,12);
            Window( 21,11,59,11 ); ClrScr;
            CASE Wndo_err OF
                1 : Write(' Too Many Windows, ',NumWindows );
                2 : Write(' Not enough memory');
                3 : Write(' Wrong Co-ordnates, ',x1:3,y1:3,x2:3,y2:3 )
            END; {CASE}
            Halt       END {ELSE}
END (* procedure OpenTheWindow  *);

{ ------ Rows & Cols includes frame; window is smaller ------------------ }

PROCEDURE OpenWindow( topRow,leftCol : BYTE; W_title : String;
                     Rows,Cols : BYTE );
BEGIN
   W_title := W_title + ' ' + HexOfB(NumWindows +1);
   IF Length(W_title) > cols - 2 THEN W_title := Copy(W_title,1,cols-2);
   OpenTheWindow( leftCol,topRow,W_title,leftCol+cols,topRow+rows   );
END ; { OpenWindow }

{ ----------------------------------------------------------- }
PROCEDURE CloseWindow;
VAR x,y : integer;
BEGIN
   IF NumWindows > 0
      THEN                                              BEGIN
          WITH WindowStack[NumWindows] DO                     BEGIN
             RecallRegion(xL,yL,xR,yR,BufrPtr);   { restore underlying text }
             FreeMem(BufrPtr,(xR - xL + 1)*(yR - yL + 1)*2); { free heap }
             x := CursorX;  y := CursorY;   (* old cursor position  *)
             TextAttr := ScreenAttr    (* restore screen attributes *) END;
          (* activate the underlying Window *)
          NumWindows := NumWindows - 1;
          WITH WindowStack[NumWindows] DO Window (xL+1,yL+1,xR-1,yR-1);
          GotoXY (x,y)   (* restore the cursor position *) END
      ELSE     BEGIN
          beep_wndo_err;
          FrameBkgnd := red;
          DrawFrame( 20,10,'Window ERROR ',60,12);
          Window( 21,11,40,11 ); ClrScr;
          Write(' Too Few Windows, ',NumWindows );
          Halt      END
END (* procedure CloseWindow  *);
{ ------------------------------------------------------------ }
FUNCTION Decision( title,msg,action : string ;
                   escapeAllowed,Default : BOOLEAN): BOOLEAN;
VAR     F_save : BYTE;
BEGIN
  F_save := FrameBkgnd;
  FrameBkgnd := red ; beep ;
  OpenWindow( 12,12,title,6,60);
  Flash( 2,2,msg);
  IF escapeAllowed
     THEN Decision := NoYesEsc( 4,2,action,default)
```

```
      ELSE Decision := NoYes( 4,2,action,default);
   EscapeReq := ( stat = esc_field); Delay(350);
   FrameBkgnd := F_save;
   CloseWindow
END ; { Decision }

{ -----------------------------initialization----------------------------- }
BEGIN                               { page 231 }
   Regs.AH := $0F ;
   Intr( VideoInt,Regs );
   Mono_mode := ( Regs.AL = 7 );
   IF Mono_mode
      THEN                    BEGIN
         ProperScreen := @Mscreen;
         VidStart := MonoBase;
         VPort := $3B4 END
      ELSE                    BEGIN
         ProperScreen := @Cscreen;
         VidStart := CGAbase;
         VPort := $3D4 END;
   BeepOn := TRUE; CAPS := FALSE;
   InsertCh := FALSE; Blinking := FALSE; Brite := FALSE;
   SetMonoAttr( normal_Vid );
   NumWindows := 0;        { WINDOWS }
   FrameFgnd := White; FrameBkgnd := Blue    (* frame colors *)

END.
```

We claim:

1. A printing system for printing a string of letters, numbers or symbols on a moving substrate or object in a direction other than the direction in which the suba plurality of stationary ink-jet print heads, arranged in staggered proximity to one another such that all of said print heads can cooperate in printing each string of letters, numbers or symbols, each of said print heads comprising an ink-jet nozzle for ejecting ink droplets having a preselected electrical charge onto a substrate, and first and second parallel electrically charged plates positioned such that each ink droplet ejected from said nozzle passes between said parallel plates, and is influenced by said preselected electrical charge to land on said substrate in one of a plurality of possible locations, and where said predetermined electrical charge on each of said ink droplets is predetermined by stroke data;

a personal computer for communicating stroke data and print commands to said print heads, said personal computer including at least one interface means for communicating with said print heads; and a plurality of communication means, each one of said plurality of communication means being installed in one of said print heads for permitting communication of individual stroke data and print commands to each of said plurality of print heads from said personal computer through one of said interface means.

10. The printing system of claim 9 wherein said interface means is a standard parallel printer interface.

11. The printing system of claim 9 wherein each of said communication means is connected to said interface means.

12. The printing system of claim 10 further comprising a common bus, wherein said common bus is connected to each of said communication means and is connected to said interface means.

13. The printing system of claim 11 wherein said communication means further comprises a power supply means for insuring that each of said plurality of communication means is powered.

14. The printing system of claim 9 further comprising position sensing means connected to one of said plurality of print heads for generating a signal corresponding to positions of individual print locations.

15. The print system of claim 14 wherein said position means comprises an encoder.

16. The printing system of claim 15 wherein said encoder is connected to one of said plurality of print heads and the encoder signal is transmitted to said personal computer through said communication means and said interface means.

17. The printing system of claim 9 wherein said communication means further comprises a strobing means for determining when said personal computer is communicating with one of said communication means.

18. A printing system for printing a string of letters, numbers or symbols on a moving substrate or object in a direction other than a planar direction in which the substrate or object travels, the system comprising, in combination:

a plurality of stationary ink-jet print heads, arranged in staggered proximity to one another such that all of said print heads can cooperate in printing each string of letters, numbers or symbols, each of said print heads comprising an ink-jet nozzle for ejecting ink droplets having a preselected electrical charge onto a substrate, and first and second parallel electrically charged plates positioned such that each ink droplet elected from said nozzle passes between said parallel plates, and is influenced by strate or object travels, the system comprising, in combination:

a plurality of stationary ink-jet print heads, arranged in staggered proximity to one another such that all of said print heads can cooperate in printing each string of letters, numbers or symbols, each of said print heads comprising an ink-jet nozzle for ejecting ink droplets having a preselected electrical charge onto a substrate, and first and second parallel electrically charged plates positioned such that each ink droplet ejected from said nozzle passes between said parallel plates, and is influenced by said preselected electrical charge to land on said substrate in one of a plurality of possible locations, and where said predetermined electrical charge on each of said ink droplets is predetermined by stroke data;

programmable means for communicating stroke data and print commands to said print heads, said programmable means including at least one interface means; and communication means installed in each of said print heads for permitting communication of individual stroke data and print commands to each of said print heads from said programmable means through one of said interface means.

2. The printing system of claim 1 wherein said interface means is a standard parallel printer interface.

3. The printing system of claim 1 including a plurality of communication means, each of said communication means being connected to a common bus, the common bus being connected to said interface means.

4. The printing system of claim 2 including a plurality of communication means wherein each of said communication means is connected to a common bus, and wherein the common bus is connected to said interface means.

5. The printing system of claim 3 wherein said communication means further comprises a power supply means for insuring that each of said plurality of communication means is powered.

6. The printing system of claim 1 further comprising position sensing means connected to one of said plurality of print heads for generating a signal corresponding to positions of individual print locations.

7. The printing system of claim 6 wherein said position means comprises an encoder.

8. The printing system of claim 1 wherein said communication means further comprises a strobing means for determining when said programmable device is communicating with one of said communication means.

9. A printing system for printing a string of letters, numbers or symbols on a moving substrate or object in a direction other than the direction in which the substrate or object travels, the system comprising, in combination:

said preselected electrical charge to land on said substrate in one of a plurality of possible locations, and where said predetermined electrical charge on each of said ink droplets is predetermined by stroke data;

a personal computer for communicating stroke data and print commands to said print heads, said personal computer including at least one parallel interface for communicating with said print heads;

communication means for permitting communication of individual stroke data and print commands to each of said plurality of print heads from said personal computer through one of said parallel interfaces.

19. The printing system of claim 18 wherein each of said plurality of print heads is connected to said communication means, said communication means being connected to said parallel interface.

20. The printing system of claim 18 wherein said communication means further comprises a power supply means for insuring that each of said plurality of communication means is powered.

21. The printing system of claim 18 further comprising position means connected to said interface means for generating a signal corresponding to particular positions of individual print locations.

22. The printing system of claim 21 wherein said position means comprises an encoder.

23. The printing system of claim 19 further comprising a position means, wherein said position means is connected to one of said plurality of print heads and wherein said position means generates a signal corresponding to a particular location of the substrate or object, and wherein said signal is transmitted by said print-head through the communication means to the parallel interface of said personal computer.

24. The printing system of claim 18 wherein said communication means further comprises a strobing means for determining when said personal computer is communicating with one of said communication means.

25. A printing system for printing a symbol or character in a plurality of colors on a moving substrate or object, the system comprising, in combination:

a plurality of stationary ink-jet print heads, arranged in staggered proximity to one another Such that all of said print heads can cooperate in printing each symbol or character, each of said print heads comprising an ink-jet nozzle for ejecting ink droplets having a preselected electrical charge onto a substrate, and first and second parallel electrically charged plates positioned such that each ink droplet ejected from said nozzle passes between said parallel plates, and is influenced by said preselected electrical charge to land of said substrate in one of a plurality of possible locations, and where said predetermined electrical charge on each of said ink droplets is predetermined by stroke data;

a personal computer for communicating stroke data and print commands to said print heads, said personal computer including at least one parallel interface for communicating with said print heads; and communication means for permitting communication of individual stroke data and print commands to each of said plurality of print heads from said personal computer through one of said interface means.

26. The printing system of claim 25 wherein said interface means is a parallel printer interface.

* * * * *